US011192191B2

(12) United States Patent
Forbes et al.

(10) Patent No.: US 11,192,191 B2
(45) Date of Patent: Dec. 7, 2021

(54) QUICK GRIP POCKET HOLE JIG SYSTEM AND METHOD

(71) Applicant: Kreg Enterprises, Inc., Huxley, IA (US)

(72) Inventors: Timothy J. Forbes, Ankeny, IA (US); Scott Schaaf, Ankeny, IA (US); Mark David McClellan, Prairie City, IA (US)

(73) Assignee: KREG ENTERPRISES, INC., Huxley, IA (US)

( * ) Notice: Subject to any disclaimer, the term of this patent is extended or adjusted under 35 U.S.C. 154(b) by 0 days.

(21) Appl. No.: 16/750,740

(22) Filed: Jan. 23, 2020

(65) Prior Publication Data

US 2020/0238396 A1  Jul. 30, 2020

Related U.S. Application Data

(60) Provisional application No. 62/797,492, filed on Jan. 28, 2019.

(51) Int. Cl.
*B23B 47/28* (2006.01)
*B25B 5/12* (2006.01)

(52) U.S. Cl.
CPC ............ *B23B 47/287* (2013.01); *B25B 5/125* (2013.01); *B23B 2247/10* (2013.01); *B23B 2247/12* (2013.01); *B23B 2260/03* (2013.01)

(58) Field of Classification Search
CPC . B23B 47/287; B23B 47/288; B23B 2247/10; B23B 2247/12; B23B 2260/03; B25B 5/125
See application file for complete search history.

(56) References Cited

U.S. PATENT DOCUMENTS 3,241,453 A * 3/1966 Baldwin ................ B27D 5/006
409/180
5,063,982 A   11/1991 Durney
(Continued)

FOREIGN PATENT DOCUMENTS

AU        8345001 A    3/2002
AU     2014295887 A1   2/2016
(Continued)

OTHER PUBLICATIONS

International Search Report for PCT/US2020/014809 dated Apr. 20, 2020.

*Primary Examiner* — Eric A. Gates
*Assistant Examiner* — Paul M Janeski
(74) *Attorney, Agent, or Firm* — Christopher A. Proskey; BrownWinick Law Firm

(57) ABSTRACT

A quick grip pocket hole jig system is presented having a support section having a clamp support, an end stop and a back stop. A clamping assembly is connected to the support section having a clamping rod that extends through the clamp support. A drill guide carrier having a drill guide assembly is connected to the clamping rod on a forward side of the clamp support. A clamp body having a trigger and a release mechanism is connected to the clamping rod on a rearward side of the clamp support. The clamp body is a quick grip clamp body that facilitates quick gripping of a workpiece positioned within the support section. The clamping assembly includes a return spring and a release mechanism such that when the release mechanism is actuated the drill guide carrier and the drill guide assembly are automatically moved to a non-clamping position.

40 Claims, 75 Drawing Sheets

(56) References Cited

U.S. PATENT DOCUMENTS

| | | |
|---|---|---|
| 5,322,396 A | 6/1994 | Blacker |
| 5,676,500 A | 10/1997 | Sommerfeld |
| 5,791,835 A | 8/1998 | Chiang et al. |
| 6,254,320 B1 | 7/2001 | Weinstein et al. |
| 6,394,712 B1 | 5/2002 | Weinstein et al. |
| 6,599,064 B1 | 7/2003 | Robinson |
| 6,726,411 B2 | 4/2004 | Sommerfeld et al. |
| D503,415 S | 3/2005 | Dembicks |
| 6,955,508 B1 | 10/2005 | Radcliffe |
| D528,930 S | 9/2006 | Degen |
| 7,101,123 B1 | 9/2006 | Weinstein et al. |
| 7,134,814 B1 | 11/2006 | Park |
| D567,269 S | 4/2008 | Sion |
| 7,374,373 B1 | 5/2008 | Park et al. |
| 7,484,914 B1 | 2/2009 | Weinstein et al. |
| 7,597,513 B2 | 10/2009 | Chiang |
| 7,670,089 B2 | 3/2010 | Chiang |
| 7,798,750 B2 | 9/2010 | Clark |
| 8,052,358 B2 | 11/2011 | Mcdaniel et al. |
| 8,083,443 B1 | 12/2011 | Circosta et al. |
| D651,885 S | 1/2012 | Banasik |
| 8,087,853 B2 | 1/2012 | Stukuls |
| 8,231,313 B2 | 7/2012 | Sommerfeld et al. |
| 8,840,345 B1 | 9/2014 | Park |
| 9,682,430 B2 | 6/2017 | Clark |
| 9,782,837 B2 | 10/2017 | Pelkey |
| D809,032 S | 1/2018 | Cummings |
| D809,578 S | 2/2018 | Cummings |
| 9,969,011 B1 | 5/2018 | Marusiak |
| 9,969,042 B2 | 5/2018 | Clark |
| 10,022,808 B2 | 7/2018 | Chang |
| 10,144,068 B1 | 12/2018 | Poole et al. |
| 10,173,269 B2 | 1/2019 | Cattaneo |
| 10,286,458 B2 | 5/2019 | Brigham |
| 10,315,295 B2 | 6/2019 | Vandenberg |
| 10,343,222 B2 | 7/2019 | Walter |
| 10,357,831 B2 | 7/2019 | Evatt et al. |
| 10,376,967 B2 | 8/2019 | Asimakis et al. |
| 10,399,152 B2 | 9/2019 | Chang |
| 10,427,222 B2 | 10/2019 | Evatt et al. |
| D869,255 S | 12/2019 | Thackery |
| D872,147 S | 1/2020 | Hall |
| 10,537,942 B2 | 1/2020 | Brigham |
| 2003/0123941 A1 | 7/2003 | Emerson |
| 2004/0253065 A1 | 12/2004 | Davis |
| 2005/0089381 A1 | 4/2005 | Liu |
| 2006/0228180 A1 | 10/2006 | Sommerfeld et al. |
| 2007/0201961 A1 | 8/2007 | Chiang |
| 2007/0280797 A1 | 12/2007 | McDaniel et al. |
| 2008/0075546 A1 | 3/2008 | Lin |
| 2008/0099101 A1 | 5/2008 | Chiang |
| 2008/0187404 A1 | 8/2008 | Chiang |
| 2011/0150587 A1 | 6/2011 | Is |
| 2012/0051865 A1 | 3/2012 | Liu |
| 2016/0158850 A1 | 6/2016 | Fisher |
| 2017/0087644 A1 | 3/2017 | Pelkey |
| 2017/0297119 A1 | 10/2017 | Chang |
| 2018/0071835 A1 | 3/2018 | Poole et al. |
| 2018/0141133 A1 | 5/2018 | Clark |
| 2018/0185930 A1 | 7/2018 | Duginske |
| 2018/0214959 A1 | 8/2018 | Evatt et al. |
| 2018/0214960 A1 | 8/2018 | Evatt et al. |
| 2018/0290217 A1 | 10/2018 | Asimakis |
| 2018/0345385 A1 | 12/2018 | Yates et al. |
| 2019/0015903 A1 | 1/2019 | Schleicher |
| 2019/0030619 A1 | 1/2019 | Thackery |
| 2019/0047058 A1 | 2/2019 | Pikarski et al. |
| 2019/0054547 A1 | 2/2019 | Pikarski et al. |
| 2019/0111499 A1 | 4/2019 | Evatt et al. |
| 2019/0126360 A1 | 5/2019 | Marra, Jr. |
| 2019/0176247 A1 | 6/2019 | Chang |
| 2019/0217402 A1 | 7/2019 | Brigham |
| 2019/0270143 A1 | 9/2019 | Duginske |
| 2019/0308252 A1 | 10/2019 | Evatt et al. |
| 2019/0329329 A1 | 10/2019 | Schaaf et al. |
| 2019/0344362 A1 | 11/2019 | Nomis |
| 2020/0030891 A1 | 1/2020 | Duginske |

FOREIGN PATENT DOCUMENTS

| | | |
|---|---|---|
| AU | 2018101034 A4 | 8/2018 |
| CA | 3012668 | 1/2019 |
| DE | 102004023343 A1 | 12/2005 |
| DE | 202006005977 U1 | 8/2006 |
| DE | 60125047 T2 | 7/2007 |
| DE | 202012103274 U1 | 9/2012 |
| DE | 202017101885 U1 | 5/2017 |
| DE | 202018104374 U1 | 9/2018 |
| DE | 102004023343 | 1/2019 |
| DE | 102017115668 | 1/2019 |
| EP | 1712315 A1 | 10/2006 |
| EP | 1311364 B1 | 12/2006 |
| EP | 1595627 B1 | 4/2008 |
| EP | 2512763 A2 | 10/2012 |
| EP | 2223762 B1 | 7/2015 |
| EP | 3027364 A1 | 6/2016 |
| EP | 3391984 A1 | 10/2018 |
| EP | 3444057 | 2/2019 |
| EP | 3444058 | 2/2019 |
| EP | 3446817 | 2/2019 |
| GB | 2346573 | 8/2000 |
| GB | 2496473 A | 5/2013 |
| GB | 201806455 | 10/2018 |
| GB | 2564944 | 1/2019 |
| GB | 2567053 | 4/2019 |
| GB | 2567056 | 4/2019 |

* cited by examiner

QUICK GRIP POCKET HOLE JIG SYSTEM AND METHOD

CROSS REFERENCE TO RELATED APPLICATIONS

This application claims benefit from U.S. Provisional Application No. 62/797,492 which was filed Jan. 28, 2019, the entirety of which is incorporated herein fully by reference.

FIELD OF THE DISCLOSURE

This disclosure relates generally to jig systems for holding workpieces. More specifically and with out limitation, this disclosure relates generally to an improved drilling jig systems that facilitate faster and/or easier clamping of workpieces.

BACKGROUND OF THE DISCLOSURE

Pocket hole wood joinery involves joining boards by inserting a fastener at an angle through the edge of one workpiece into an adjoining workpiece, thereby joining the two workpieces together. Such joints are commonly used for face frames, cabinet boxes, leg-to-rail joinery in chairs and tables, and so forth. Drill guides or jigs are used to drill the holes through which the fasteners or pocket screws are inserted into the adjoining workpiece.

To facilitate the formation of pocket hole joinery, Applicant, Kreg Tool Company offers a line of pocket hole jigs. These pocket hole jigs are configured to clamp a workpiece in place and help guide a stepped drill bit at an angle into a workpiece thereby forming a pocket hole in the workpiece. The pocket hole formed by this process is configured to receive a screw that is used to screw two workpieces together.

Existing jigs for use forming pocket hole joinery have a variety of configurations and operate in a variety of manners. All of these configurations and manners of operation leave much to be desired. In addition, all of the existing pocket hole jigs available have deficiencies and therefore are not well suited for various applications.

For the reasons stated above, and for other reasons stated below which will become apparent to those skilled in the art upon reading and understanding the disclosure, there is a need in the art for quick grip pocket hole jig system that improves upon the state of the art.

Thus it is an object of at least one embodiment of the disclosure is to provide a quick grip pocket hole jig system that improves upon the state of the art.

Another object of at least one embodiment of the disclosure is to provide a quick grip pocket hole jig system that is easy to use.

Yet another object of at least one embodiment of the disclosure is to provide a quick grip pocket hole jig system that is efficient.

Another object of at least one embodiment of the disclosure is to provide a quick grip pocket hole jig system that can be used with any type of workpiece.

Yet another object of at least one embodiment of the disclosure is to provide a quick grip pocket hole jig system that is cost effective.

Another object of at least one embodiment of the disclosure is to provide a quick grip pocket hole jig system that forms accurate pocket holes.

Yet another object of at least one embodiment of the disclosure is to provide a quick grip pocket hole jig system that is safe to use.

Another object of at least one embodiment of the disclosure is to provide a quick grip pocket hole jig system that has a durable design.

Yet another object of at least one embodiment of the disclosure is to provide a quick grip pocket hole jig system that has a long useful life.

Another object of at least one embodiment of the disclosure is to provide a quick grip pocket hole jig system that provides additional functionality for pocket hole jigs and pocket hole joinery.

Yet another object of at least one embodiment of the disclosure is to provide a quick grip pocket hole jig system that has a wide variety of uses.

Another object of at least one embodiment of the disclosure is to provide a quick grip pocket hole jig system that has a wide variety of applications.

Yet another object of at least one embodiment of the disclosure is to provide a quick grip pocket hole jig system that provides cost savings to a user.

Another object of at least one embodiment of the disclosure is to provide a quick grip pocket hole jig system that is relatively inexpensive.

Yet another object of at least one embodiment of the disclosure is to provide a quick grip pocket hole jig system that provides value.

Another object of at least one embodiment of the disclosure is to provide a quick grip pocket hole jig system that prevents or reduces relative movement between the pocket hole jig and the workpiece.

Yet another object of at least one embodiment of the disclosure is to provide a quick grip pocket hole jig system that reduces the amount of clamping pressure required to adequately clamp a pocket hole jig to a workpiece.

Another object of at least one embodiment of the disclosure is to provide a quick grip pocket hole jig system that facilitates the formation of aesthetically pleasing finished products.

Yet another object of at least one embodiment of the disclosure is to provide a quick grip pocket hole jig system that provides a quick grip clamping mechanism.

Another object of at least one embodiment of the disclosure is to provide a quick grip pocket hole jig system that facilitates easier clamping.

Yet another object of at least one embodiment of the disclosure is to provide a quick grip pocket hole jig system that facilitates angular rotation of a clamping mechanism.

Another object of at least one embodiment of the disclosure is to provide a quick grip pocket hole jig system that facilitates easy release of the clamping mechanism.

Yet another object of at least one embodiment of the disclosure is to provide a quick grip pocket hole jig system that facilitates easy return of the clamping mechanism to a non-clamping position.

Another object of at least one embodiment of the disclosure is to provide a quick grip pocket hole jig system that limits the stroke of the clamping motion for repeat clamping of workpieces of similar thickness.

Yet another object of at least one embodiment of the disclosure is to provide a quick grip pocket hole jig system that facilitates stable placement when used horizontally.

Another object of at least one embodiment of the disclosure is to provide a quick grip pocket hole jig system that that facilitates stable placement when used vertically.

Yet another object of at least one embodiment of the disclosure is to provide a quick grip pocket hole jig system that facilitates easy removal of chips and debris during use.

Another object of at least one embodiment of the disclosure is to provide a quick grip pocket hole jig system that is comfortable to use.

Yet another object of at least one embodiment of the disclosure is to provide a quick grip pocket hole jig system that is more stable than other pocket hole jigs.

Another object of at least one embodiment of the disclosure is to provide a quick grip pocket hole jig system that facilitates automatic return of the clamping assembly to a non-clamping position.

Yet another object of at least one embodiment of the disclosure is to provide a quick grip pocket hole jig system that facilitates spring loaded return of the clamping assembly to a non-clamping position.

Another object of at least one embodiment of the disclosure is to provide a quick grip pocket hole jig system that improves the ergonomics of use.

Yet another object of at least one embodiment of the disclosure is to provide a quick grip pocket hole jig system that easily adjusts to workpieces of various thickness.

Another object of at least one embodiment of the disclosure is to provide a quick grip pocket hole jig system that automatically adjusts to workpieces of various thickness.

Yet another object of at least one embodiment of the disclosure is to provide a quick grip pocket hole jig system that is infinitely adjustable for workpieces of various thickness.

Another object of at least one embodiment of the disclosure is to provide a quick grip pocket hole jig system that facilitates the easy setting of the position of a drill guide assembly.

These and other objects, features, or advantages of at least one embodiment will become apparent from the specification, figures and claims.

BRIEF SUMMARY OF THE INVENTION

A quick grip pocket hole jig system is presented having a support section having a clamp support, an end stop and a back stop. A clamping assembly is connected to the support section having a clamping rod that extends through the clamp support. A drill guide carrier having a drill guide assembly is connected to the clamping rod on a forward side of the clamp support. A clamp body having a trigger and a release mechanism is connected to the clamping rod on a rearward side of the clamp support. The clamp body is a quick grip clamp body that facilitates quick gripping of a workpiece positioned within the support section. The clamping assembly includes a return spring and a release mechanism such that when the release mechanism is actuated the drill guide carrier and the drill guide assembly are automatically moved to a non-clamping position. A stroke limiter is connected to the clamping rod and limits the distance that the clamping rod will move so as to facilitate faster and easier repeat clamping of workpieces of similar size. The clamping assembly facilitates angular rotation of the clamp body around an axis that extends through the center of the clamping rod. The support section facilitates stable placement in horizontal use and vertical use. In this way an improved pocket hole jig is presented.

DETAILED DESCRIPTION

Figure 1:
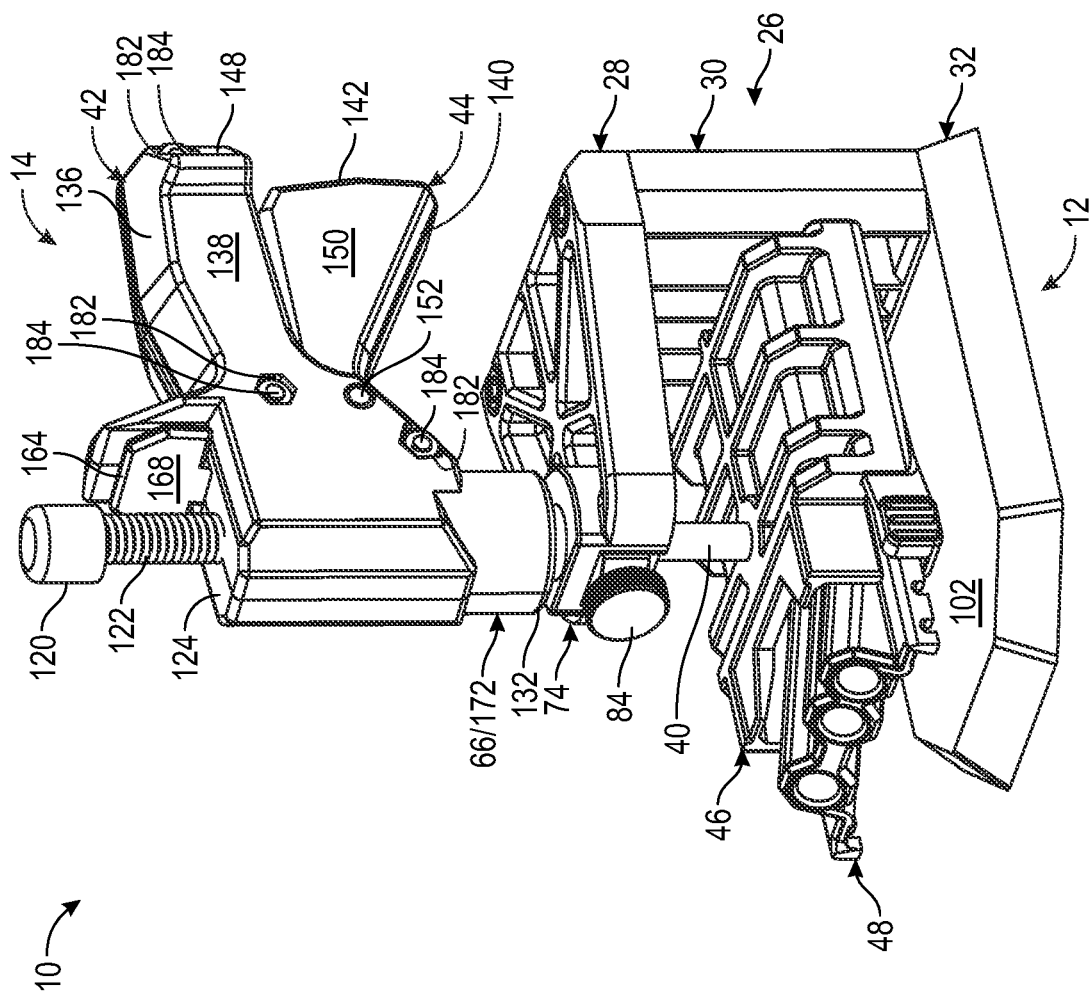
FIG. 1 is a perspective view of a first arrangement of a quick grip pocket hole jig system; the view showing the jig system having a support section having a clamp support, an end stop and a back stop; the view showing the jig system having a clamp assembly having a clamping rod, a clamp body having a handle assembly and a trigger therein; the view showing the jig system having a drill guide carrier connected to the forward end of the clamping rod; the view showing the drill guide carrier receiving a drill guide assembly in an adjustable manner; the view showing the jig system having a stroke limiter positioned along the clamping rod; the view showing the jig system having a release mechanism; the view showing the jig system in a vertical orientation resting upon the forward side of the back stop.
Figure 2:
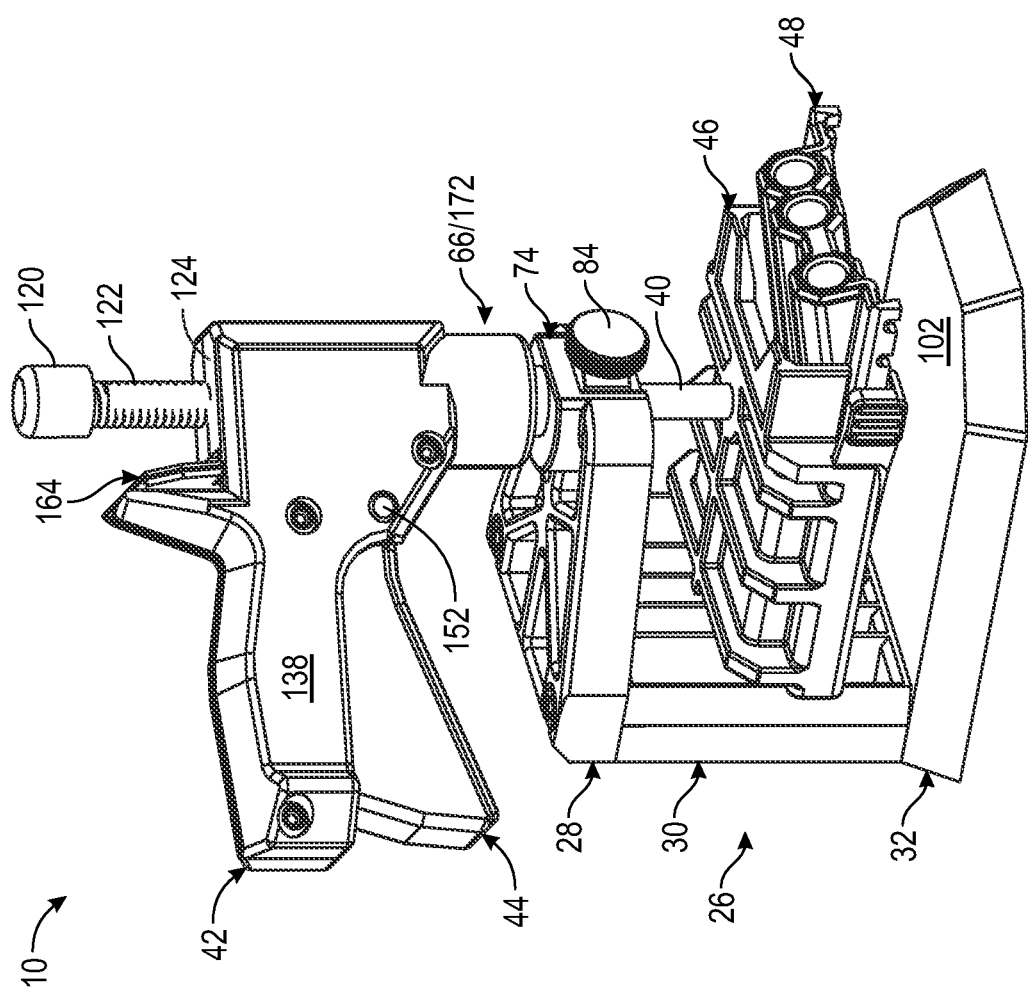
FIG. 2 is another perspective view of the quick grip pocket hole jig system shown in FIG. 1.
Figure 3:
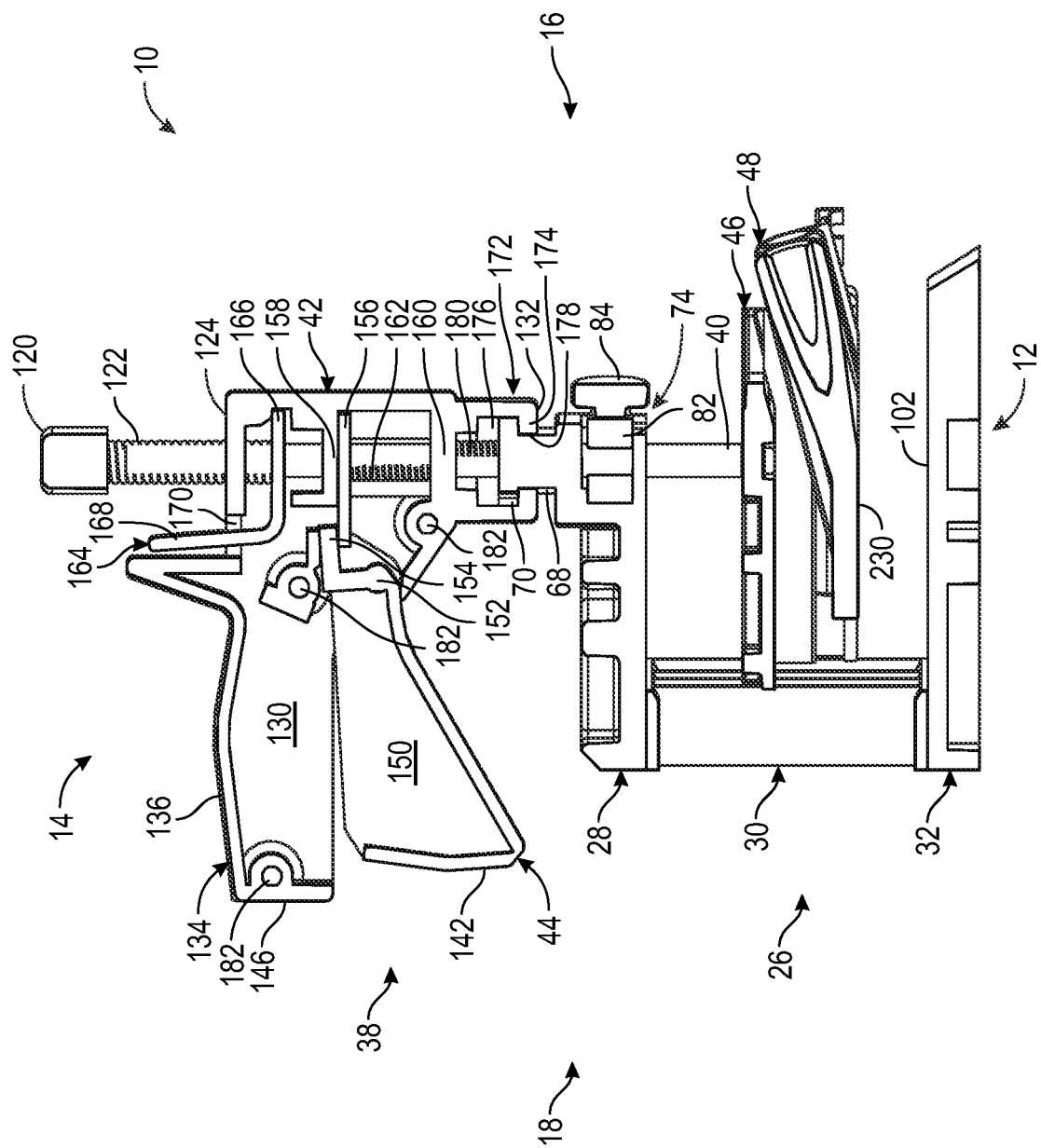
FIG. 3 is a side elevation cut-away section view of the quick grip pocket hole jig system shown in FIG. 1; the view showing the internal components of the clamp assembly; the view showing the movement mechanism positioned around the clamping rod and engaged by the upper end of the trigger; the view showing a plurality of springs positioned around the clamping rod; the view showing the stroke limiter having stop collar placed around the clamping rod and held within the void in the upper end of the clamp support and having a locking mechanism connected thereto.
Figure 4:
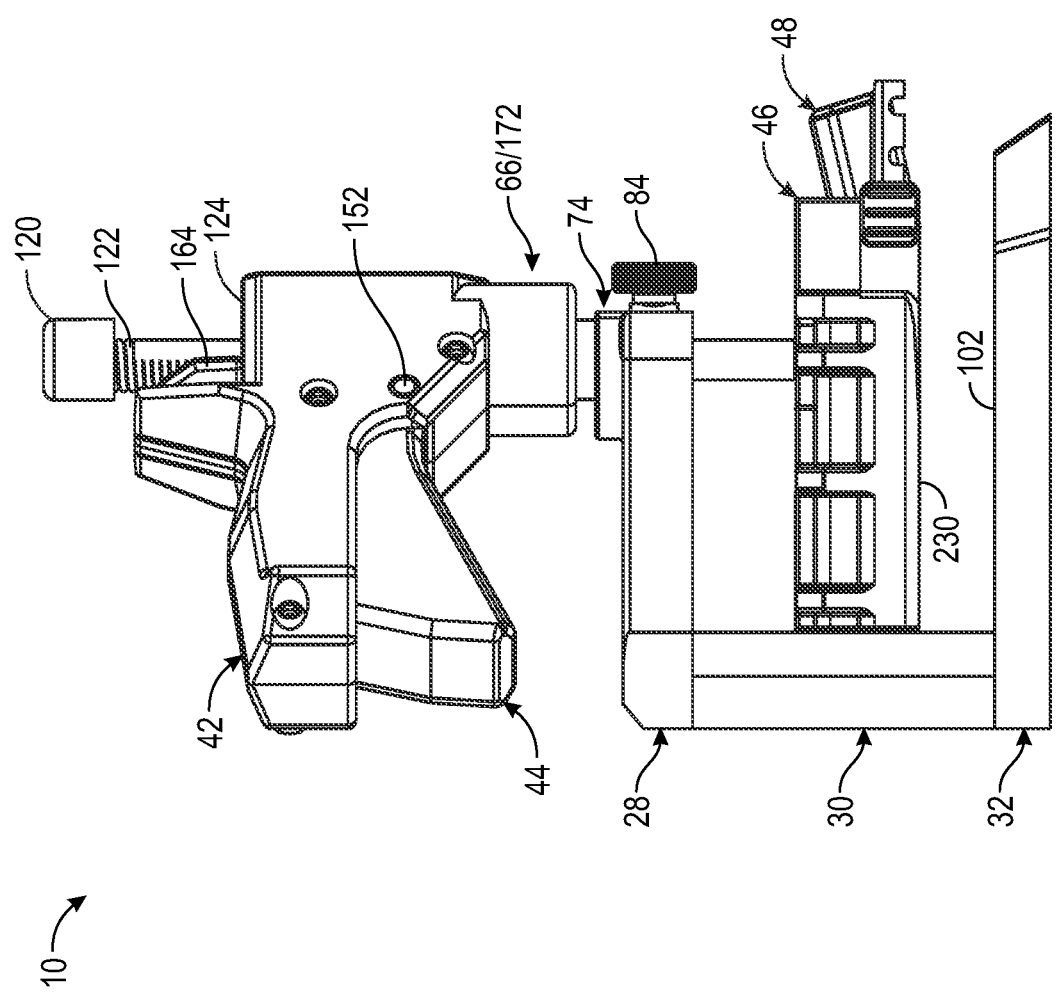
FIG. 4 is a side elevation view of the quick grip pocket hole jig system shown in FIG. 1; the view showing the handle assembly angled relative to the support section.
Figure 5:
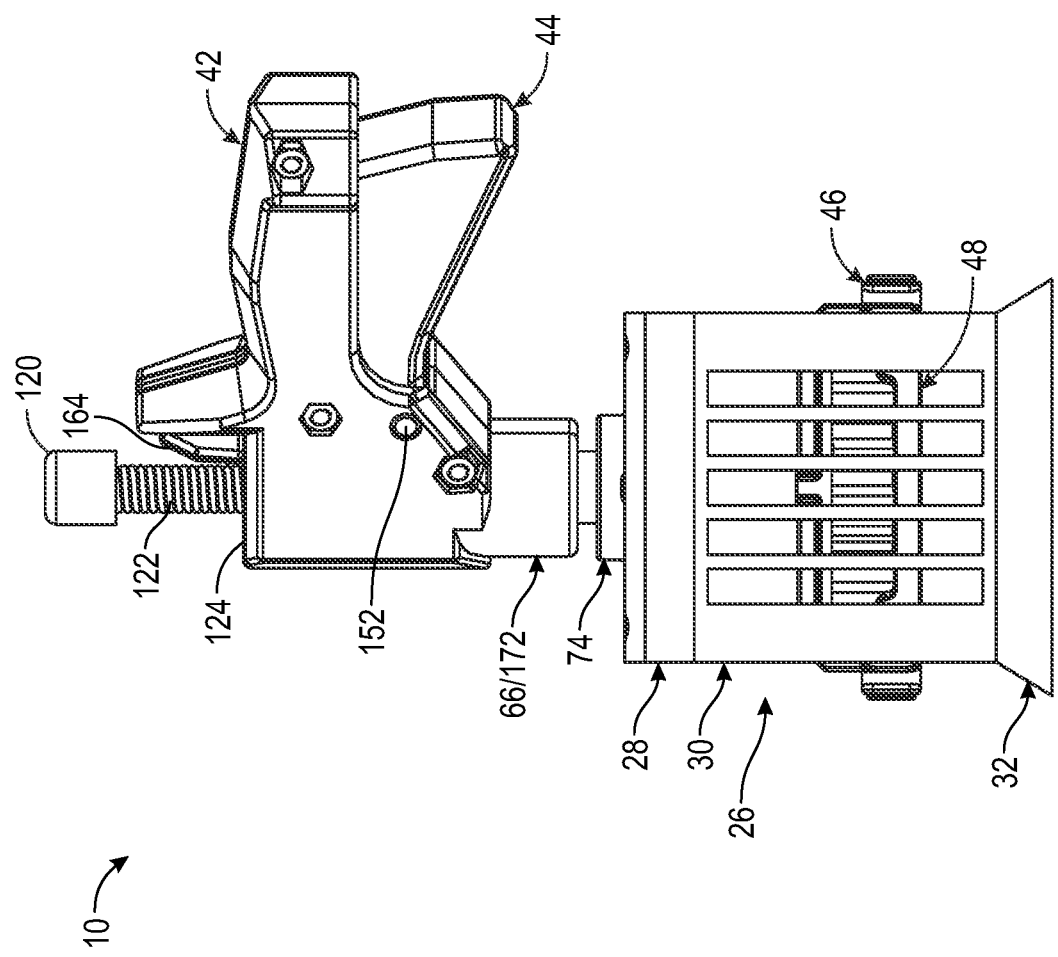
FIG. 5 is a bottom elevation view of the quick grip pocket hole jig system shown in FIG. 1; the view showing the handle assembly angled relative to the support section; the view showing slots in the end stop to allow woodchips to pass through the end stop.
Figure 6:
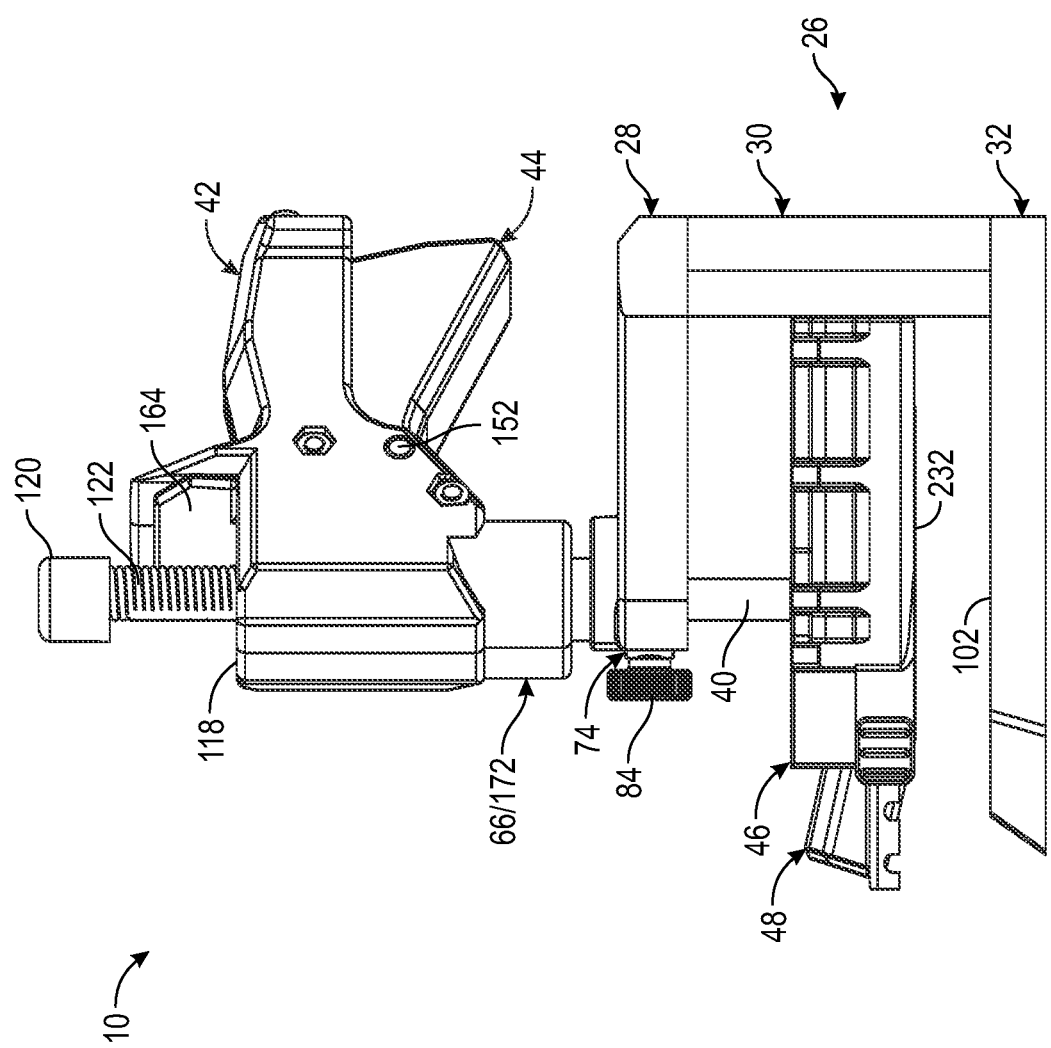
FIG. 6 is another side elevation view of the quick grip pocket hole jig system shown in FIG. 1; the view showing the handle assembly angled relative to the support section.
Figure 7:
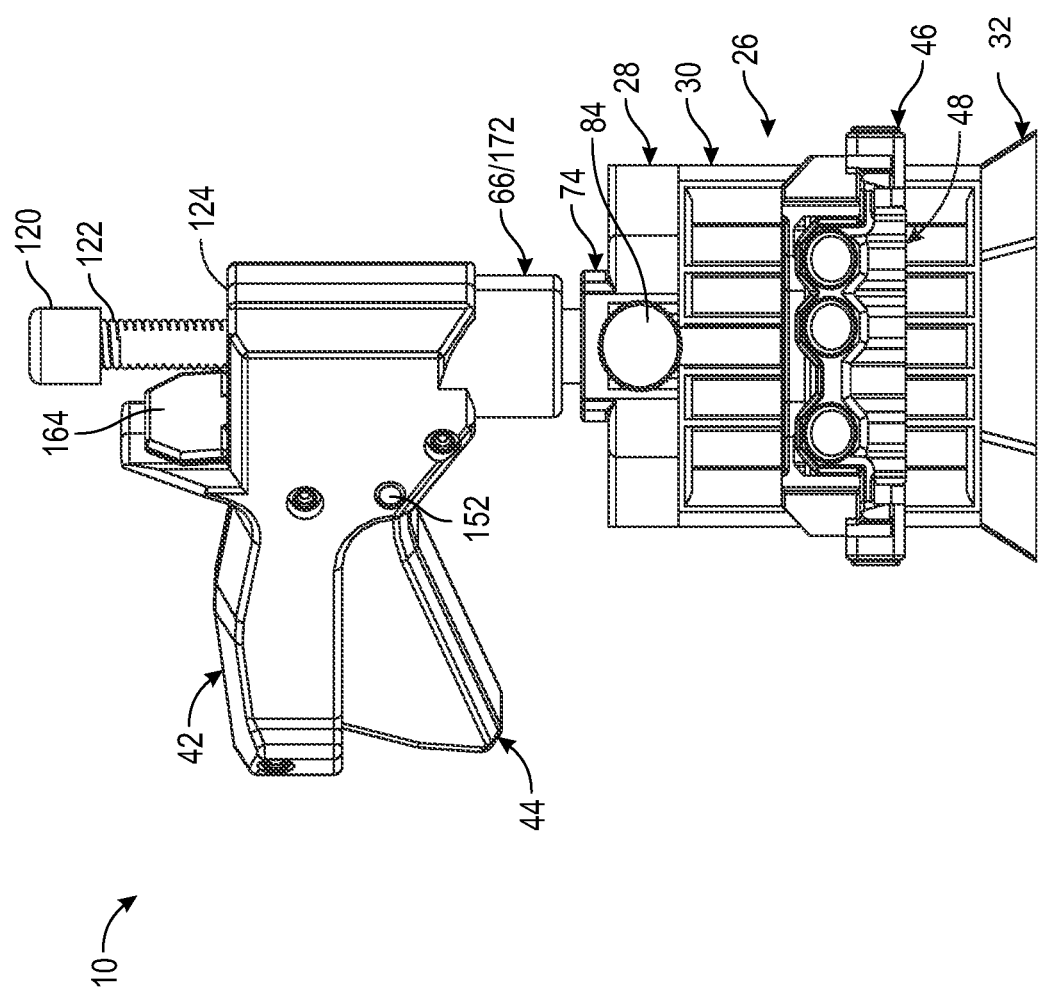
FIG. 7 is a top elevation view of the quick grip pocket hole jig system shown in FIG. 1; the view showing the handle assembly angled relative to the support section.

In the following detailed description of the embodiments, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure. The following detailed description is, therefore, not to be taken in a limiting sense, and the scope of the disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

In addition, it is to be noted, that while the views shown, and disclosure discusses, a pocket hole jig, it is to be understood that use of the improvements disclosed in association with a pocket hole jig is only one of countless examples of use and is not meant to be limiting. Instead, the concepts presented herein are contemplated to be used with any woodworking device and/or any mechanical arrangement and is not meant to be limited to pocket hole jigs.

System 10:

In the arrangement shown, as one example, a quick grip pocket hole jig system 10 (or simply "system 10") is presented. In the arrangement shown, as one example, quick grip pocket hole jig system 10 has a forward end 12, a rearward end 14, a top side 16, a bottom side 18, a left side 20 and a right side 22.

Quick grip pocket hold jig system 10 is formed of any suitable size, shape and design and is configured facilitate quick and easy and secure clamping of workpieces 24 of various thickness as well as various sizes and shapes. In one arrangement, as is shown, quick grip pocket hole jig system 10 includes a support section 26 having a clamp support 28, an end stop 30 and a back stop 32 connected by bolts 34 and nuts 36 among other parts, components, and feature as are described herein. In one arrangement, as is shown, quick grip pocket hole jig system 10 includes a clamp assembly 38 having a clamping rod 40, a clamp body 42 having a trigger 44, a drill guide carrier 46 and a drill guide assembly 48 among other parts, components, and features as are described herein.

Workpiece 24:

In the arrangement shown, as one example, quick grip pocket hole jig system 10 is used to form pocket holes in a workpiece 24. Workpiece 24 may be formed of any suitable size, shape and design. In the arrangement shown, as one example, workpiece 24 is a generally planar shaped piece of material that may be formed of wood, plywood, composite wood, plastic, MFD (medium density fiberboard) or any other material. To be clear, any other non-wood material is hereby contemplated for use as workpiece 24. Workpiece 24 may be a solid piece of wood, or it may be a composite piece of wood or other material. Workpiece 24 may be a large planar member, such as a four-by-eight sheet of plywood, or it may be a narrow and/or small member such as a piece of face-frame, or workpiece 24 may be anything in-between. Work piece 24 may be thick, such as one and a half inches thick, such as a two-by-four, or thicker, or it may be as narrow as half an inch, or thinner. Essentially workpiece 24 may be formed of any size, shape and design and configuration and material.

Support Section 26:

In the arrangement shown, as one example, quick grip pocket hole jig system 10 includes a support section 26. Support section 26 may be formed of any size, shape and design and is configured to receive and hold workpiece 24 therein as well as facilitate attachment of clamp assembly 38 thereto as well as facilitate clamping of workpiece 24. In the arrangement shown, as one example, support section 26 includes a clamp support 28, an end stop 30 and a back stop 32 that are connected to one another by bolts 34 and nuts 36, however any other arrangement and configuration is hereby contemplated for use. In the arrangement shown, as one example, when viewed from a side 20, 22, support section 26 is generally C-shaped or U-shaped and forms a generally square or rectangular hollow interior 50 that is configured to receive workpiece 24 as well as drill guide carrier 46 and drill guide assembly 48 as well as a portion of clamping rod 40.

Clamp Support 28:

In the arrangement shown, as one example, support section 26 includes a clamp support 28. Clamp support 28 may be formed of any suitable size shape and design and is configured enclose a rearward end 14 of the hollow interior 50 of the support section 26 as well as facilitate attachment of the clamp assembly 38 to the support section 26, among other features, purposes and advantages. In the arrangement shown, as one example, when viewed from a side 20, 22, clamp support 28 has a generally flat forward wall 52 and a generally flat rearward wall 54 that extend in approximate parallel spaced relation to one another. In the arrangement shown, as one example, when viewed from a side 20, 22, clamp support 28 includes opposing sidewalls 56 that extend from a lower end 58 to an upper end 60. In the arrangement shown, as one example, sidewalls 56 angle slightly inward toward one another as they extend upward from lower end 58 to upper end 60 such that the upper end 60 of clamp support 28 is narrower than the lower end 58. However any other configuration is hereby contemplated for use.

In one arrangement, clamp support 28 is a generally solid member. In an alternative arrangement, as one example, as is shown, clamp support 28 includes a plurality of structural members 62 that extend across the clamp support 28, or said another way, this configuration is skeletonized. These structural members 62 reduce the amount of material that clamp support 28 is made of while maximizing the strength and rigidity of the clamp support 28.

In the arrangement shown, as one example, clamp support 28 connects adjacent its lower end 58 to end stop 30. In the arrangement shown, as one example, clamp support 28 extends in approximate parallel spaced relation to the back stop 32. In the arrangement shown, as one example, clamp support 28 extends in approximate perpendicular relation to end stop 30.

In the arrangement shown, as one example, a through hole 64 is positioned adjacent the upper end 60 of clamp support 28 and extends through clamp support 28. Through hole 64 is configured to receive clamping rod 40 therein and allow clamping rod 40 to pass there through. In the arrangement shown, as one example, an attachment mechanism 66 is centered on through hole 64 and extends rearward from the rearward side of clamp support 28. Attachment mechanism 66 is formed of any suitable size, shape and design and is configured to facilitate connection of clamp body 42 to support section 26 while allowing for angular rotation of clamp body 42 with respect to support section 26.

In the arrangement shown, as one example, attachment mechanism 66 includes a first collar 68 that extends rearward a distance from rearward side 54 of clamp support 28. In the arrangement shown, as one example, attachment mechanism 66 includes a second collar 70 that extends a distance from the rearward side of first collar 68. In the arrangement shown, as one example, first collar 68 and second collar 70 have a generally cylindrical exterior peripheral edge that is centered on the generally cylindrical through hole 64 with the first collar 68 having a smaller diameter than the second collar 68, which has a larger diameter.

In the arrangement shown, as one example, second collar 70 is generally circular and/or cylindrical in shape and includes a plurality of lock features 72 that are positioned around its exterior circumference. In the arrangement shown, as one example, lock features 72 of second collar 70 are a plurality of notches or grooves the extend inward toward through hole 64 a distance, however protrusions are also hereby contemplated for use. Attachment mechanism 66 facilitates attachment of clamp assembly 38 to support section 26 as well as indexing of clamp body 42 to support section 26.

In the arrangement shown, as one example a stroke limiter 74 is positioned in upper end 60 of clamp support 28. Stroke limiter 74 is formed of any suitable size, shape and design and is configured to limit the stroke of drill guide carrier 46 and drill guide assembly 48 when the clamping assembly 38 is released. Or, said another way, stroke limiter 74 is configured to limit how far back the drill guide carrier 46 and drill guide assembly 48 move toward the non-clamping position when the clamping assembly 38 is released. In this way, the presence of the stroke limiter 74 reduces the amount of movement of the drill guide carrier 46 and drill guide assembly 48 when the clamp assembly 38 is released.

In the arrangement shown, as one example, stroke limiter 74 is generally centered on through hole 64 and includes a forward wall 76 that is positioned in approximate parallel spaced relation to rearward wall 78 that form a void 80 there between. A stop collar 82 is configured to be positioned within void 80. Stop collar 82 is formed of any suitable size, shape and design and is configured to be positioned around clamping rod 40 and lock to clamping rod 40 by locking mechanism 84. In the arrangement shown, as one example, stop collar 82 is a generally cylindrical member having a generally cylindrical exterior surface with a generally cylindrical through hole that fits around clamping rod 40. In the arrangement shown, as one example, stop collar 82 includes a generally flat forward wall and a generally flat rearward wall the extend in approximate parallel spaced relation to one another. The forward wall of stop collar 82 is configured to be adjacent the interior surface of forward wall 76 of stroke limiter 74 in a fully forward position, and the rearward wall of stop collar 82 is configured to be adjacent the interior surface of rearward wall 78 of stroke limiter 74 in a fully rearward position.

In the arrangement shown, as one example stroke limiter 74 includes a locking mechanism 84 that is a lock screw that is configured to be loosened and tightened against the clamping rod 40 thereby locking the position of the stop collar 82 relative to the clamping rod 40. The width of stop collar 82, between its forward wall and its rearward wall is slightly narrower than the distance between the interior surface of forward wall 76 and the interior surface of rearward wall 78. This difference in the width of void 80 and the width of stop collar 82 defines the amount of movement or travel stroke limiter 74 will allow between a fully forward (of clamped position) and a fully rearward (non-clamped or released position).

In one arrangement, stop collar 82 includes flat sidewalls 83 on each opposing side of stop collar 82. These flat sidewalls 83 are configured to maintain the orientation of stop collar 82 when it is positioned within void 80 so as to ensure that locking mechanism 84 protrudes outward from the center of stroke limiter 74

In the arrangement shown, as one example, in normal operation stop collar 82 is loose and not affixed to clamping rod 40. This allows the full travel of drill guide carrier 46 and drill guide assembly 48 between clamp support 28 and back stop 32. When clamping multiple workpieces 24 of similar thickness, stop collar 82 is set in place and tightened to clamping rod 40 when the pocket hole jig system 10 is clamping a workpiece 24 (that is similarly sized to the next workpieces 24 that are to be clamped). More specifically, stop collar 82 is set in place when the forward side of stop collar 82 is near or against the rearward side of forward wall 76, which defines the forward most position of drill guide carrier 46 and drill guide assembly 48. In the arrangement shown, as one example, when stop collar 82 is set in place and tightened to clamping rod 40, when the rearward side of stop collar 82 is near or against the forward side of rearward wall 78 the rearward most position of drill guide carrier 46 and drill guide assembly 48 is also set.

That is, once clamping assembly 38 is released, the spring loaded bias of clamp assembly 38 automatically moves the drill guide carrier 46 and drill guide assembly 48 rearward. This rearward motion stops when the rearward side of stop collar 82 engages the forward side of rearward wall 78. If stroke limiter 74 were not present or engaged, when clamping assembly 38 is released drill guide carrier 46 and drill guide assembly 48 would move all the way rearward to the fully non-clamping position. This means, the next time a workpiece 24 of similar thickness is to be clamped, the drill guide carrier 46 and drill guide assembly 48 would have to be advanced all of that distance.

However, with stroke limiter 74 present and engaged, when clamping assembly 38 is released drill guide carrier 46 and drill guide assembly 48 only move rearward until the rearward side of stop collar 82 engages the forward side of rearward wall 78 of stroke limiter 74. In this way, stroke limiter 74 limits how far rearward the drill guide carrier 46 and drill guide assembly 48 can move thereby speeding the ability to clamp multiple workpieces 24 of similar thickness. This avoids having to move the drill guide carrier 46 and drill guide assembly 48 all the way from the fully non-clamping position to the clamping position for multiple workpieces 24 of similar thickness. This makes use of the pocket hole jig system 10 easier and faster for drilling workpieces 24 of similar thickness, which is often the case for users of pocket hole jigs.

In the arrangement shown, the lower end 58 of clamp support 28 includes a pair of holes 74 that are configured to receive bolts 34 that pass there through so as to facilitate attachment of clamp support 28 to end stop 30.

End Stop 30:

In the arrangement shown, as one example, support section 26 includes an end stop 30. End stop 30 may be formed of any suitable size shape and design and is configured enclose a bottom side 18 of the hollow interior 50 of the support section 26 between clamp support 28 and back stop 32 as well as facilitate attachment of the clamp support 28 to back stop 32, among other features, purposes and advantages.

In the arrangement shown, as one example, when viewed from a side 20, 22, end stop 30 has a generally flat forward wall 88 and a generally flat rearward wall 90 that extend in approximate parallel spaced relation to one another. In the arrangement shown, as one example, when viewed above or below, end stop 30 includes opposing sidewalls 92 that extend in approximate parallel spaced relation to one another between opposing clamp support 28 and back stop 32. In the arrangement shown, as one example, when viewed from a side 20, 22, end stop 30 includes an opposing lower surface 94 and upper surface 96 that extend in approximate parallel spaced relation to one another, each of which form a generally flat plane. In the arrangement shown, as one example, end stop 30 is a generally square or rectangular member when viewed from above or below. In the arrangement shown, as one example, end stop 30 is a generally square or rectangular member when viewed from a side 20, 22. That is, opposing forward wall 88 and rearward wall 90 extend in approximate parallel spaced relation to one another, and extend in approximate perpendicular relation to the sidewalls 92, and extend in approximate perpendicular relation to opposing lower surface 94 and upper surface 96. In this way a generally square or rectangular member is formed.

In the arrangement shown, as one example, lower surface 94 is generally flat and extends in approximate perpendicular alignment to the planes formed by clamp support 28 and back stop 32. In this way, the flat plane formed by lower surface 94 provides a stable platform for the system 10 to rest on when jig 10 is used in a horizontal manner.

In the arrangement shown, as one example, upper surface 96 is generally flat and extends in approximate perpendicular alignment to the planes formed by clamp support 28 and back stop 32. In this way, the flat plane formed by upper surface 96 provides a stable platform for the end of workpiece 24 to rest upon when being clamped in support section 26.

In one arrangement, end stop 30 is a generally solid member. In an alternative arrangement, as one example, as is shown, back stop 32 includes a plurality of slots 98 therein. These slots 98 are configured to allow woodchips, dust and debris generated during drilling to fall into or through back stop 32 so as to not interfere with placement of another workpiece 24 within support section 26 and so as to not interfere during the drilling process and/or so as to be removed with a dust collection device, such as a snout connected to a vacuum or the like. In the arrangement shown, as one example, slots 98 extend all the way through the thickness of end stop 30, however partial grooves are hereby contemplated. In the arrangement shown, as one example, slots 98 extend the majority of the length of end stop 30 between its forward end 88 and rearward end 90 and extend in parallel spaced relation to sidewalls 92. However any other size, shape or design is hereby contemplated for use as slots 98 that allow woodchips, dust and debris generated during drilling to exit the drilling area, this may include a plurality of holes, a grid pattern framework of supports, or any other form of opening or openings in end stop 30.

In the arrangement shown, as one example, sidewalls 92 angle inward slightly beginning at about their midpoint as they extend from lower surface 94 to upper surface 96. Also, in the arrangement shown, as one example, slots 98 angle outwardly slightly as they extend upward from lower surface 94 to upper surface 96. In this way, adjacent slots 98 are only separated from one another by narrow strips of material of end stop 30.

In the arrangement shown, as one example bolts 34 pass through the end stop 30 adjacent the outward sidewalls 92 of end stop 30 thereby connecting end stop 30 on one end (rearward wall 90) to clamp support 28, and on the opposite end (forward wall 88) to back stop 32.

Back Stop 32:

In the arrangement shown, as one example, support section 26 includes a back stop 32. Back stop 32 may be formed of any suitable size shape and design and is configured enclose a forward end of the hollow interior 50 of the support section 26 opposite clamp support 28 and adjacent end stop 30 as well as facilitate a surface upon which workpiece 24 may be pressed against by clamp assembly 38, among other features, purposes and advantages.

In the arrangement shown, as one example, when viewed from a side 20, 22, back stop 32 has a generally flat forward wall 100 and a generally flat rearward wall 102 that extend in approximate parallel spaced relation to one another. In the arrangement shown, as one example, when viewed above or below, end stop 30 includes opposing sidewalls 92. Opposing sidewalls 92 extend in approximate parallel spaced relation to one another as they extend from lower end 106 to upper end 108. However, opposing sidewalls 92 angle inward toward one another slightly as they extend from forward wall 100 to rearward wall 102. This inward angle provides a larger surface area for forward wall 100 and thereby increases stability of system 10 when used in a vertical orientation. This inward angle also helps to guide workpieces 24 into the hollow interior 50 of support section 26.

In the arrangement shown, as one example, when viewed from a side 20, 22, back stop 32 includes an opposing lower surface 106 and upper surface 108 that extend in approximate parallel spaced relation to one another. However, in the arrangement shown, upper end 108 angles slightly inward as it extends from forward wall 100 to rearward wall 102. This inward angle helps to guide workpieces 24 into the hollow interior 50 of support section 26. Also, in the arrangement shown, as one example, angled corner sections 110 are positioned at the intersection of sidewalls 104 and upper end 108. Like sidewalls 104 and upper end 108, these angled corner sections 110 angle slightly inward as they extend from forward wall 100 to rearward wall 102. This inward angle helps to guide workpieces 24 into the hollow interior 50 of support section 26. In the arrangement shown, as one example, back stop 32 is a generally square or rectangular member with the addition of the angled sections described herein. In the arrangement shown, as one example, end stop 30 is a generally square or rectangular member when viewed from a side 20, 22. That is, opposing forward wall 100 and rearward wall 102 extend in approximate parallel spaced relation to one another, and extend in approximate perpendicular relation to the sidewalls 104, and extend in approximate perpendicular relation to opposing lower end 106 and upper end 108.

In the arrangement shown, as one example, lower end 106 is generally flat and extends in approximate perpendicular alignment to the planes formed by forward wall 100 and rearward wall 102 of back stop 32. In the arrangement shown, as one example the flat plane formed by lower end 106 is positioned in approximate parallel planar alignment to the planes formed by the lower surface 94 of end stop 30 as well as the plane formed by the lower end 58 of clamp support 28. In this way, the flat plane formed by the combination of the lower end 106 of back stop 32, the lower surface 94 of end stop 30 and the lower end 58 of clamp support 28 provides an elongated flat planar surface that provides a stable platform for the system 10 to rest on when jig 10 is used in a horizontal manner.

In one arrangement, end stop 30 is a generally solid member with flat and solid forward wall 100 and rearward wall 102. In an alternative arrangement, as one example, as is shown, end stop 30 includes a plurality structural members 112 that extend across back stop 32 or said another way, this configuration is skeletonized. These structural members 112 reduce the amount of material that back stop 32 is made of while maximizing the strength and rigidity of the back stop 32.

In the arrangement shown, as one example bolts 34 to pass through holes 114 in back stop 32 adjacent the outward sidewalls 104 of back stop 32 thereby connecting back stop 32 to forward wall 88 of end stop 30. In one arrangement, holes 114 receive and hold nuts 36 therein that themselves engage the ends of bolts 34 in threaded engagement thereby locking clamp support 28, end stop 30 and back stop 32 in engagement with one another. In addition, the addition of metallic bolts extending through clamp support 28, end stop 30 and back stop 32 provides additional strength and rigidity to support section 26. In one arrangement, in addition to bolting clamp support 28, end stop 30 and back stop 32 to one another other attachment manners, methods and means may be used instead of or in addition to bolting such as the use of snap fit features, gluing, welding, adhering and/or by connecting the components in any other way.

In this way, support section 26 is formed of clamp support 28, end stop 30 and back stop 32 to form a generally U-shaped or C-shaped member when viewed from a side 20, 22. Support section 26 may be formed of any other suitable size, shape and design. In an alternative arrangement, support section 26 may be formed of a solid unitary and monolithic member such as through molding, casting or machining or the like.

Figure 46:
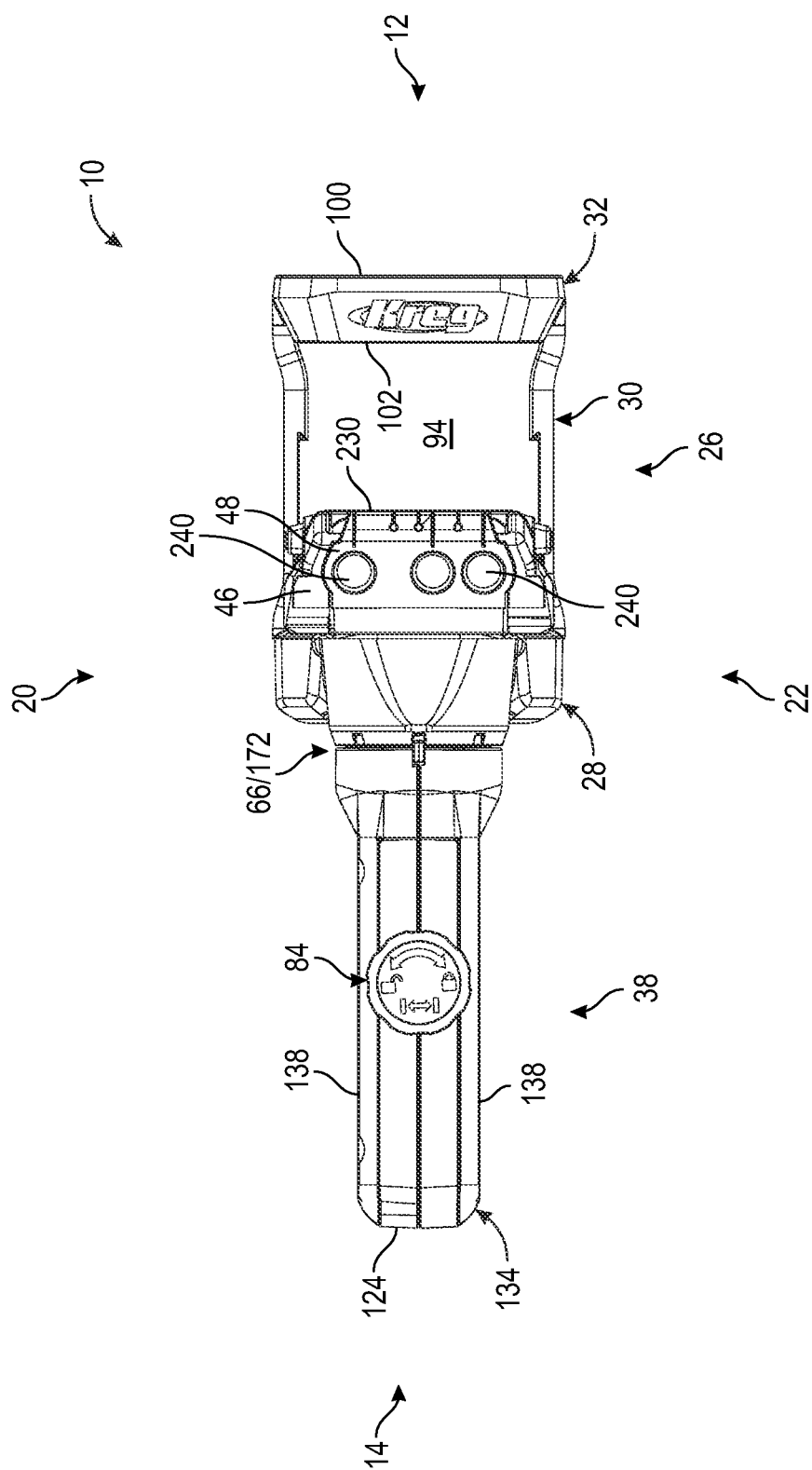
FIG. 46 is top elevation view of a second arrangement of a quick grip pocket hole jig system shown in FIG. 42.
Figure 47:
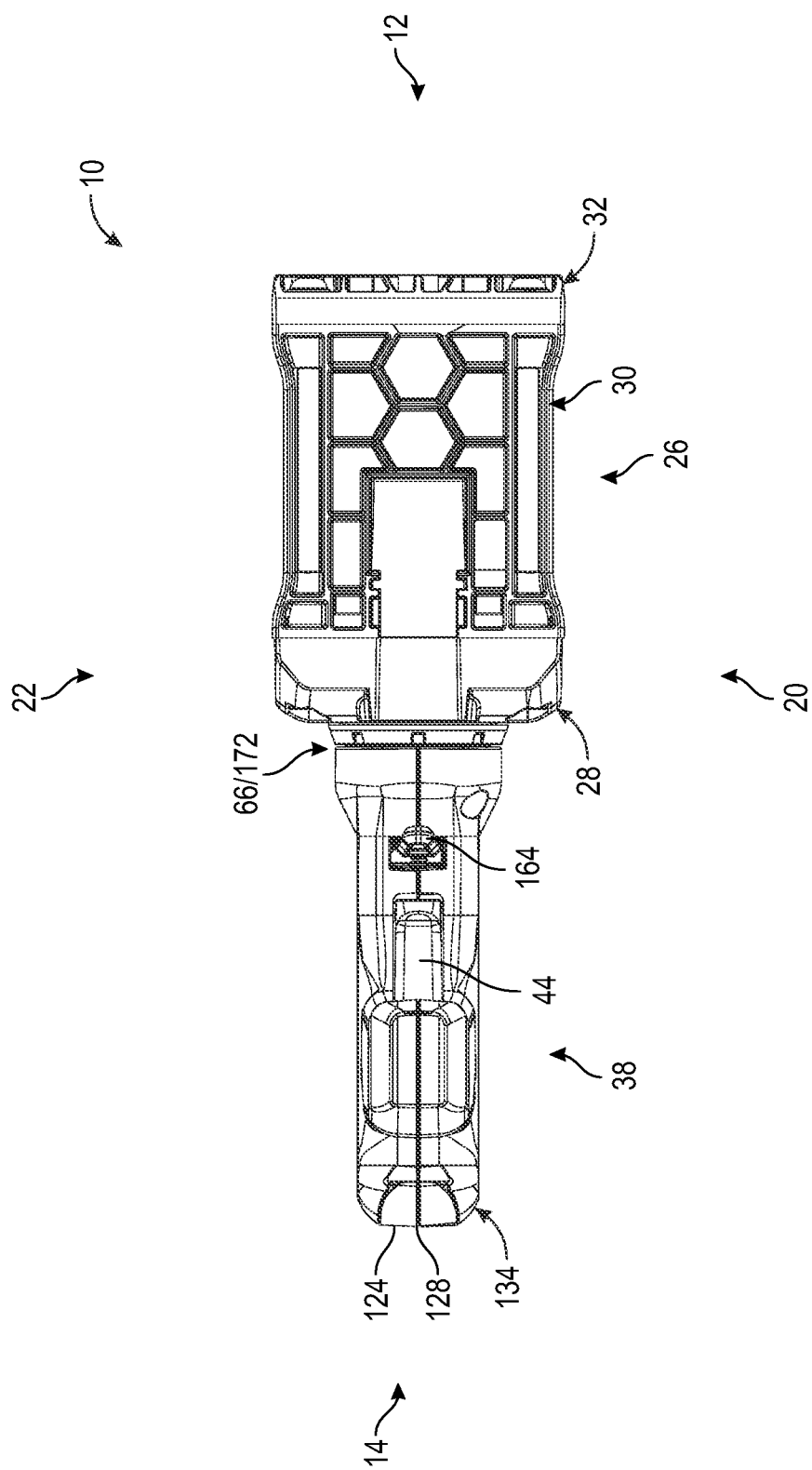
FIG. 47 is bottom elevation view of a second arrangement of a quick grip pocket hole jig system shown in FIG. 42.
Figure 48:
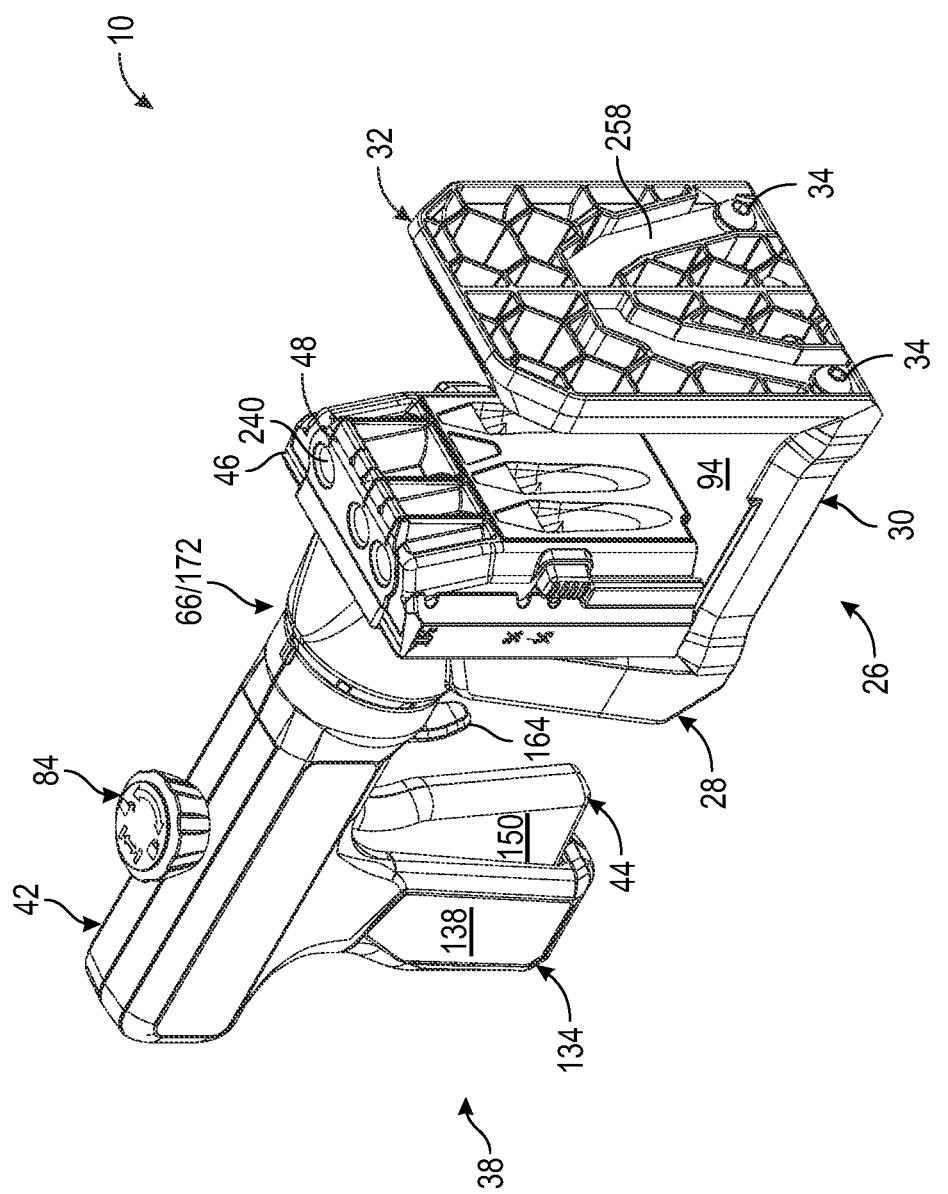
FIG. 48 is a perspective view of a second arrangement of a quick grip pocket hole jig system shown in FIG. 42.
Figure 49:
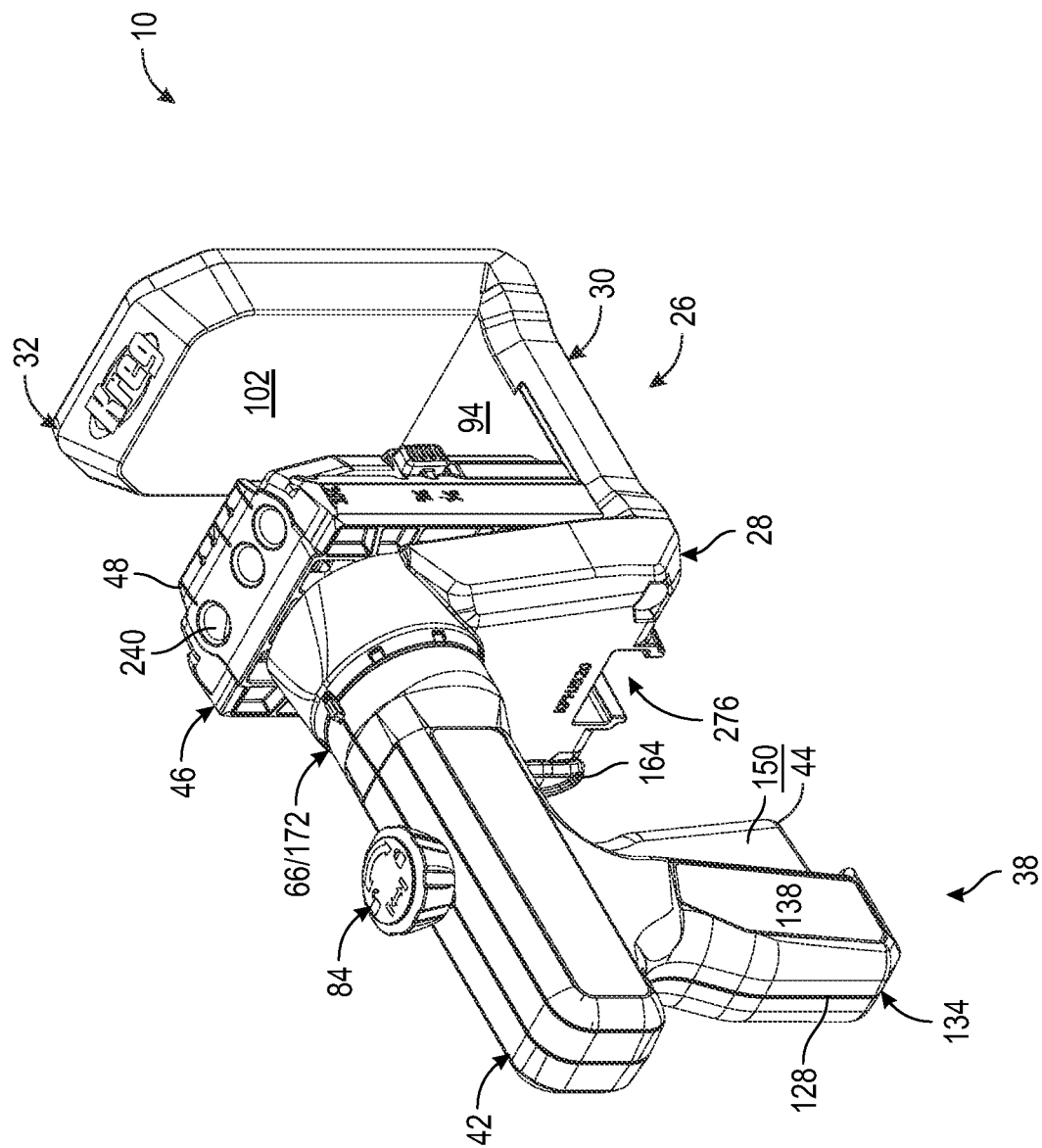
FIG. 49 is another perspective view of a second arrangement of a quick grip pocket hole jig system shown in FIG. 42.
Figure 50:
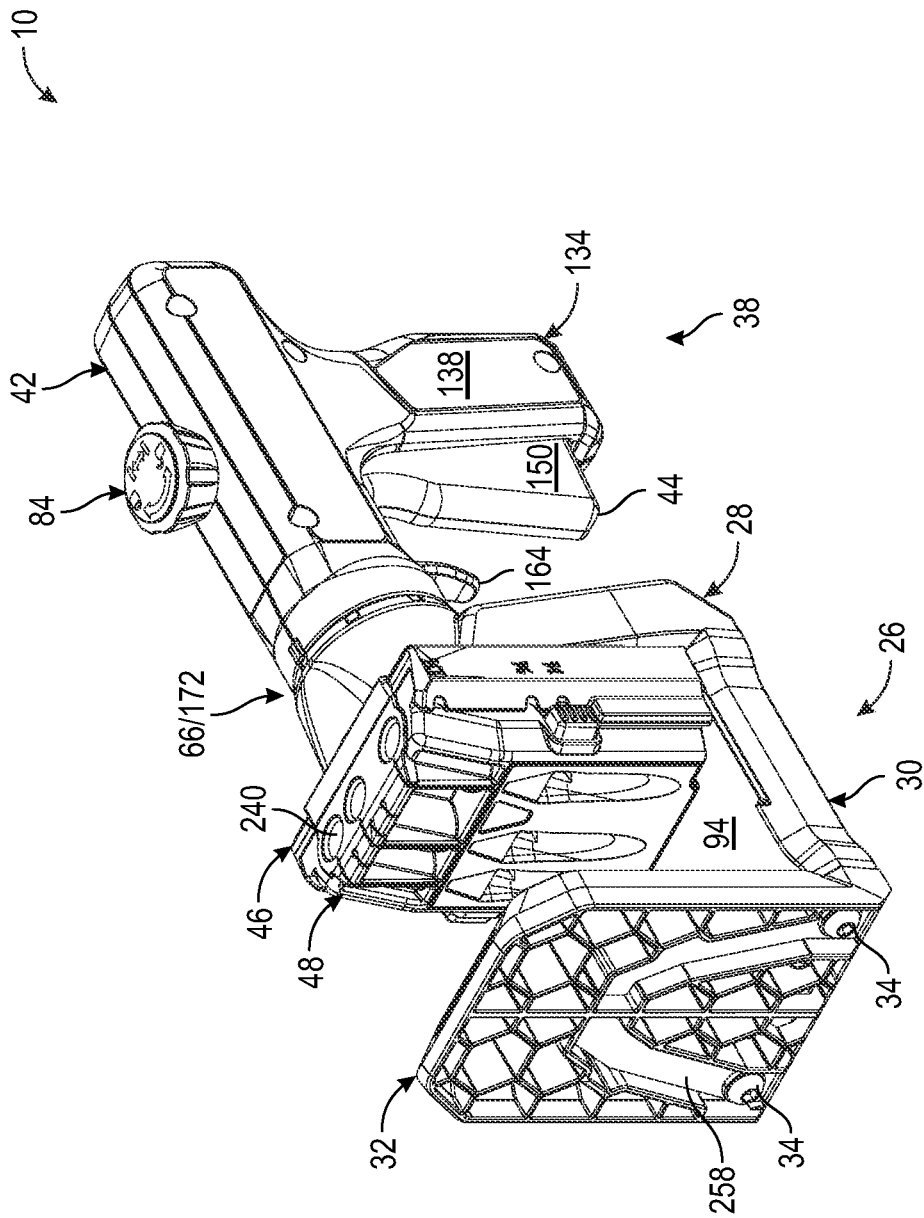
FIG. 50 is another perspective view of a second arrangement of a quick grip pocket hole jig system shown in FIG. 42.
Figure 51:
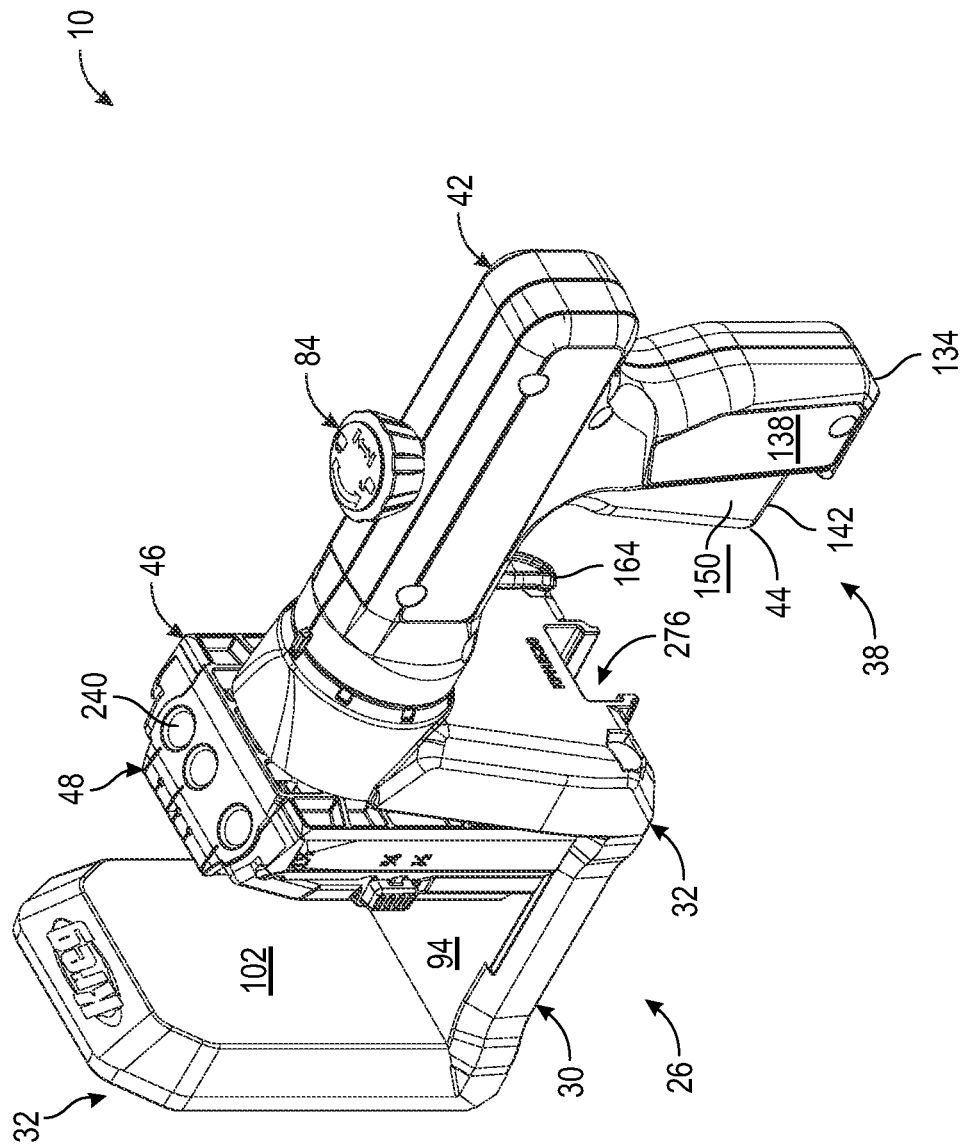
FIG. 51 is another perspective view of a second arrangement of a quick grip pocket hole jig system shown in FIG. 42.
Figure 52:
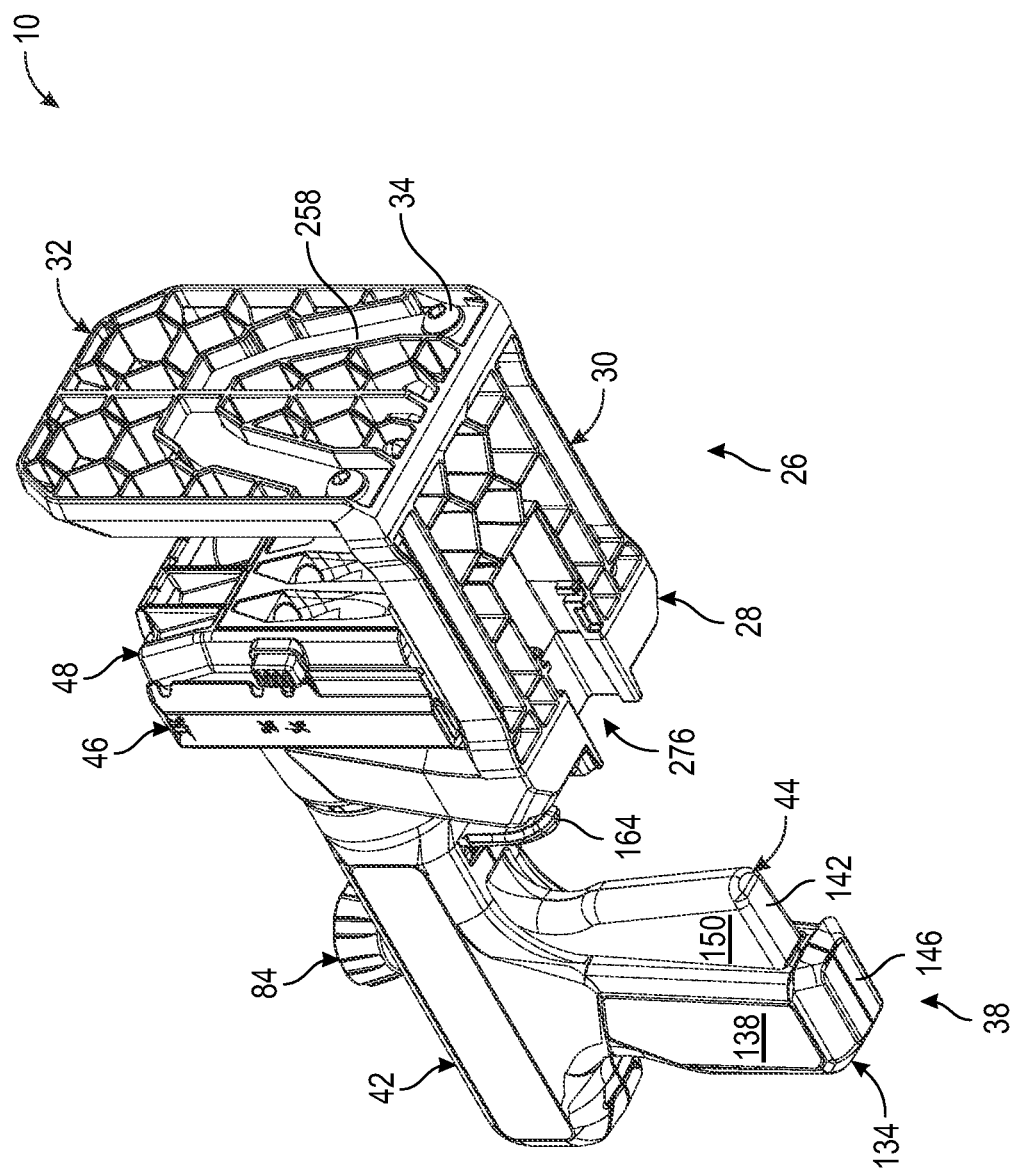
FIG. 52 is another perspective view of a second arrangement of a quick grip pocket hole jig system shown in FIG. 42.
Figure 53:
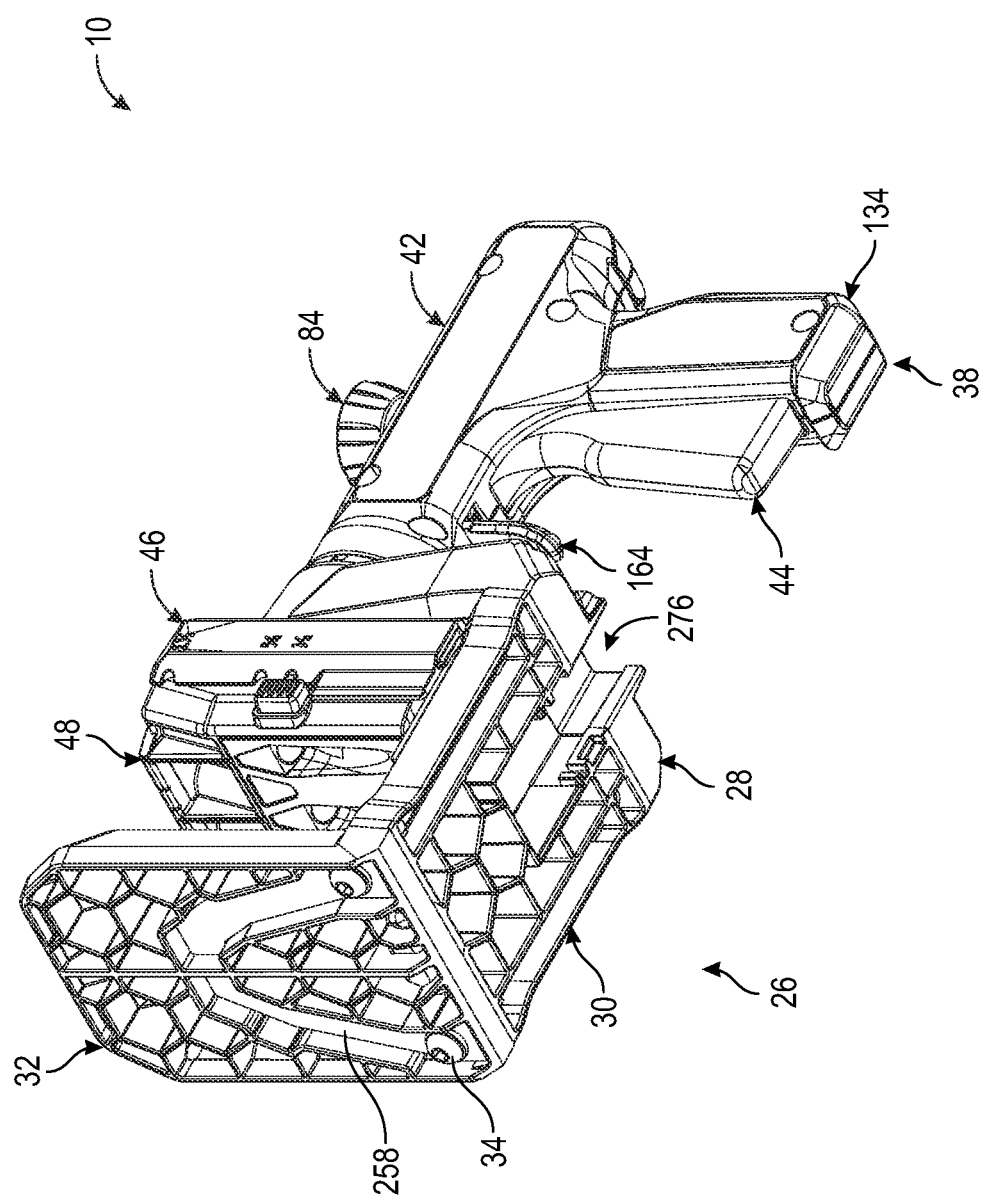
FIG. 53 is another perspective view of a second arrangement of a quick grip pocket hole jig system shown in FIG. 42.
Figure 54:
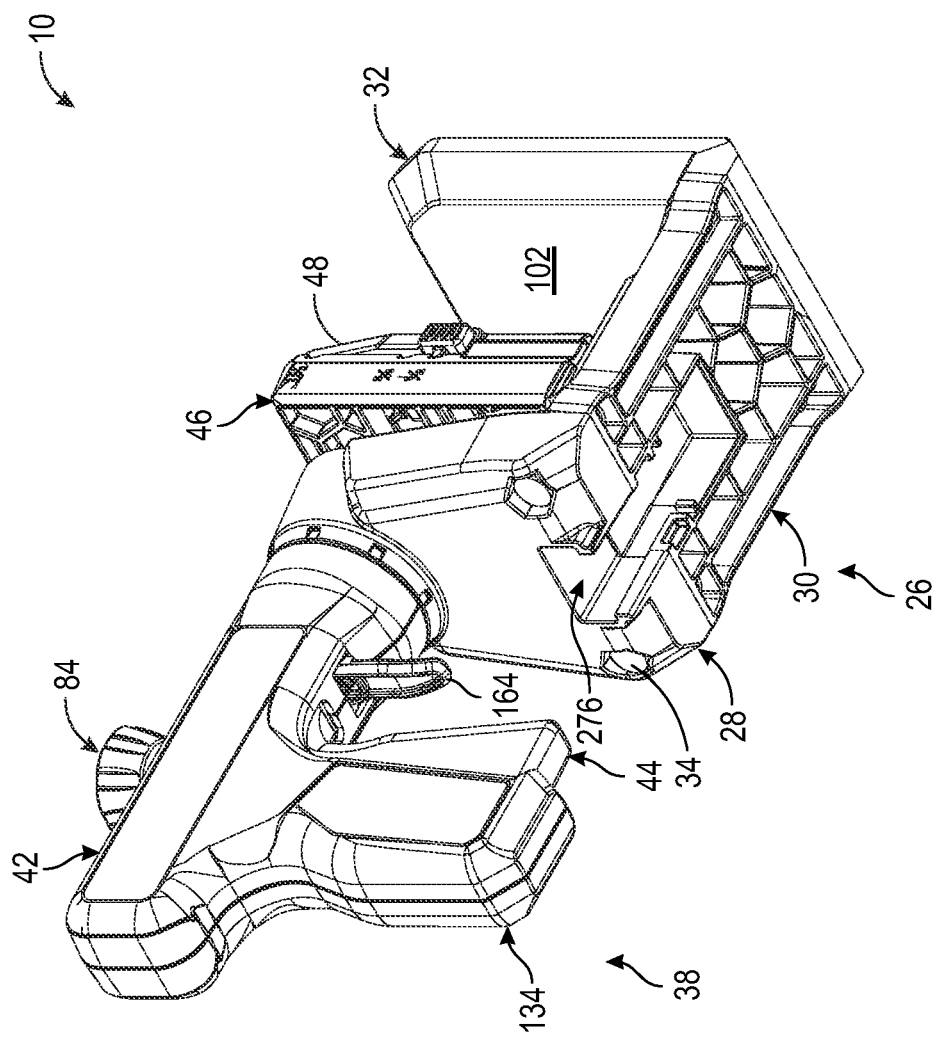
FIG. 54 is another perspective view of a second arrangement of a quick grip pocket hole jig system shown in FIG. 42.
Figure 55:
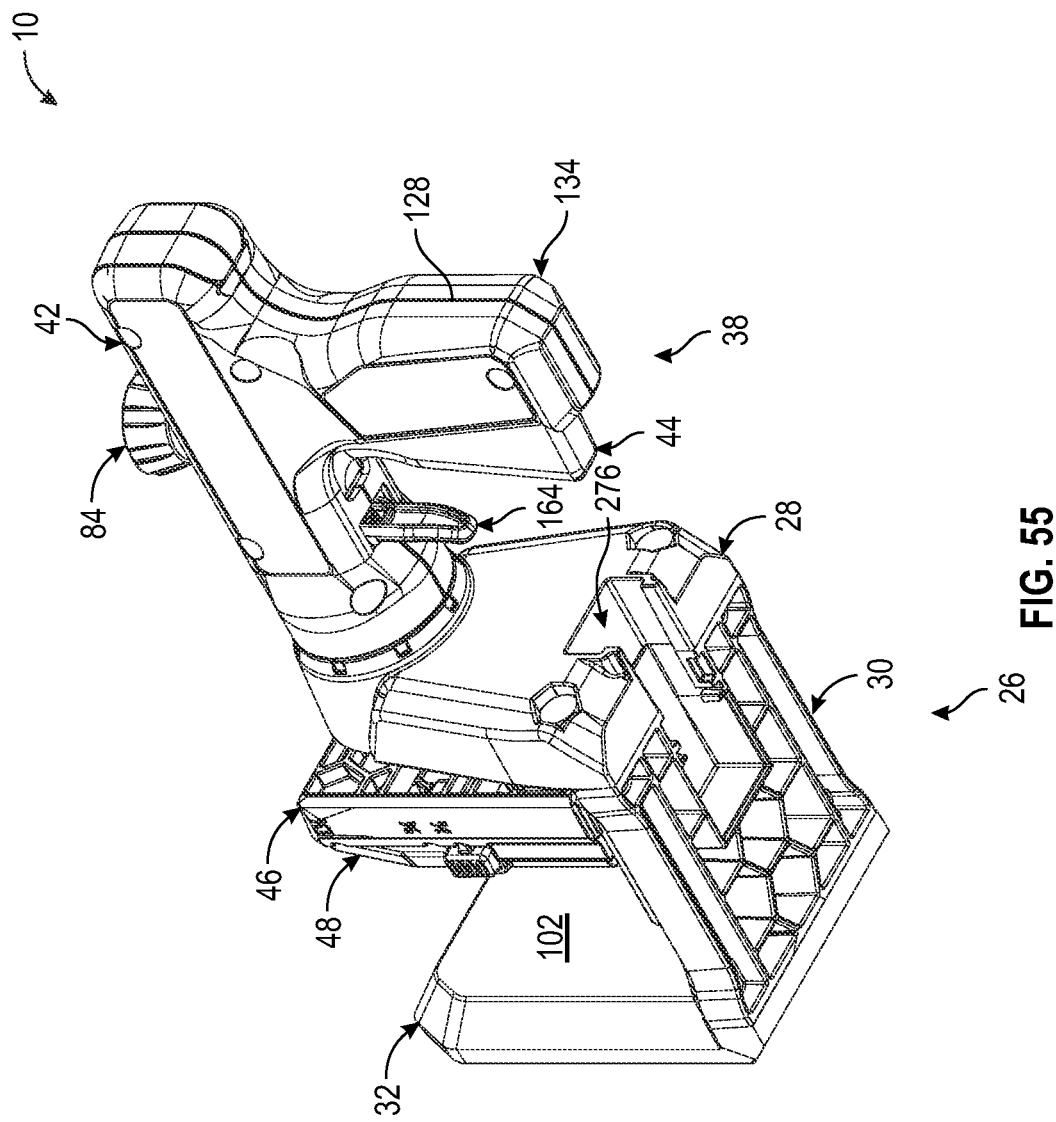
FIG. 55 is another perspective view of a second arrangement of a quick grip pocket hole jig system shown in FIG. 42.
Figure 56:
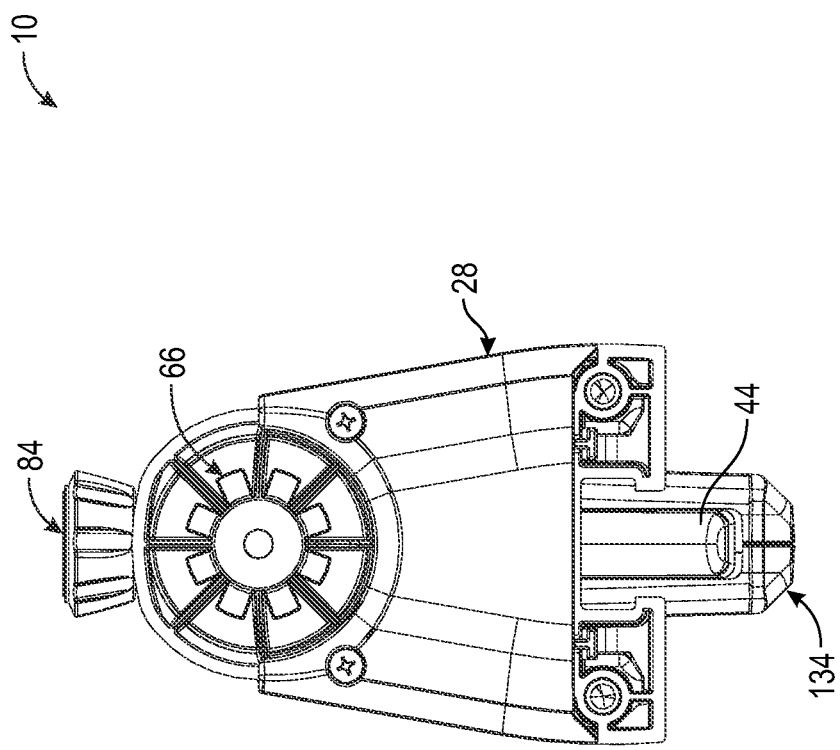
FIG. 56 is front elevation view of the support section of a second arrangement of a quick grip pocket hole jig system shown in FIG. 42; the view showing the support section having an attachment mechanism having a plurality of lock features therein that facilitate indexing of the angular orientation of the handle assembly relative to the support section.
Figure 57:
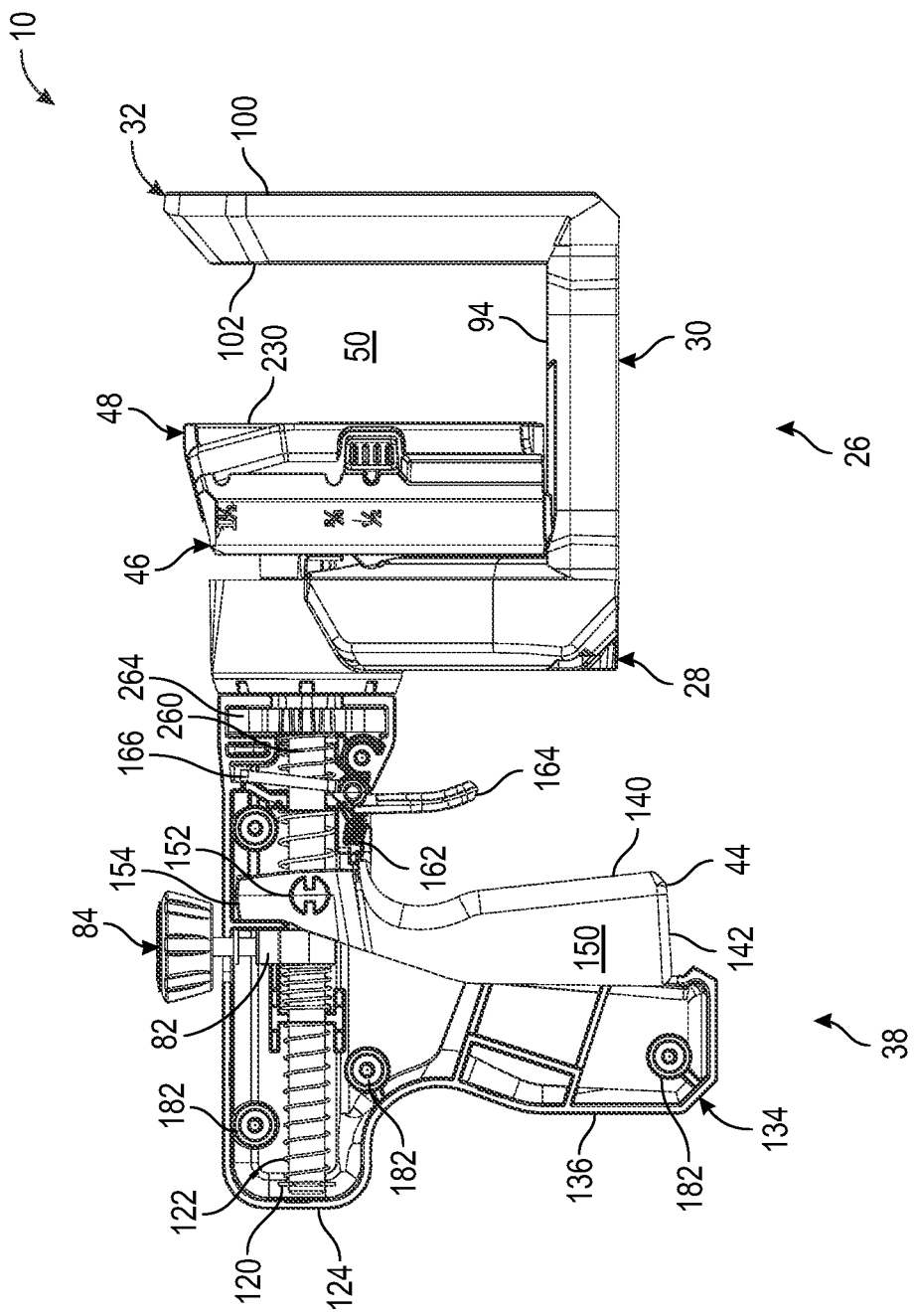
FIG. 57 is a side elevation cut-away section view of a second arrangement of a quick grip pocket hole jig system shown in FIG. 42; the view showing the internal components of the clamp assembly; the view showing the movement mechanism positioned around the clamping rod and engaged by the upper end of the trigger; the view showing a plurality of springs positioned around the clamping rod; the view showing the stroke limiter having stop collar placed around the clamping rod and held within the void in the clamp assembly between opposing stops and having a locking mechanism connected thereto that extends out of the upper surface of the clamp assembly.
Figure 58:
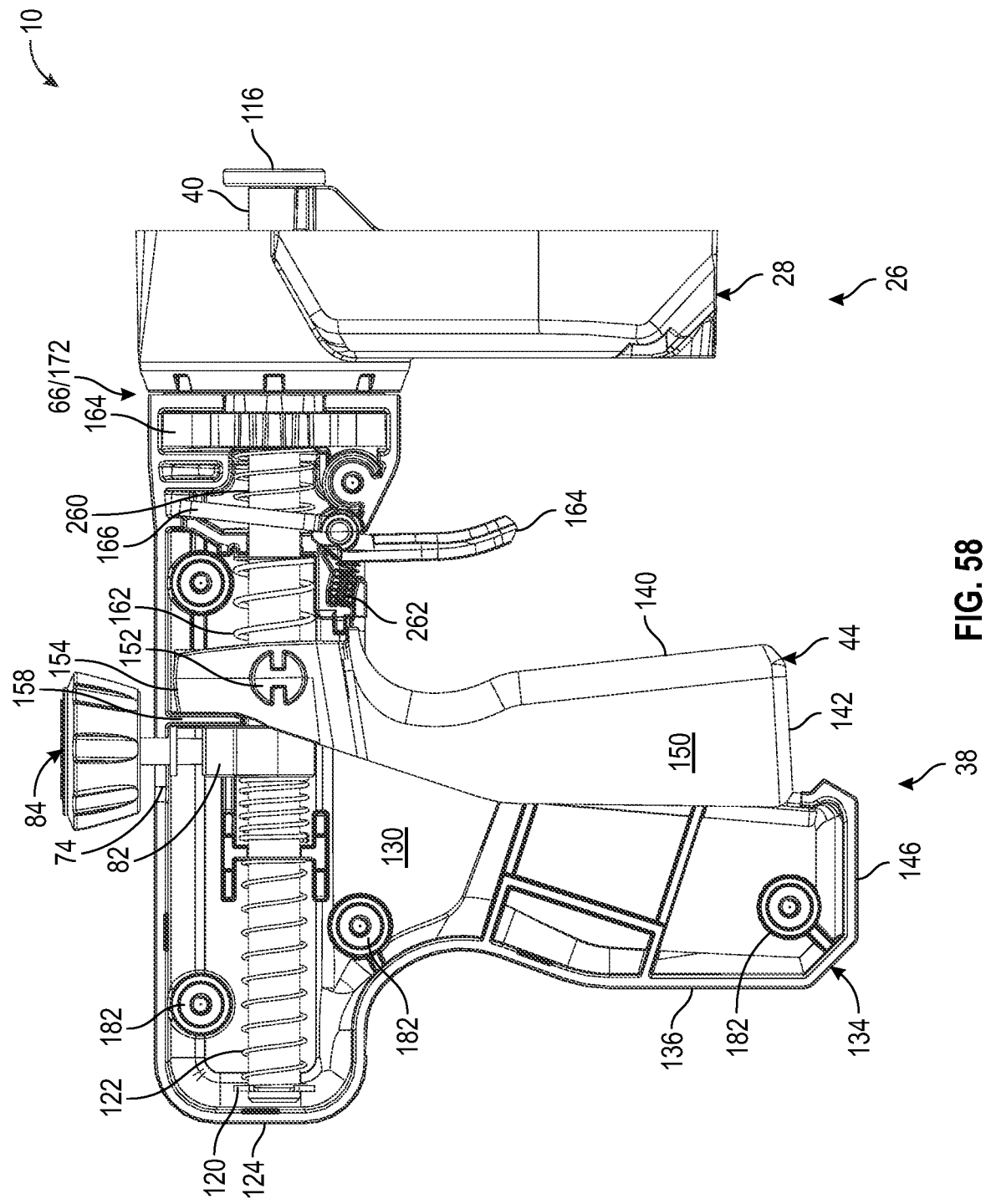
FIG. 58 is a close-up side elevation cut-away section view of a second arrangement of a quick grip pocket hole jig system shown in FIG. 57.
Figure 59:
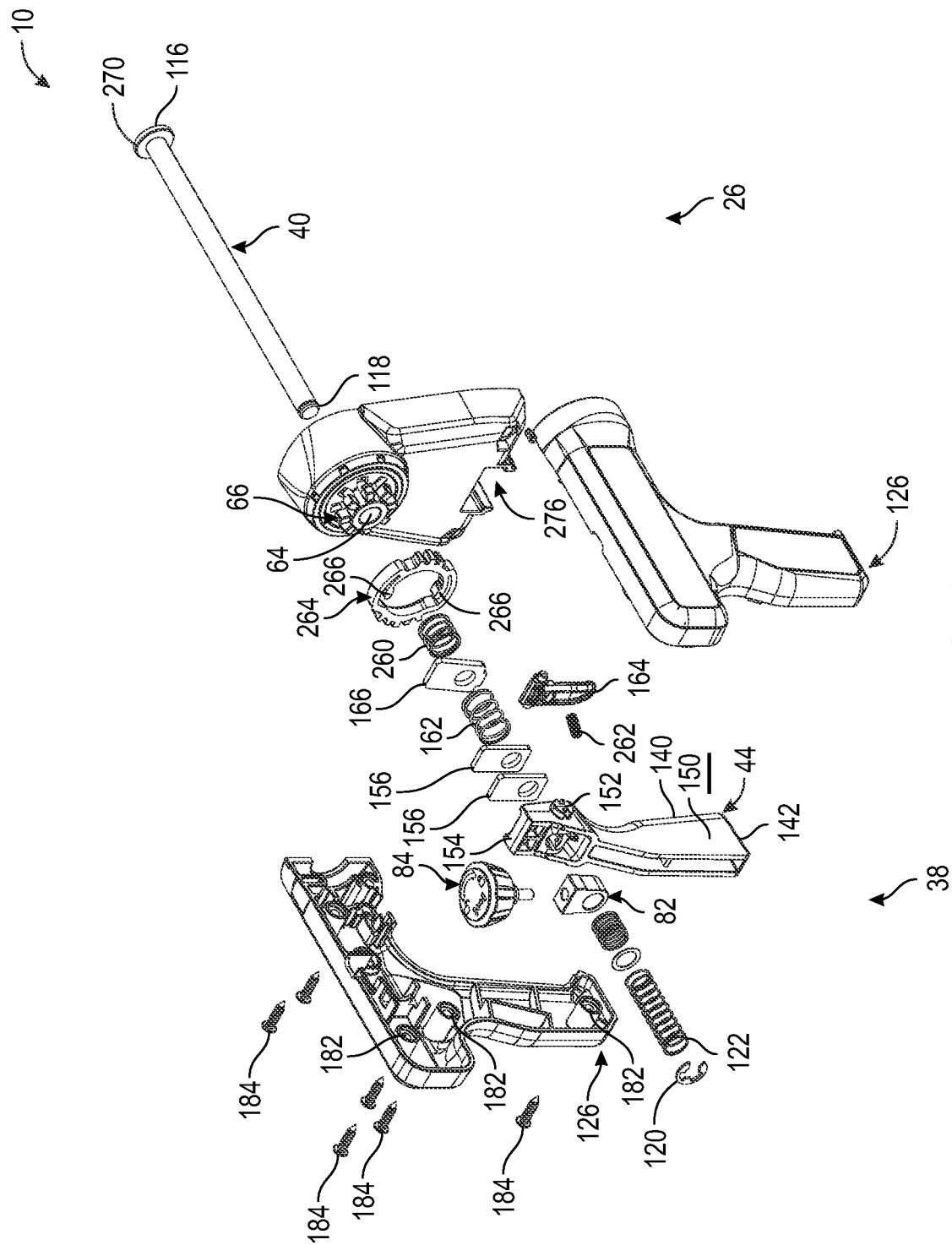
FIG. 59 is an exploded perspective view of the second arrangement of a quick grip pocket hole jig system shown in FIG. 42.
Figure 60:
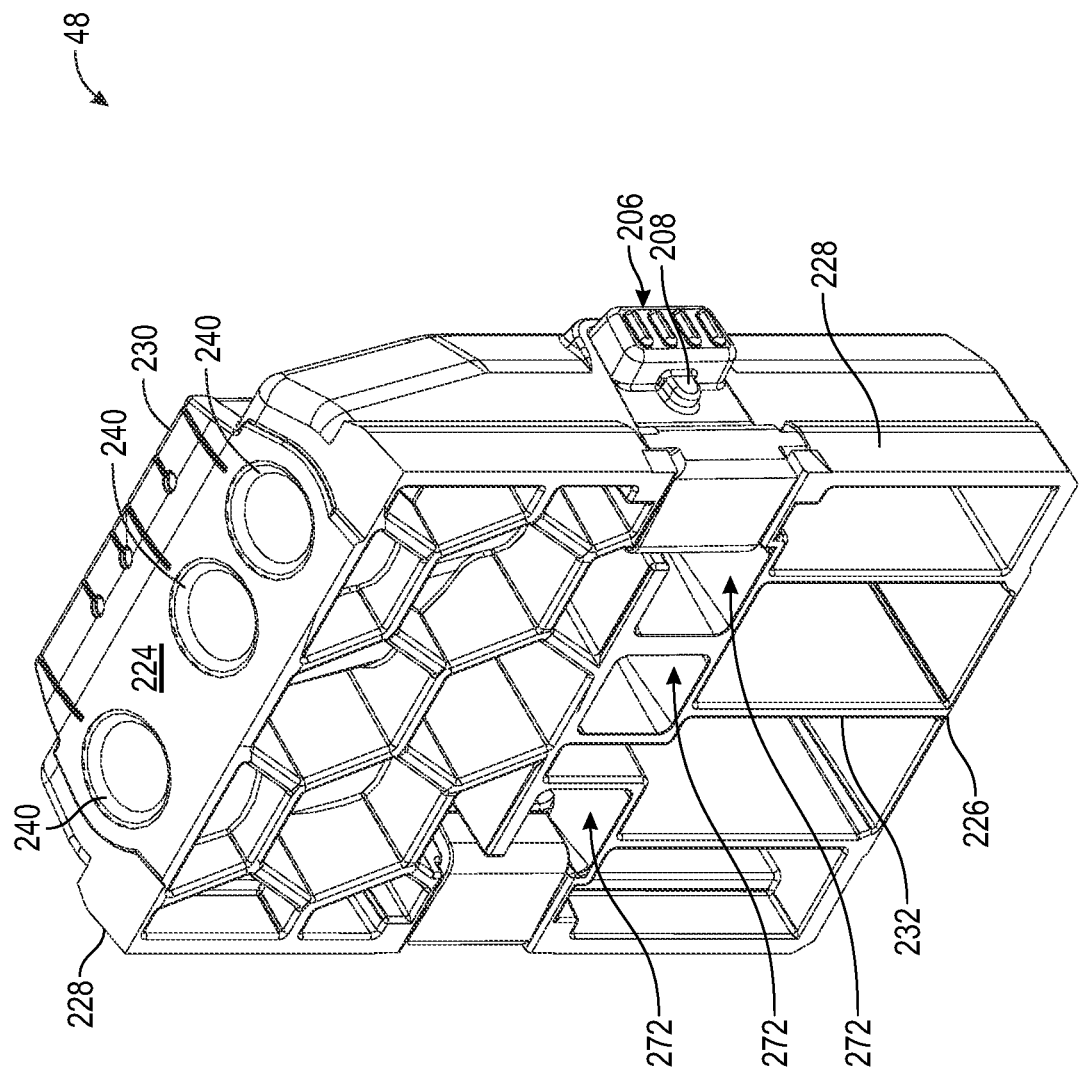
FIG. 60 is a perspective view of the drill guide assembly as is shown in FIG. 42.
Figure 61:
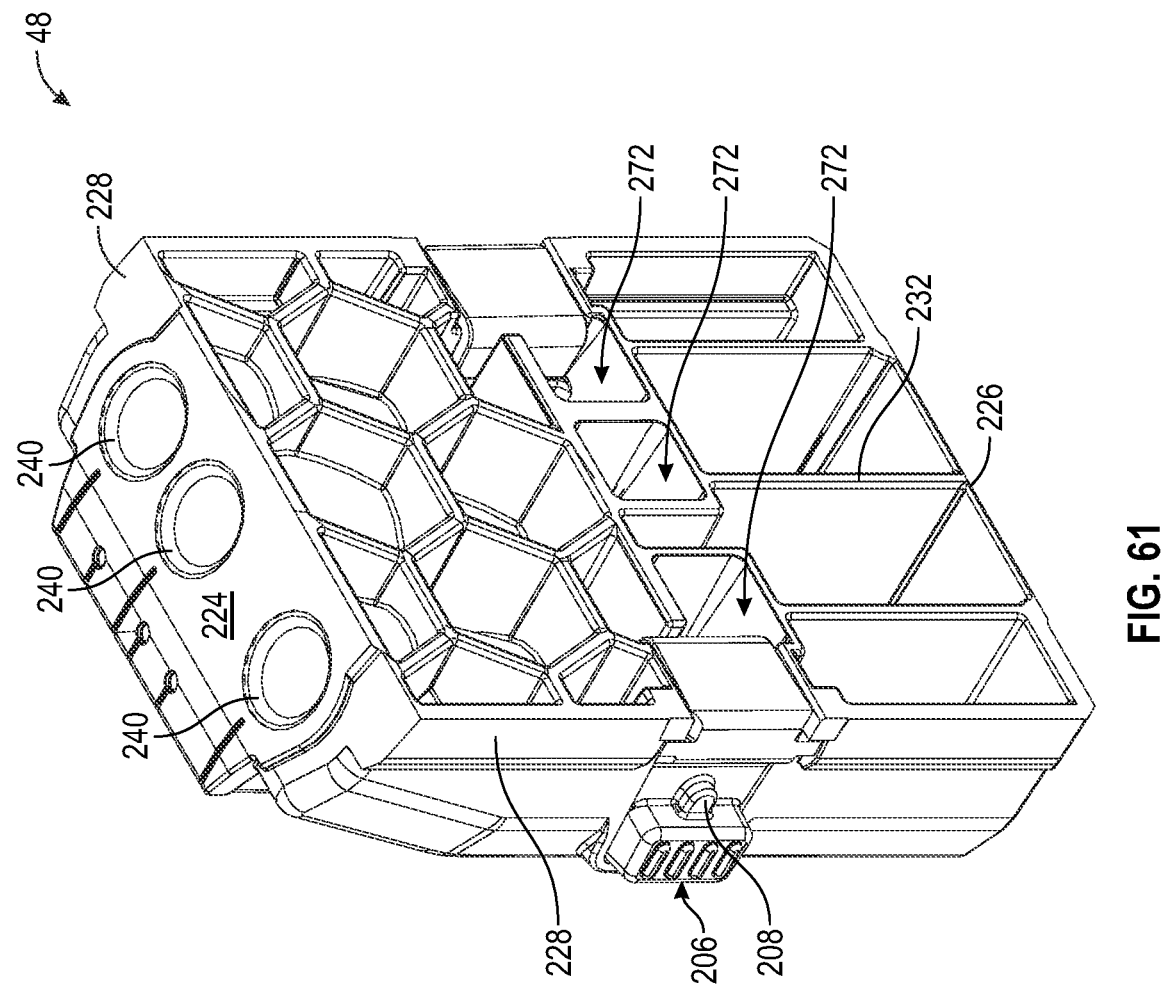
FIG. 61 is another perspective view of the drill guide assembly as is shown in FIG. 42.
Figure 62:
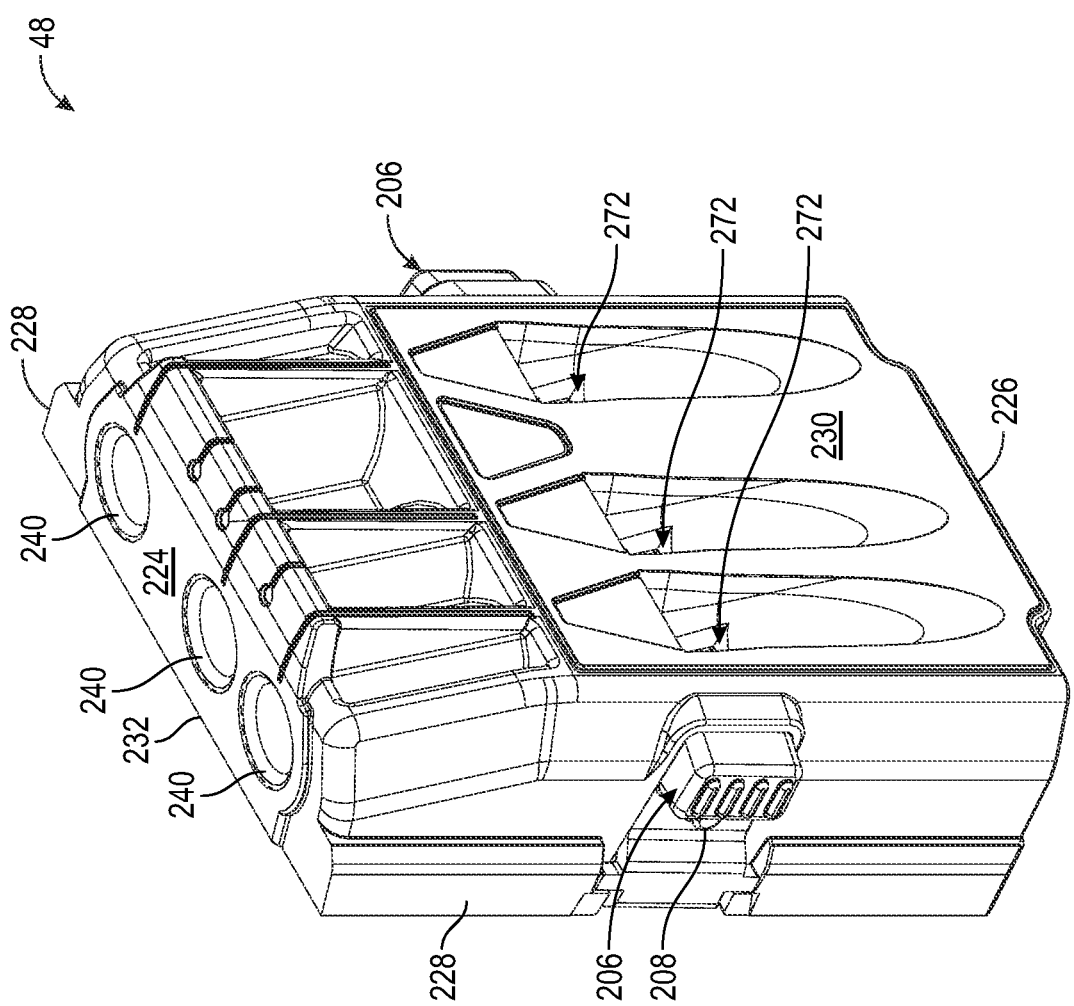
FIG. 62 is another perspective view of the drill guide assembly as is shown in FIG. 42.
Figure 63:
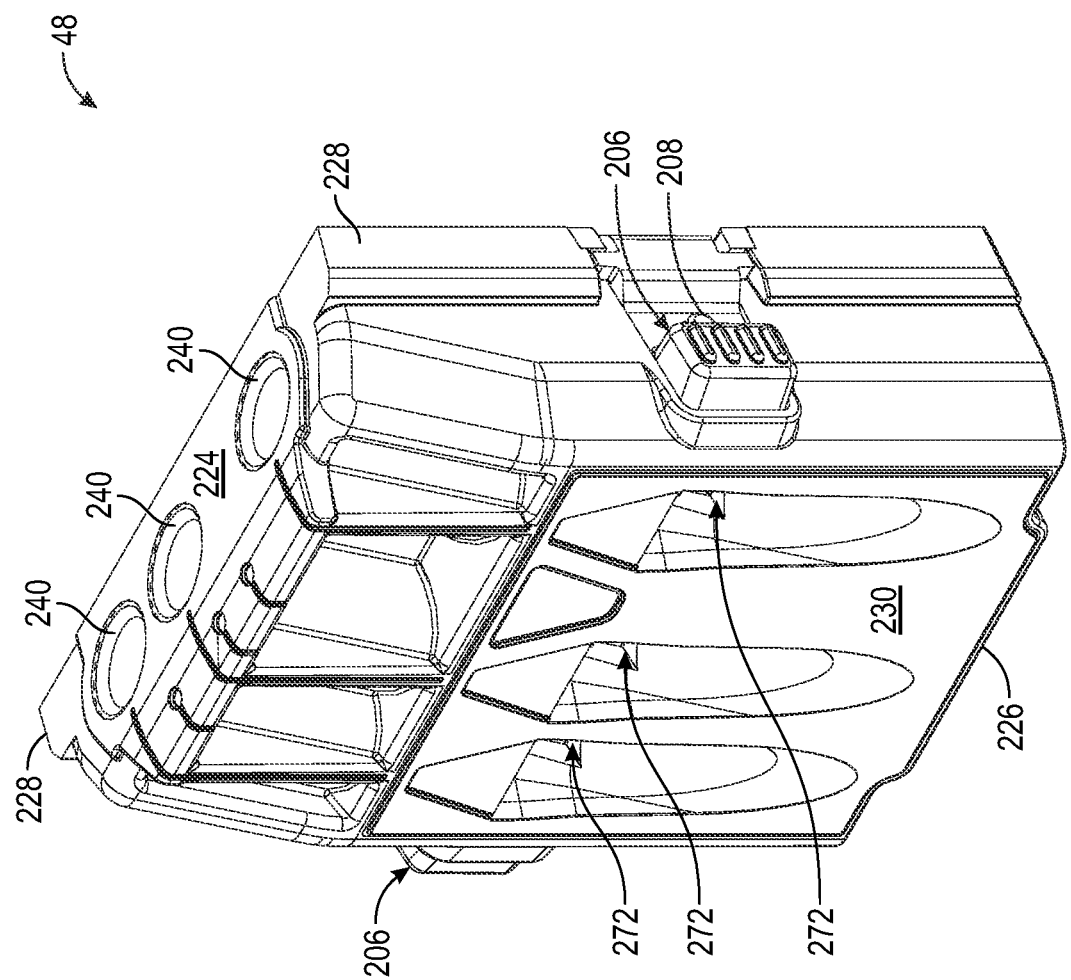
FIG. 63 is another perspective view of the drill guide assembly as is shown in FIG. 42.
Figure 64:
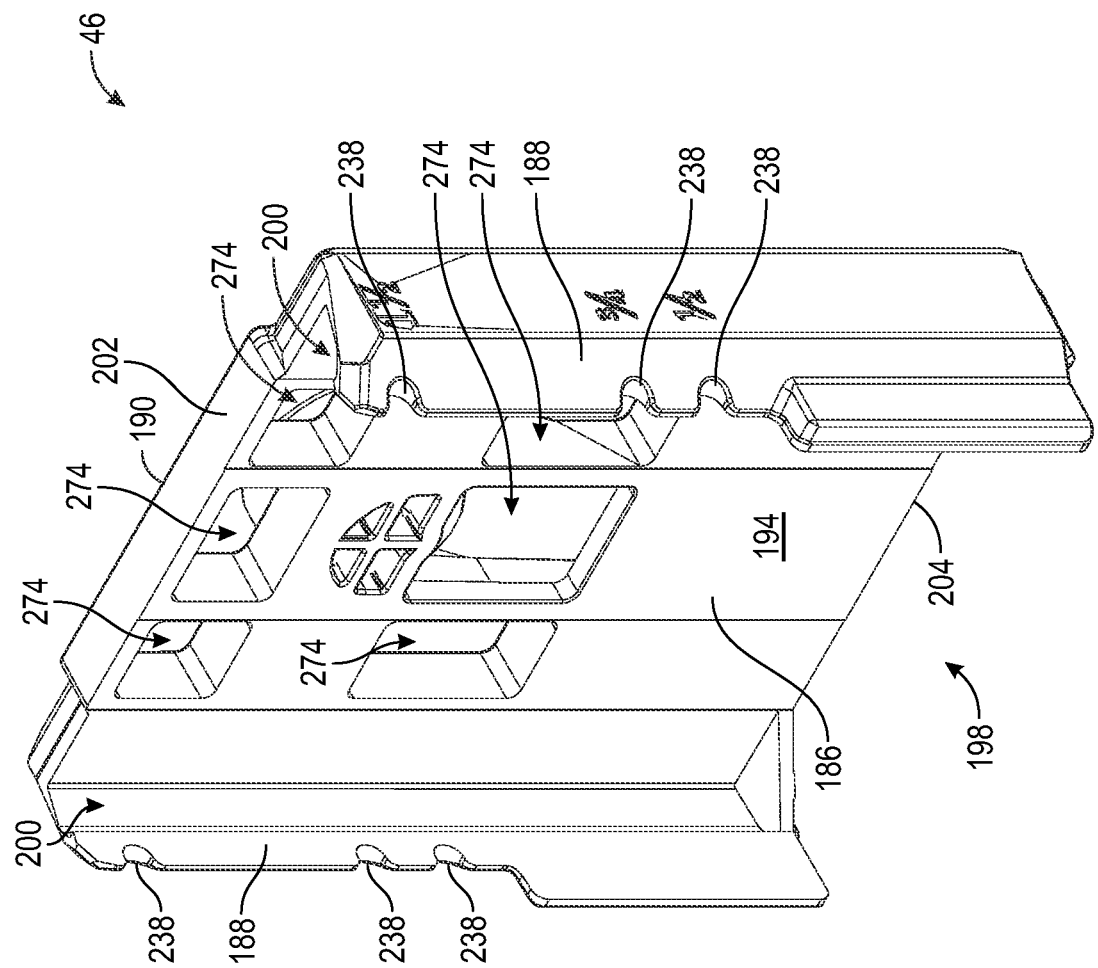
FIG. 64 is a perspective view of the drill guide carrier as is shown in FIG. 42.
Figure 65:
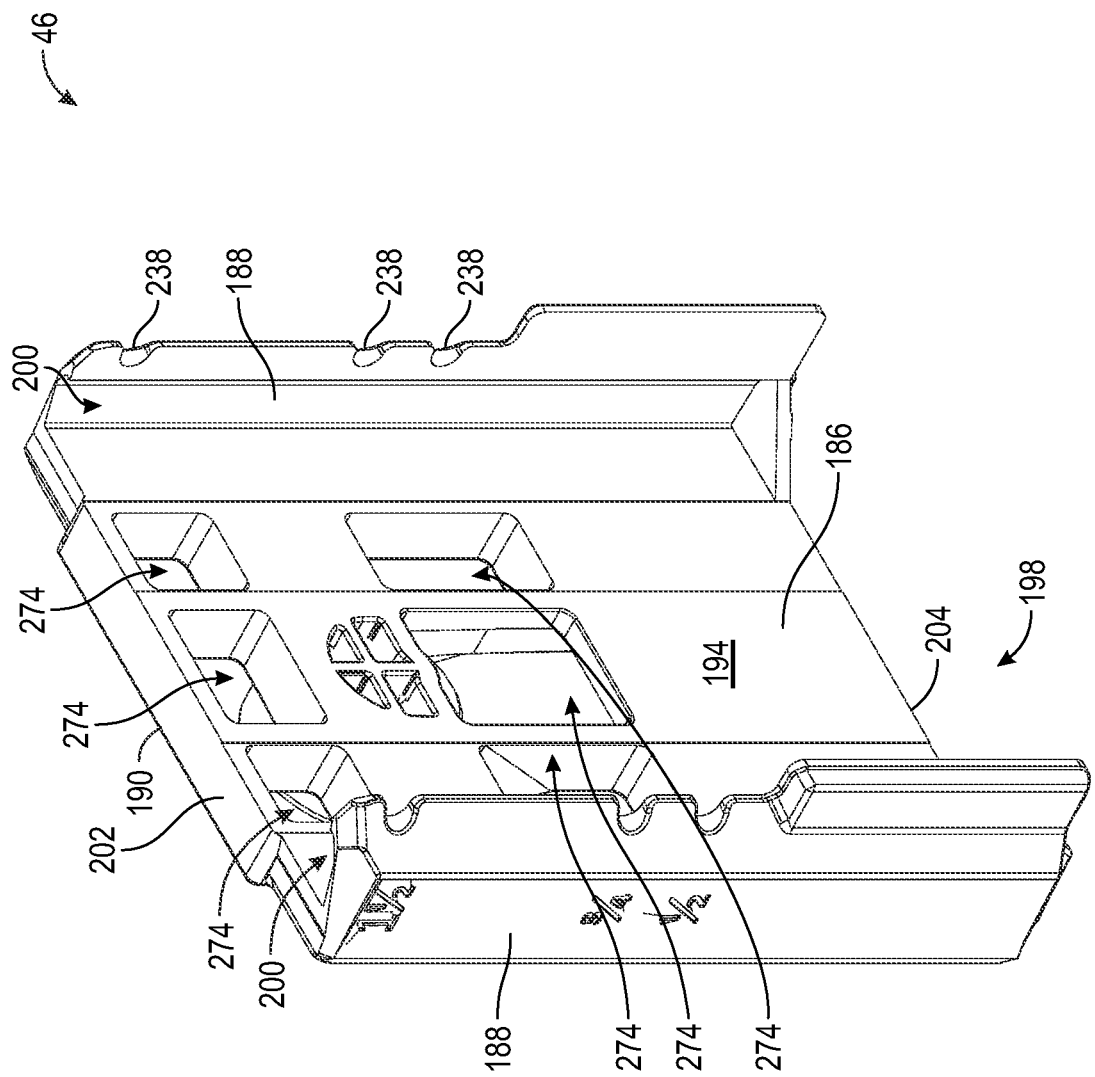
FIG. 65 is another perspective view of the drill guide carrier as is shown in FIG. 42.
Figure 66:
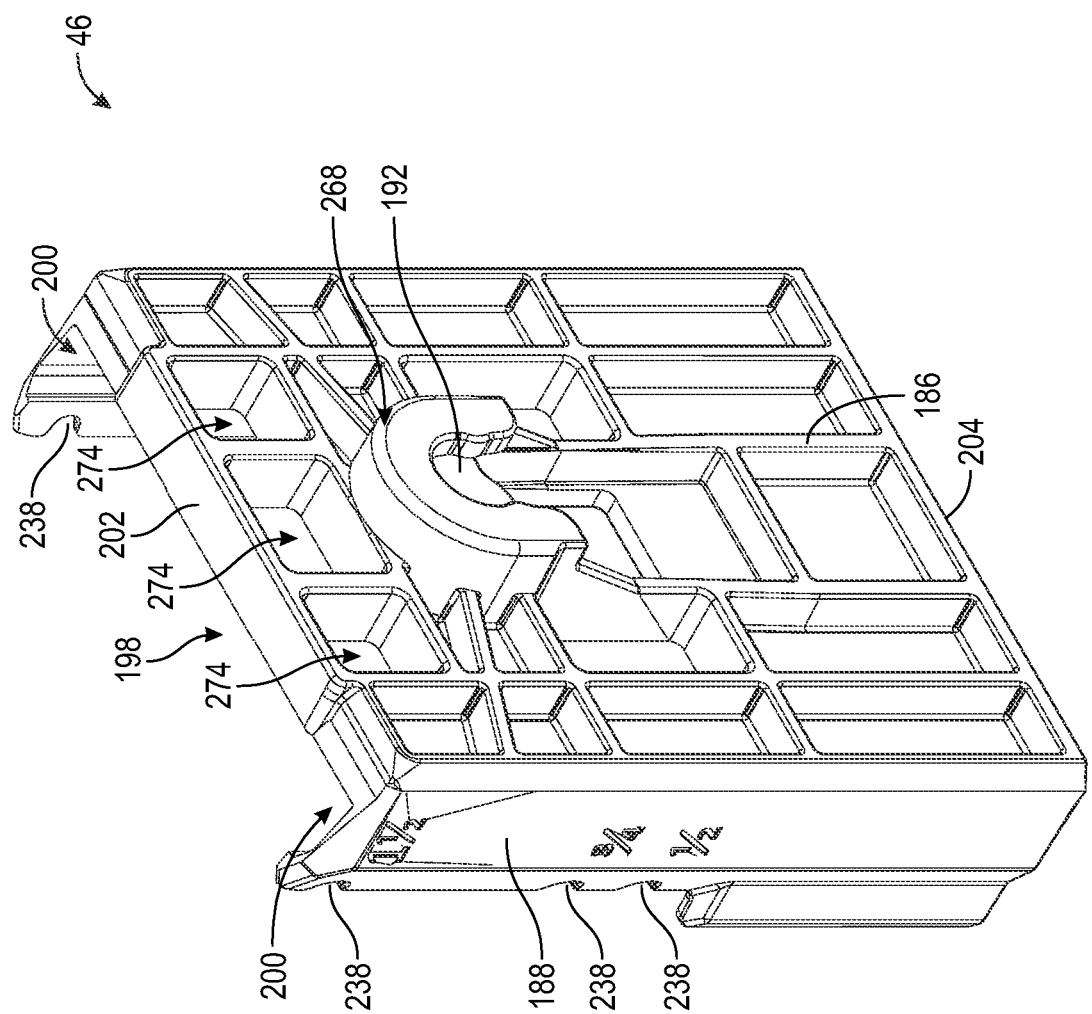
FIG. 66 is another perspective view of the drill guide carrier as is shown in FIG. 42.
Figure 67:
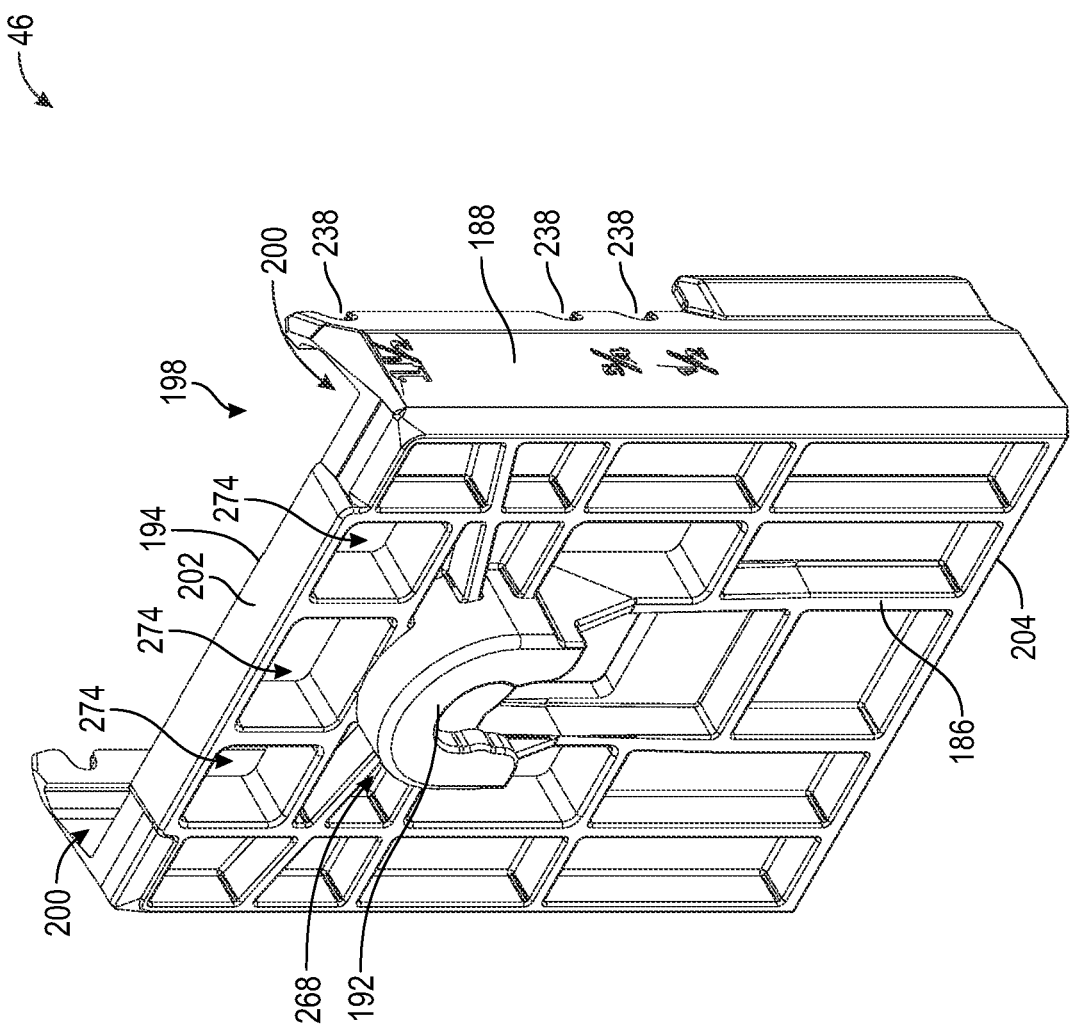
FIG. 67 is another perspective view of the drill guide carrier as is shown in FIG. 42.
Figure 68:
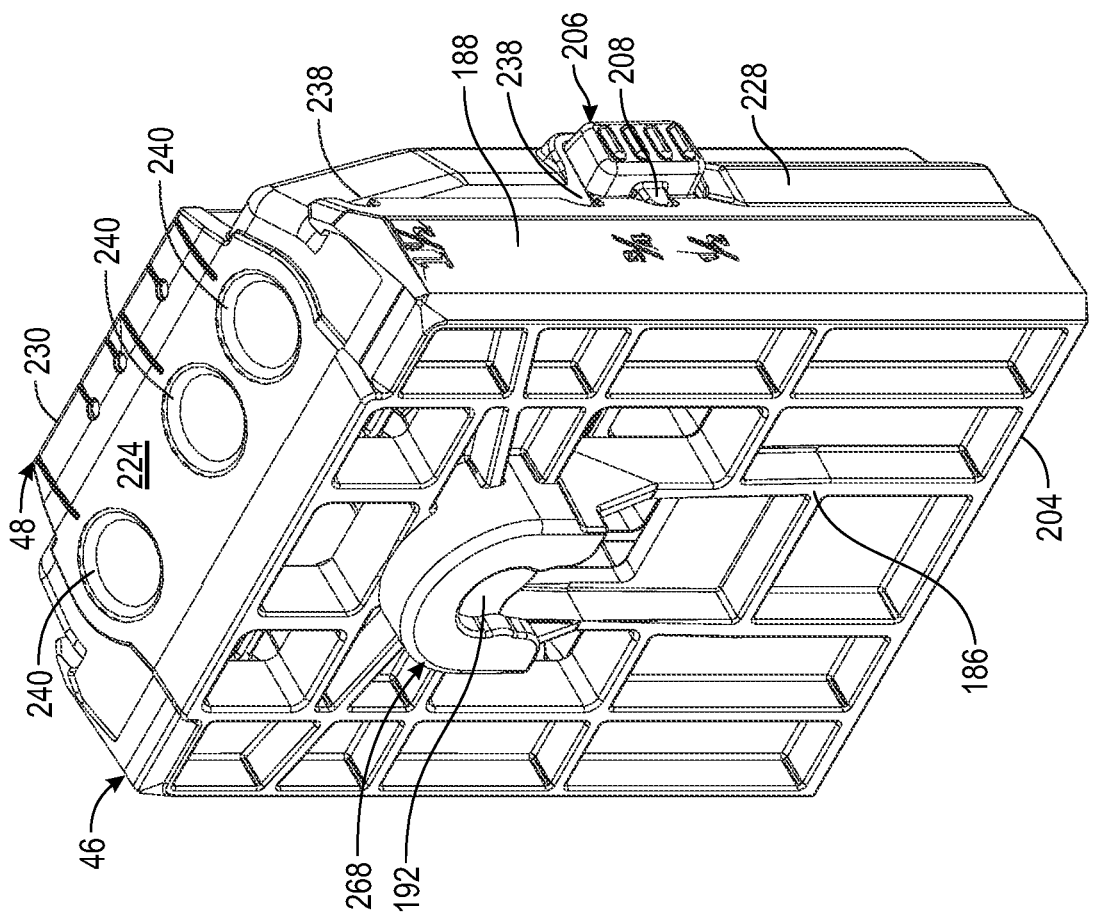
FIG. 68 is a perspective view of the drill guide carrier and drill guide assembly shown in FIG. 42; the view showing the drill guide carrier receiving a drill guide assembly in an adjustable manner; the view showing the drill guide assembly in a fully lowered position relative to the drill guide assembly which corresponds to the thinnest workpiece thickness, which in the case shown is ½ inch.
Figure 69:
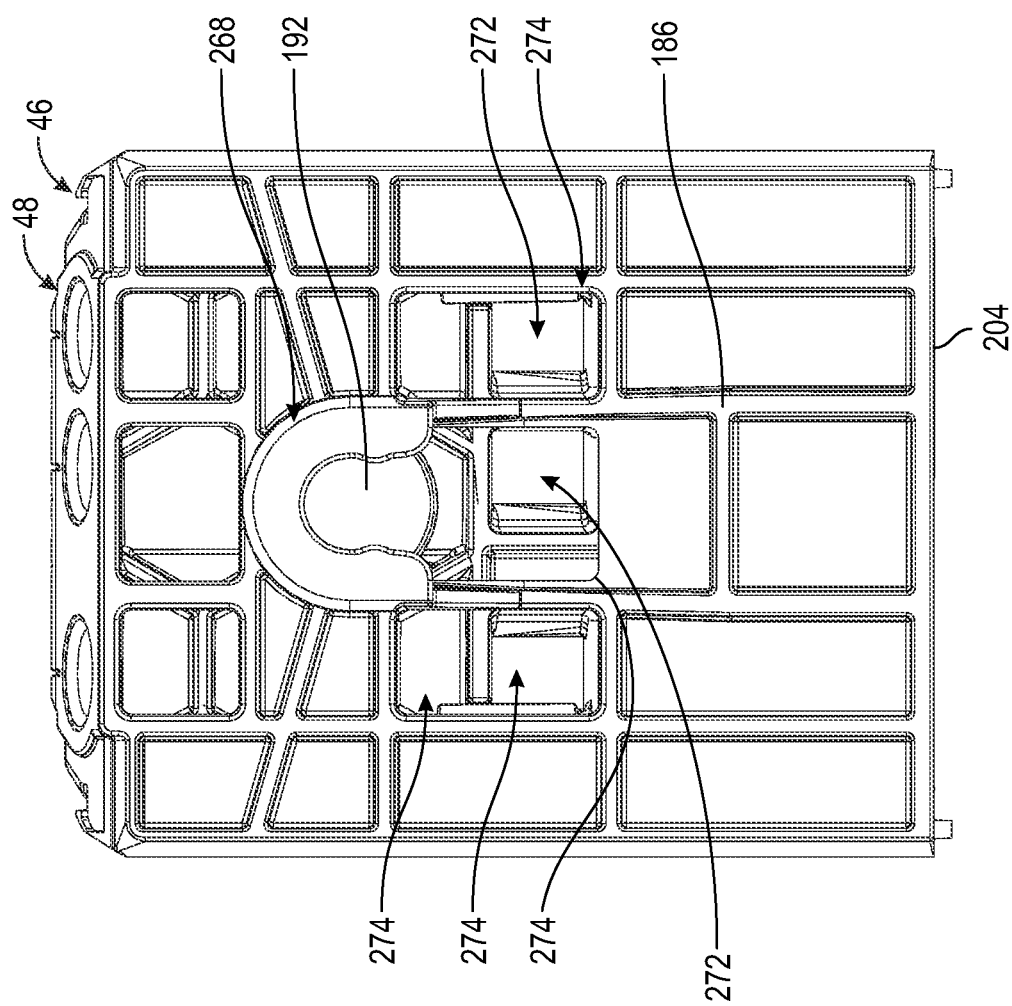
FIG. 69 is a front elevation view of the drill guide carrier and drill guide assembly shown in FIG. 42; the view showing the drill guide carrier receiving a drill guide assembly in an adjustable manner; the view showing the drill guide assembly in a fully lowered position relative to the drill guide assembly which corresponds to the thinnest workpiece thickness, which in the case shown is ½ inch; the view showing the exit holes in the drill guide assembly overlapping with the lower portion of the lower set of exit holes in the drill guide carrier.
Figure 70:
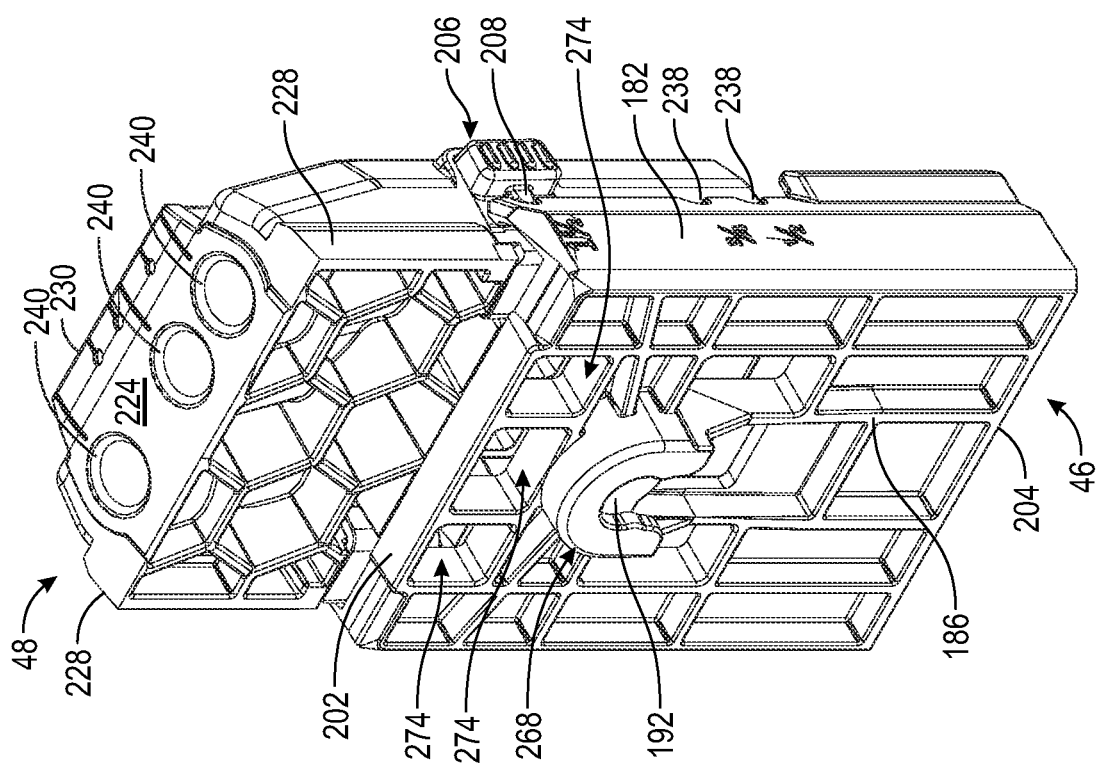
FIG. 70 is a perspective view of the drill guide carrier and drill guide assembly shown in FIG. 42; the view showing the drill guide carrier receiving a drill guide assembly in an adjustable manner; the view showing the drill guide assembly in a fully raised position relative to the drill guide assembly which corresponds to the thickest workpiece thickness, which in the case shown is 1½ inch.
Figure 71:
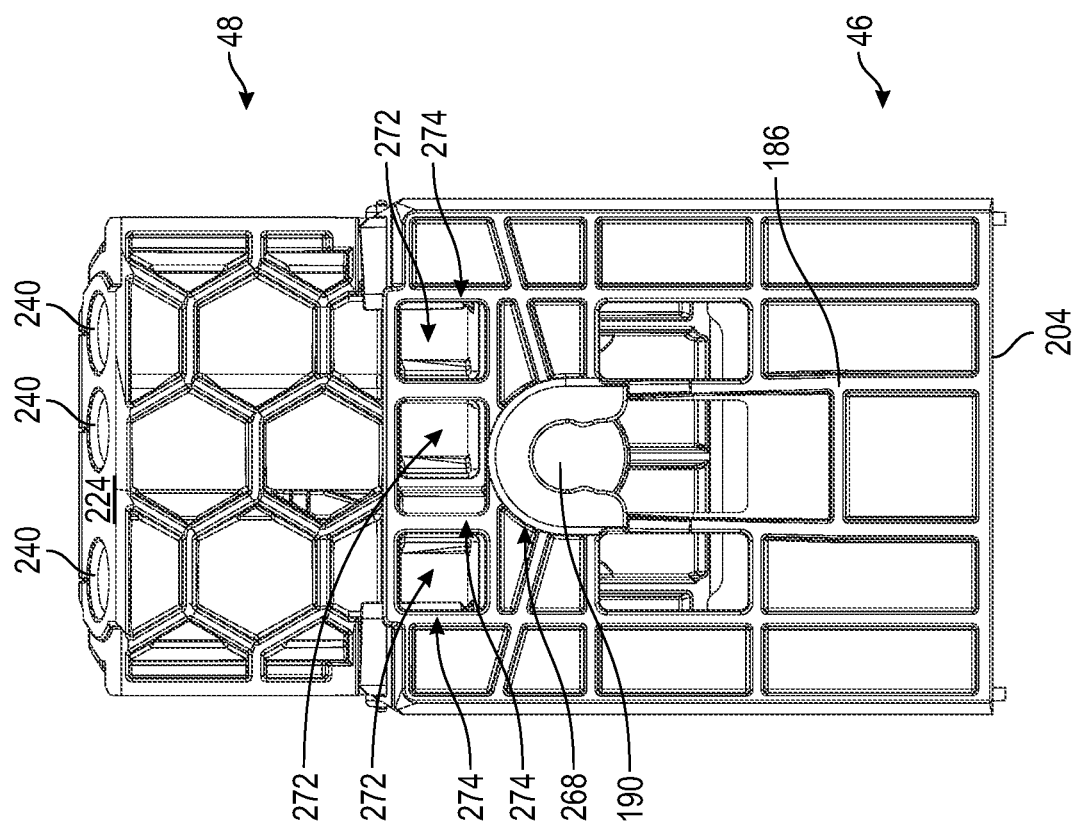
FIG. 71 is a front elevation view of the drill guide carrier and drill guide assembly shown in FIG. 42; the view showing the drill guide carrier receiving a drill guide assembly in an adjustable manner; the view showing the drill guide assembly in a fully raised position relative to the drill guide assembly which corresponds to the thickest workpiece thickness, which in the case shown is 1½ inch; the view showing the exit holes in the drill guide assembly overlapping with the upper set of exit holes in the drill guide carrier.
Figure 72:
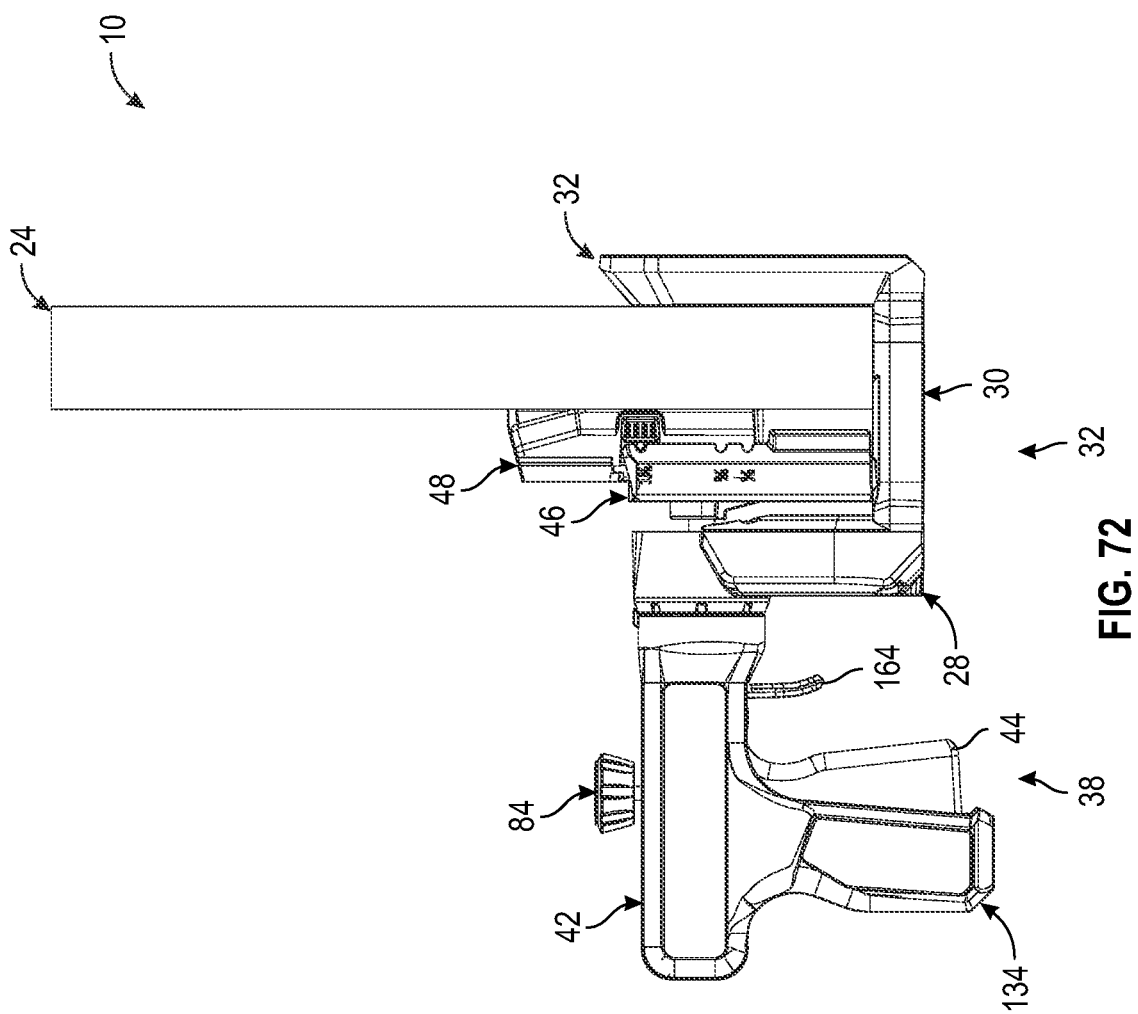
FIG. 72 is a side elevation view of a second arrangement of a quick grip pocket hole jig system shown in FIG. 42; the view showing the jig system clamping a thick workpiece; the view showing the drill guide carrier receiving a drill guide assembly in an adjustable manner; the view showing the drill guide assembly in a fully raised position relative to the drill guide assembly which corresponds to the thickest workpiece thickness, which in the case shown is 1½ inch.
Figure 73:
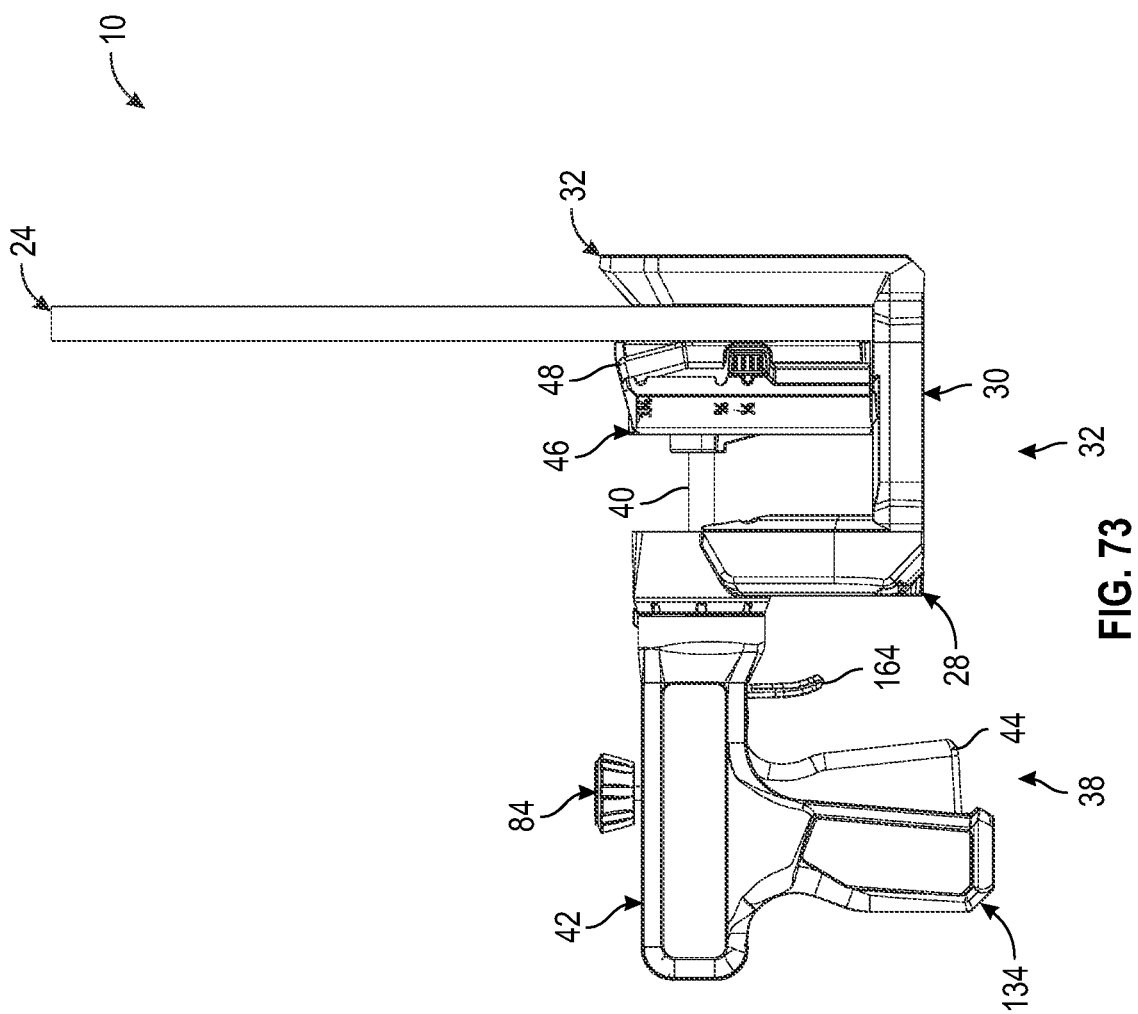
FIG. 73 is a side elevation view of a second arrangement of a quick grip pocket hole jig system shown in FIG. 42; the view showing the jig system clamping a thin workpiece; the view showing the drill guide carrier receiving a drill guide assembly in an adjustable manner; the view showing the drill guide assembly in a fully lowered position relative to the drill guide assembly which corresponds to the thinnest workpiece thickness, which in the case shown is ½ inch.

In one arrangement, as one example, a support member 258 is positioned on or in back stop 32 and/or end stop 30 and/or clamp support 28. Support member 258 is formed of any suitable size, shape and design and is configured to strengthen and increase the rigidity of support section 26. That is, during clamping, clamp assembly 38 presses against the U-shaped support section 26. This has the tendency to bend, deflect or cause the upper end of clamp support 28 and back stop 32 to open up or angle away from one another. To help prevent this, support member 258 is placed on, in, over or otherwise associated with back stop 32 and/or end stop 32 and/or clamp support 28. In the arrangement shown, as one example, with reference to FIG. 46, support member 258 is connected adjacent the forward side 12 of back stop 32. This support member 258 connects at its lower ends to the forward ends of bolts 34 and extends upward therefrom a distance before terminating at its upper end which is above mid-point of back stop 32. In the arrangement shown, as one example, support member 258 is generally planar in shape and is formed of a strong metallic material that is held within or fits within the skeletonized structural members of the forward side 12 of back stop 32, which is formed of a plastic or composite or non-metallic material. In this way, the addition of support member 258 strengthens support section 26 and prevents, limits or reduces flexing of support section 26 during clamping thereby increasing the accuracy of the pocket holes that are formed during drilling. Any other size, shape or design or form is hereby contemplated for use as support member 258.

Clamping assembly 38 connects to support section 26.

Clamping Assembly 38:

In the arrangement shown, as one example, quick grip pocket hole jig system 10 includes clamping assembly 38. Clamping assembly 38 may be formed of any suitable size, shape and design and is configured to facilitate clamping of workpiece 24 in support section 26. In the arrangement shown, as one example, clamping assembly 38 includes a clamping rod 40, a clamp body 42 having a trigger 44, a drill guide carrier 46 and a drill guide assembly 48 among other parts, components, and feature as are described herein.

Clamping Rod 40:

In the arrangement shown, as one example, clamping assembly 38 of quick grip pocket hole jig system 10 includes a clamping rod 40. Clamping rod 40 may be formed of any suitable size, shape and design and is configured to facilitate the transfer of movement and pressure so as to facilitate clamping of a workpiece 24 in support section 26 as well as facilitate rotation of clamp body 42 around to various angular orientations relative to support section 26. In the arrangement shown, as one example, clamping rod 40 is a generally cylindrical rod that extends a length from a forward end 116 to a rearward end 118.

In the arrangement shown, as one example, forward end 116 of clamping rod 40 includes a threaded section that is configured to engage and lock to drill guide carrier 46. Alternatively, this threaded section is at the rearward end 118 or at any other position along clamping rod 40. Any other manner, means or method of connecting the forward end 116 of clamping rod 40 to drill guide carrier 46 is hereby contemplated for use, such as pinning, crimping, bolting, screwing, welding, tightening, locking or the like In the arrangement shown, as one example, an end cap 120 is positioned over the rearward end 118 of clamping rod 40. End cap 120 is formed of any suitable size, shape and design and is configured to serve as a stop surface for a return spring 122 so as to prevent return spring 122 from coming off that rearward end 118 of clamping rod 40. That is, end cap 120 has a larger diameter than the diameter of clamping rod 40 and return spring 122 has a larger diameter than clamping rod 40 but a smaller diameter than the end cap 120. In the arrangement shown, as one example, return spring 122 is positioned over clamping rod 40 between the forward end of end cap 120 and the rearward end 124 of clamp body 42. In this position, return spring 122 applies a force moving the clamping rod 40 rearward and away from clamp body 42.

In the arrangement shown, as one example, clamping rod 40 extends forward from end cap 120, through return spring 122, through clamp body 42, through the upper end of clamp support 28, including through stroke limiter 74 and its stop collar 82, into the hollow interior 50 of support section 26 and connects to drill guide carrier 46 at its forward end 116.

An axis of rotation extends through the approximate center of clamping rod 40 from end 116 to end 118. Clamp body 42 is configured to selectively rotate around clamping rod 40 and the axis of rotation that clamping rod 40 forms.

Clamp Body 42:

In the arrangement shown, as one example, quick grip pocket hole jig system 10 includes a clamp body 42. Clamp body 42 may be formed of any suitable size, shape and design and is configured to facilitate selective advancement of drill guide carrier 46 and drill guide assembly 48 within support section 26 so as to facilitate clamping of workpiece 24. Clamp body 42 is also configured to facilitate the release and automatic return of drill guide carrier 46 and drill guide assembly 48 from a clamping position to a non-clamping position.

In the arrangement shown, as one example, clamp body 42 is formed of a pair of generally symmetric halves 126 that connect together to one another along a generally centrally positioned seam line 128. When opposing halves 126 of clamp body 42 are joined together along seamline 128, the joined halves 126 form a hollow interior 130 positioned between the interior surfaces of the opposing halves 126. In the arrangement shown, as one example, clamping rod 40 extends through clamp body 42 from rearward end 124 to forward end 132.

In the arrangement shown, as one example, clamp body 42 includes a handle assembly 134. Handle assembly 134 is formed of any suitable size, shape and design and is configured to facilitate easy and comfortable gripping by a user so as to allow the user to actuate the trigger 44 to facilitate clamping of workpiece 24. In the arrangement shown, as one example, handle assembly 134 extends outward and away from the length of clamping rod 40 in an approximate perpendicular alignment. Or, said another way, the rearward side 136 of handle assembly 134 extends in approximate perpendicular alignment to the length of clamping rod 40. However any other arrangement is hereby contemplated for use, such as extending in an approximate parallel alignment to the length of clamping rod 40 or extending at any other angle to the length of clamping rod 40.

In the arrangement shown, as one example, the rearward side 136 of handle assembly 134 faces away from support section 26 and opposite trigger 44. Or, said another way, rearward side 136 of handle assembly 134 faces rearward. In this way, a user may grasp the rearward side 136 of handle assembly 134 in the palm of their hand and reach around the sides 138 of handle assembly 134 so as to grip the forward side 140 of trigger 44 with their fingers such that when they squeeze the forward side 140 of trigger 44 this pulls the outward end 142 of trigger 44 toward handle assembly 134 and into the hollow interior 130 of clamp body 130 thereby advancing the clamping rod 40, and its attached drill guide carrier 46 and drill guide assembly 48.

In the arrangement shown, as one example, the length of handle assembly 134 is slightly longer than the height of clamp support 28. As such, when system 10 is used in a horizontal manner, with the plane formed by the flat lower end 58 of clamp support 28, the flat lower surface 94 of end stop 30, and the flat lower end 106 of back stop 32, positioned on a flat work surface 144, the outward end 146 of handle assembly 134 extends past or interferes with work surface 144 unless handle assembly 134 is tilted at an angle around the axis of rotation formed by clamping rod 40.

Figure 8:
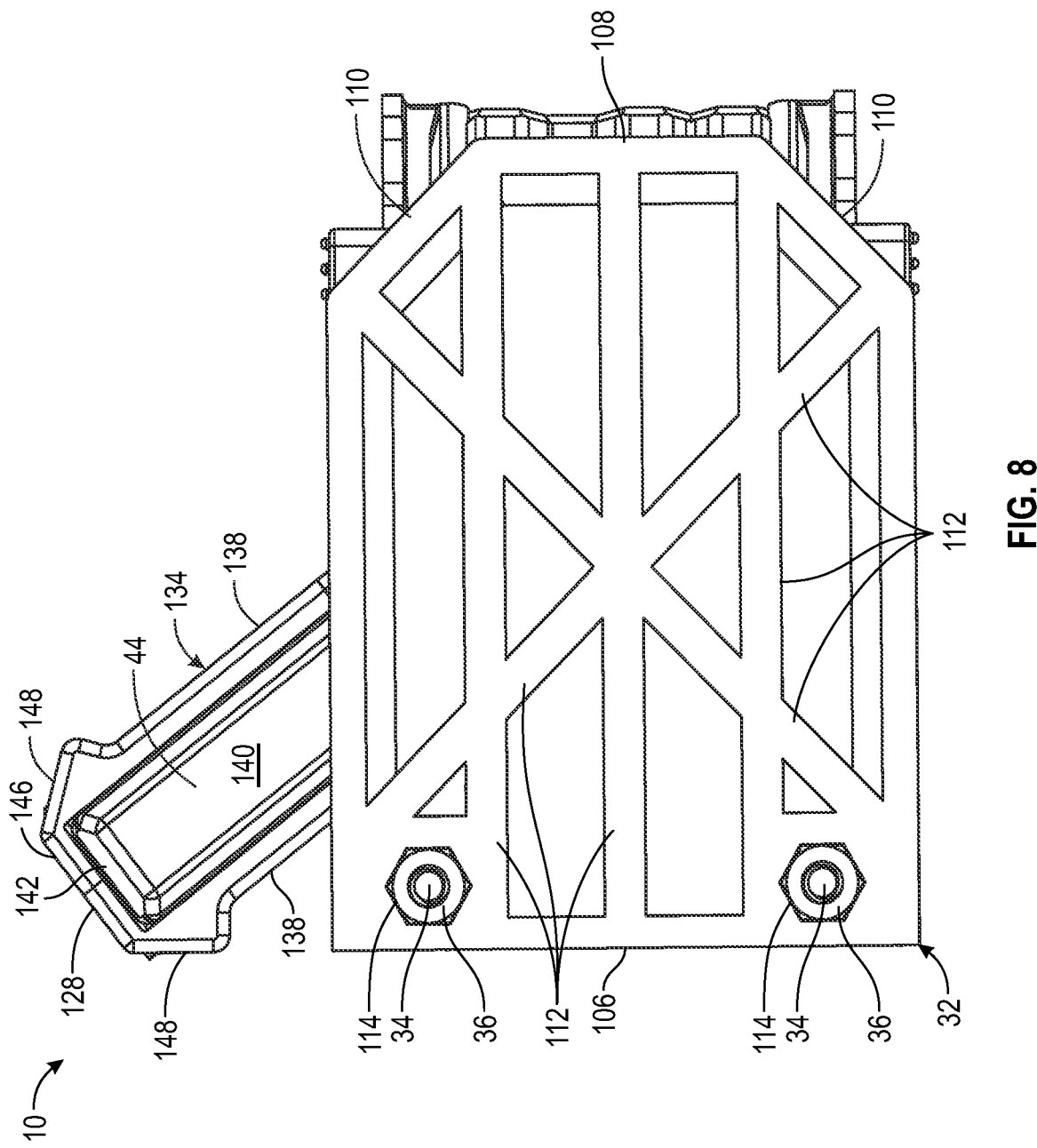
FIG. 8 is a front elevation view of the quick grip pocket hole jig system shown in FIG. 1; the view showing the handle assembly angled relative to the support section.
Figure 9:
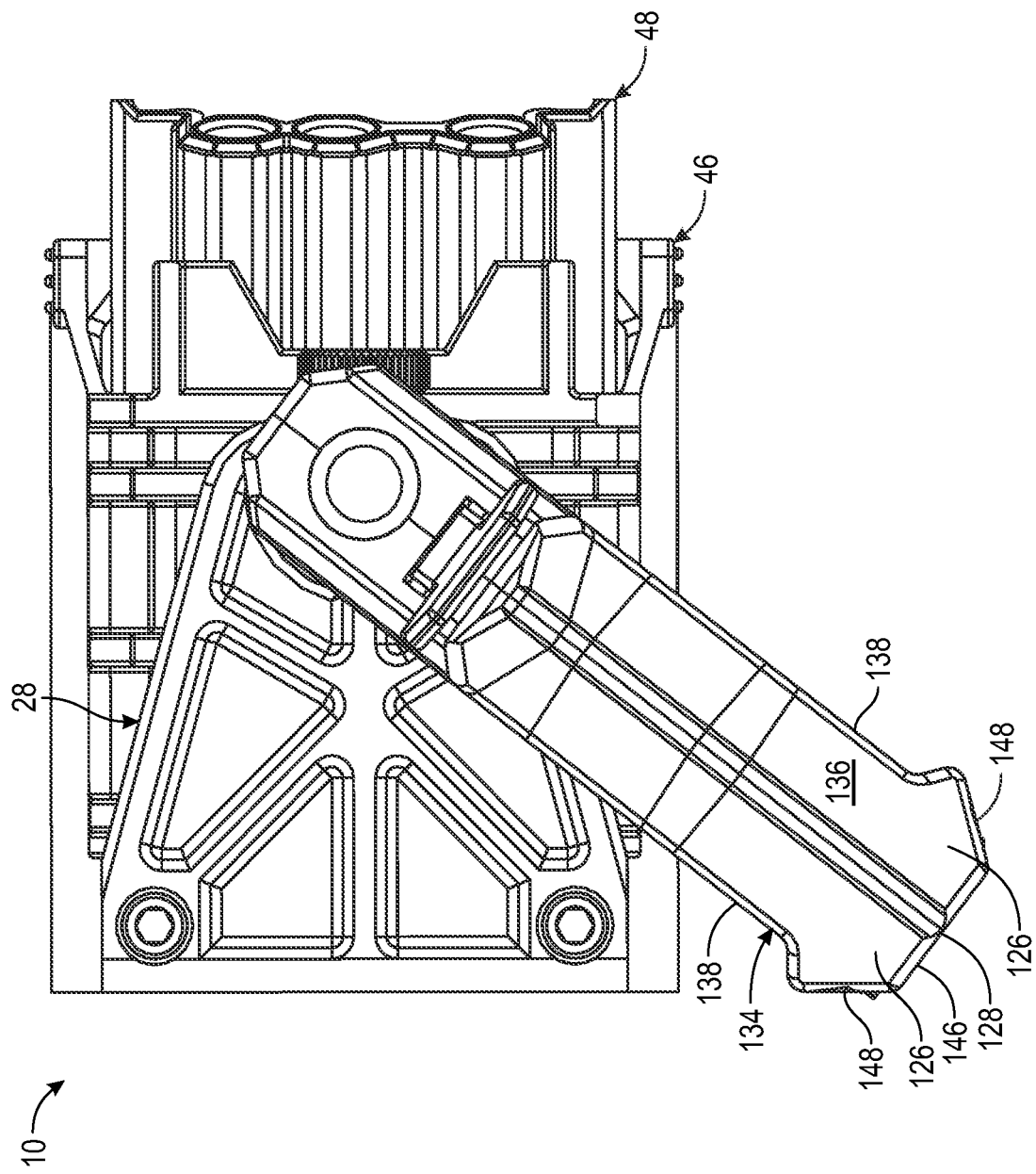
FIG. 9 is a rear elevation view of the quick grip pocket hole jig system shown in FIG. 1; the view showing the handle assembly angled relative to the support section.
Figure 10:
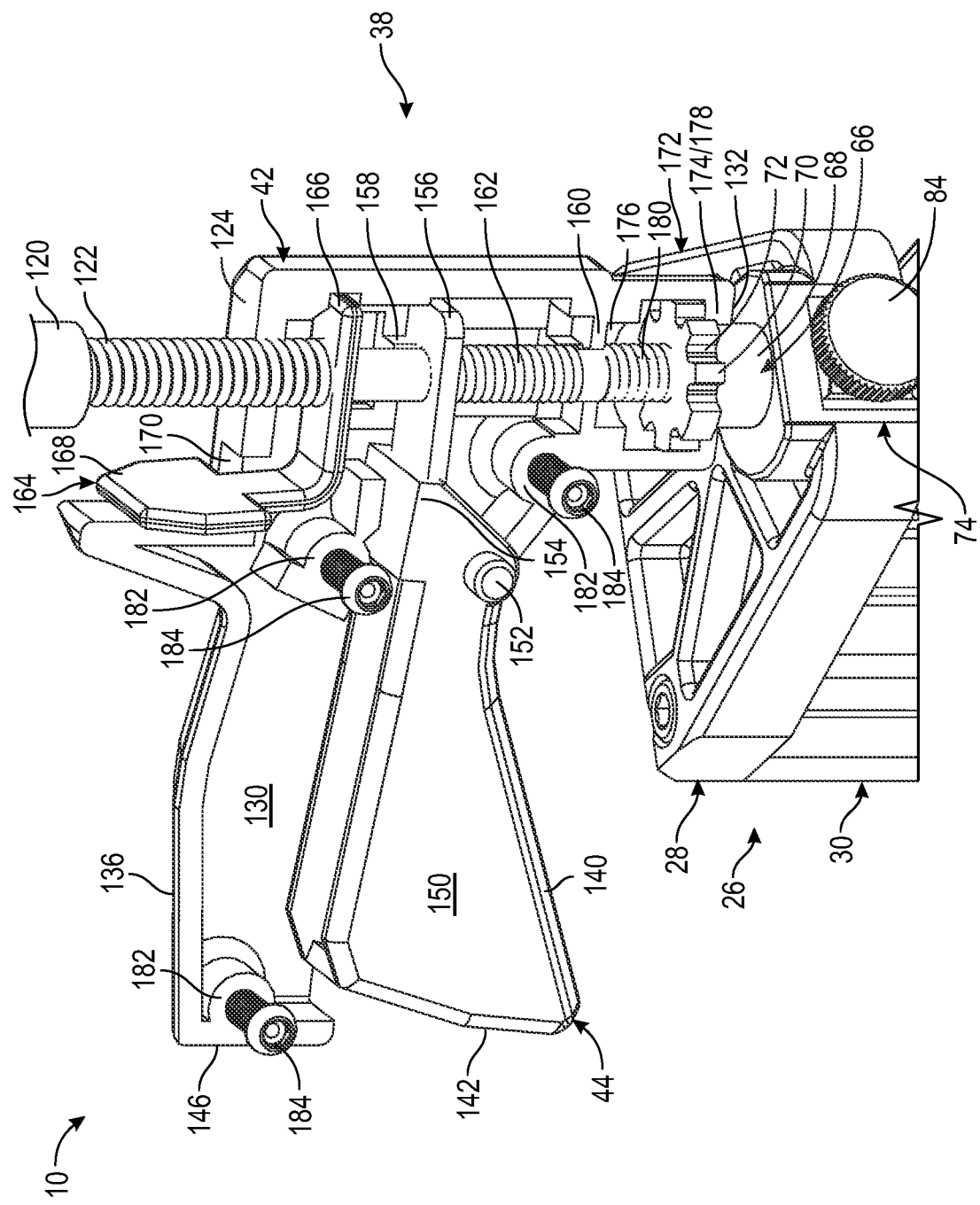
FIG. 10 is a close-up side perspective cut-away section view of the quick grip pocket hole jig system shown in FIG. 1; the view showing the internal components of the clamp assembly; the view showing the movement mechanism positioned around the clamping rod and engaged by the upper end of the trigger; the view showing a plurality of springs positioned around the clamping rod; the view showing the stroke limiter having stop collar placed around the clamping rod and held within the void in the upper end of the clamp support and having a locking mechanism connected thereto; the view showing the attachment mechanism of the clamp support having a first collar and a second collar, the second collar having a plurality of lock features therein which is engaged by the attachment mechanism at the forward end of the clamp assembly.
Figure 11:
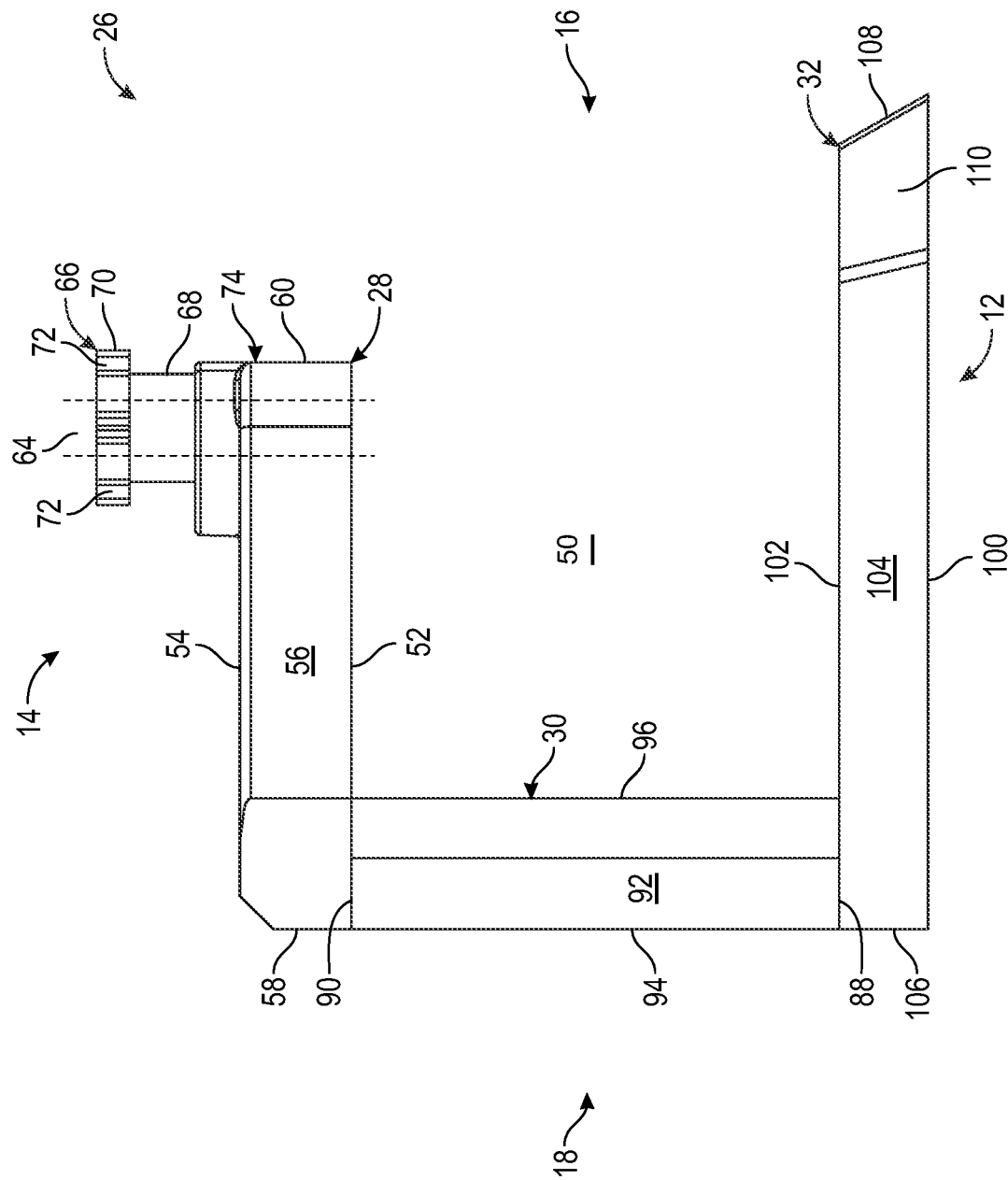
FIG. 11 is a side elevation view of the support section shown in FIG. 1 having a clamp support, an end stop and a back stop; the view showing the attachment mechanism of the clamp support having a first collar and a second collar, the second collar having a plurality of lock features therein.
Figure 12:
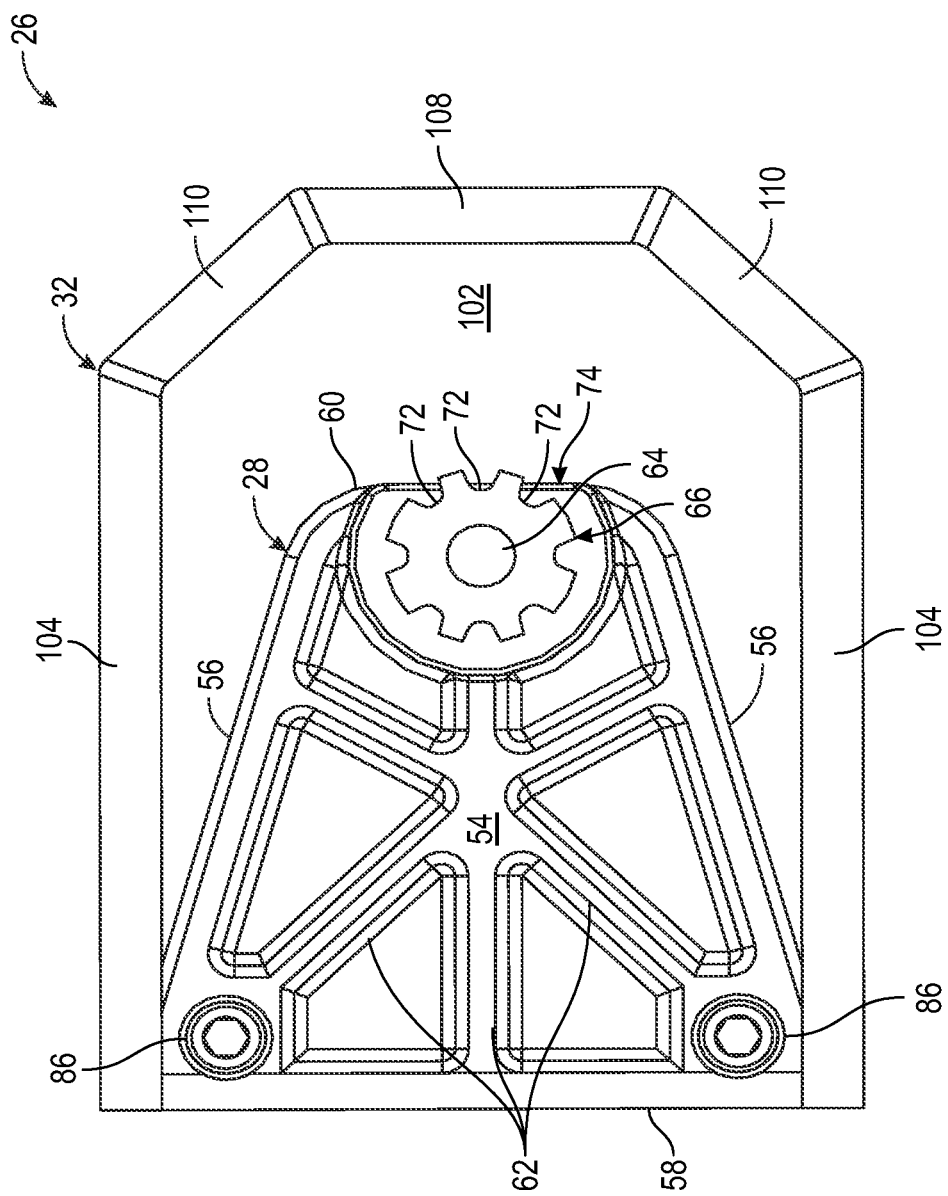
FIG. 12 is a rear elevation view of the support section shown in FIG. 1 having a clamp support, an end stop and a back stop.
Figure 13:
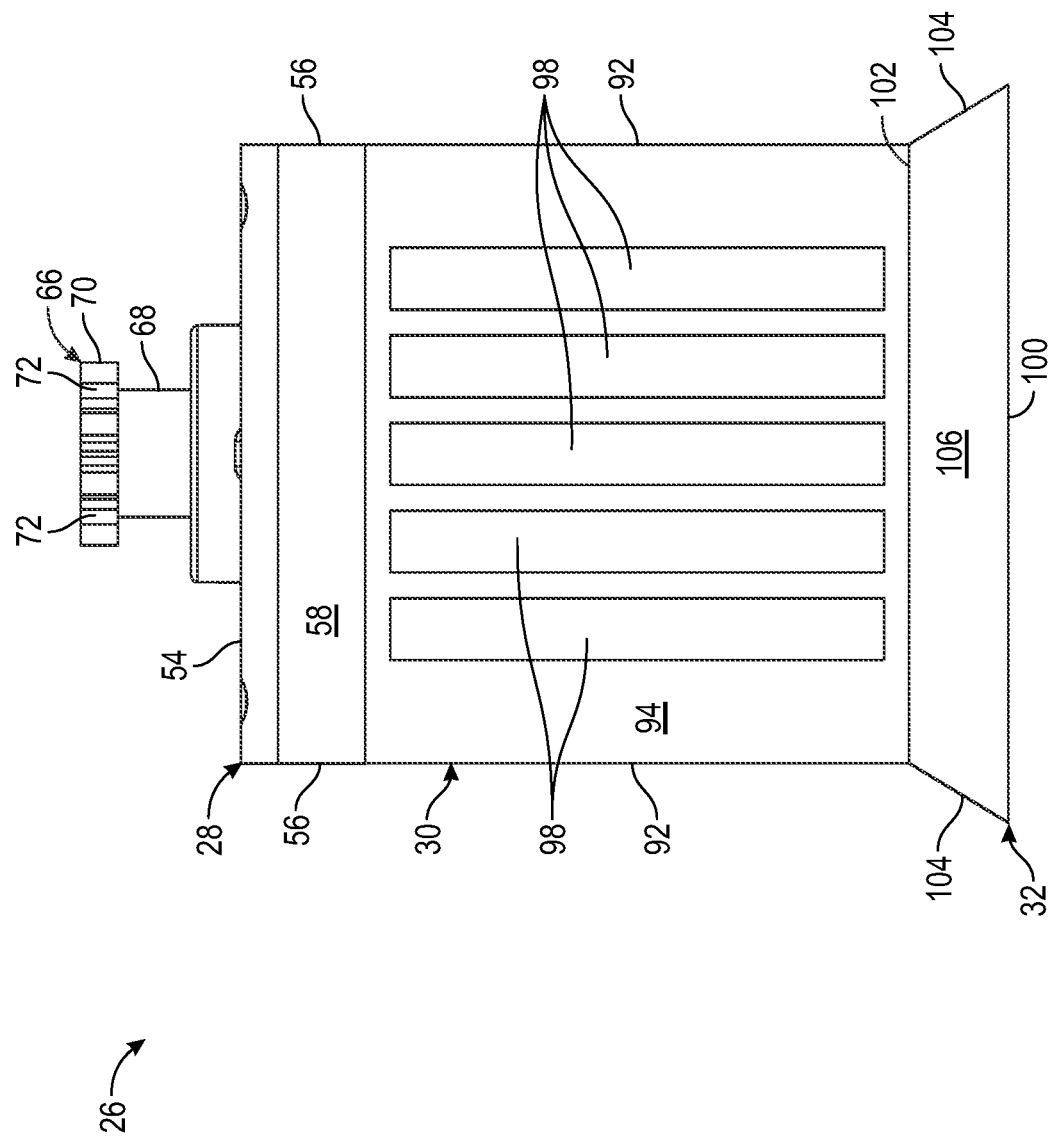
FIG. 13 is a bottom elevation view of the support section shown in FIG. 1 having a clamp support, an end stop and a back stop; the view showing slots in the end stop to allow woodchips to pass through the end stop.
Figure 14:
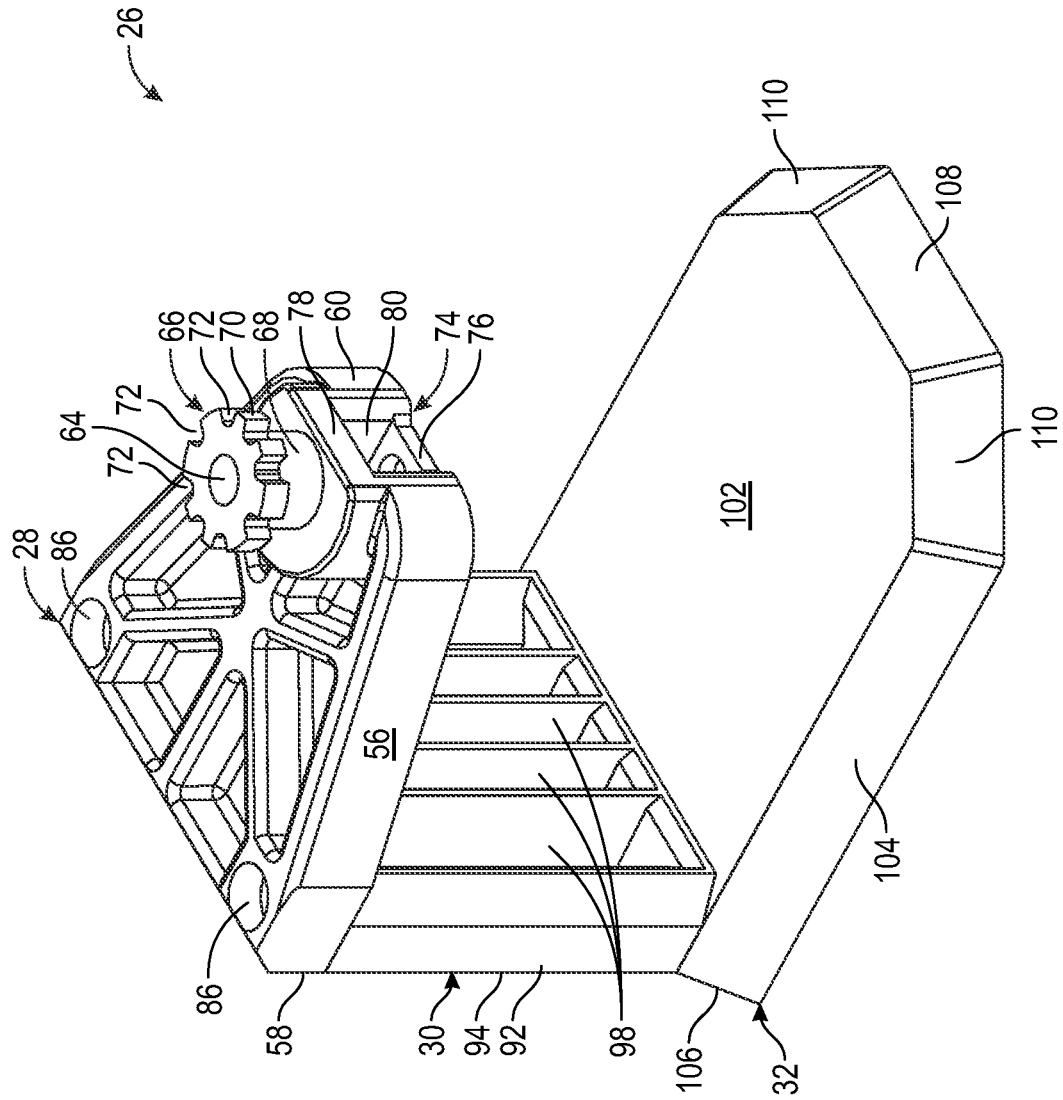
FIG. 14 is a perspective view of the support section shown in FIG. 1 having a clamp support, an end stop and a back stop.
Figure 15:
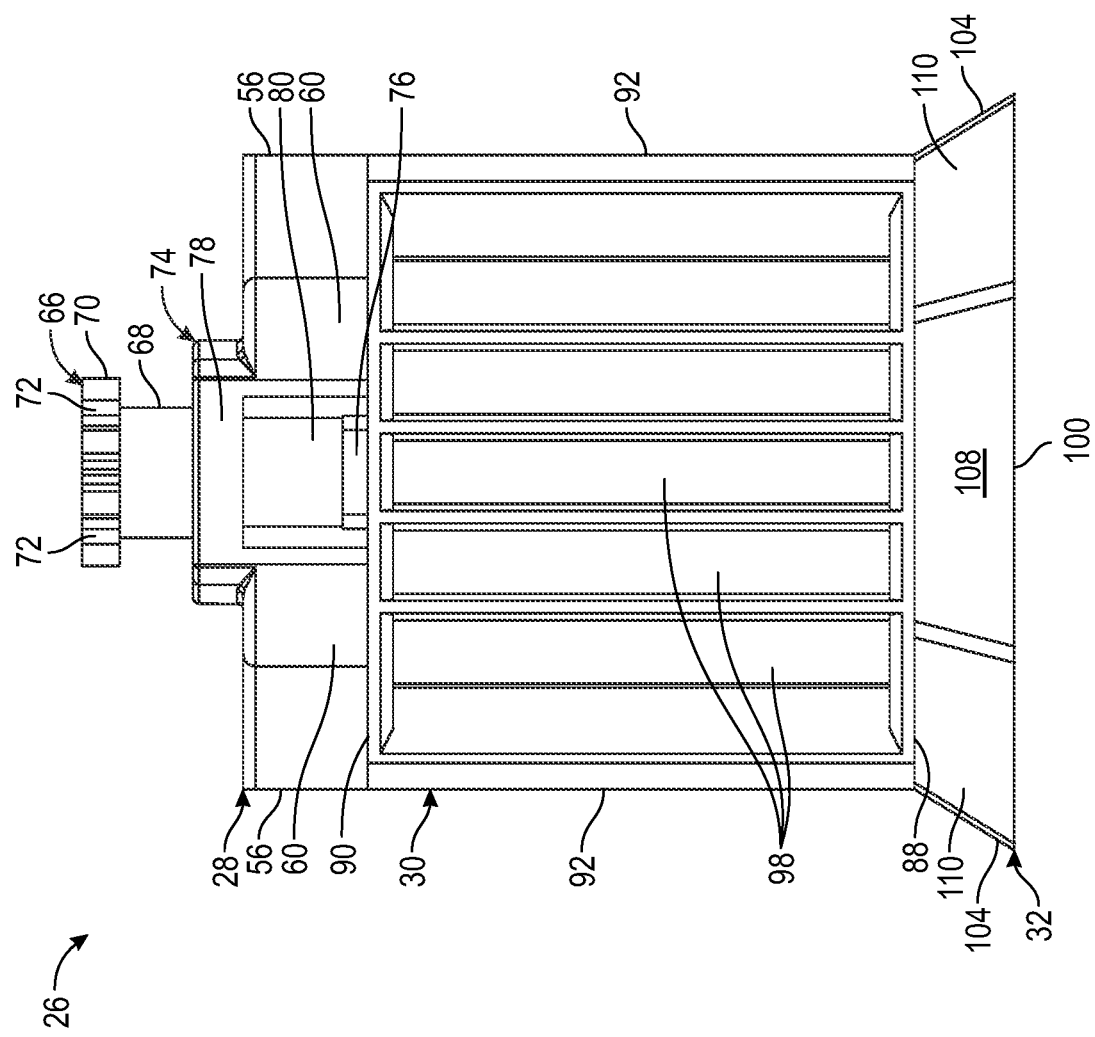
FIG. 15 is a top elevation view of the support section shown in FIG. 1 having a clamp support, an end stop and a back stop.
Figure 16:
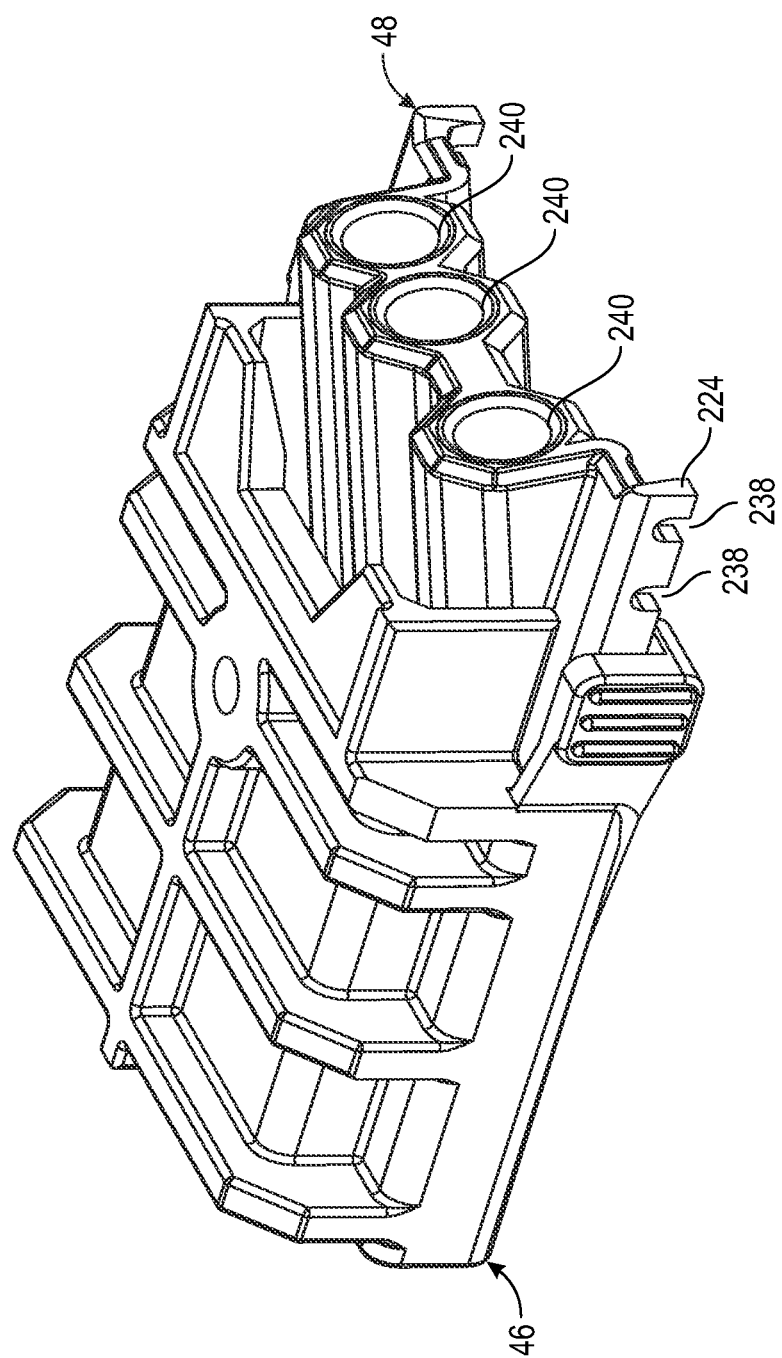
FIG. 16 is a perspective view of the drill guide carrier having the drill guide assembly held therein as is shown in FIG. 1; the view showing the drill guide carrier having a pair of lock mechanisms that have a lock feature that engage lock features in the drill guide assembly; the view showing the drill guide assembly having three drill guides that exit a forward side of the drill guide assembly.
Figure 17:
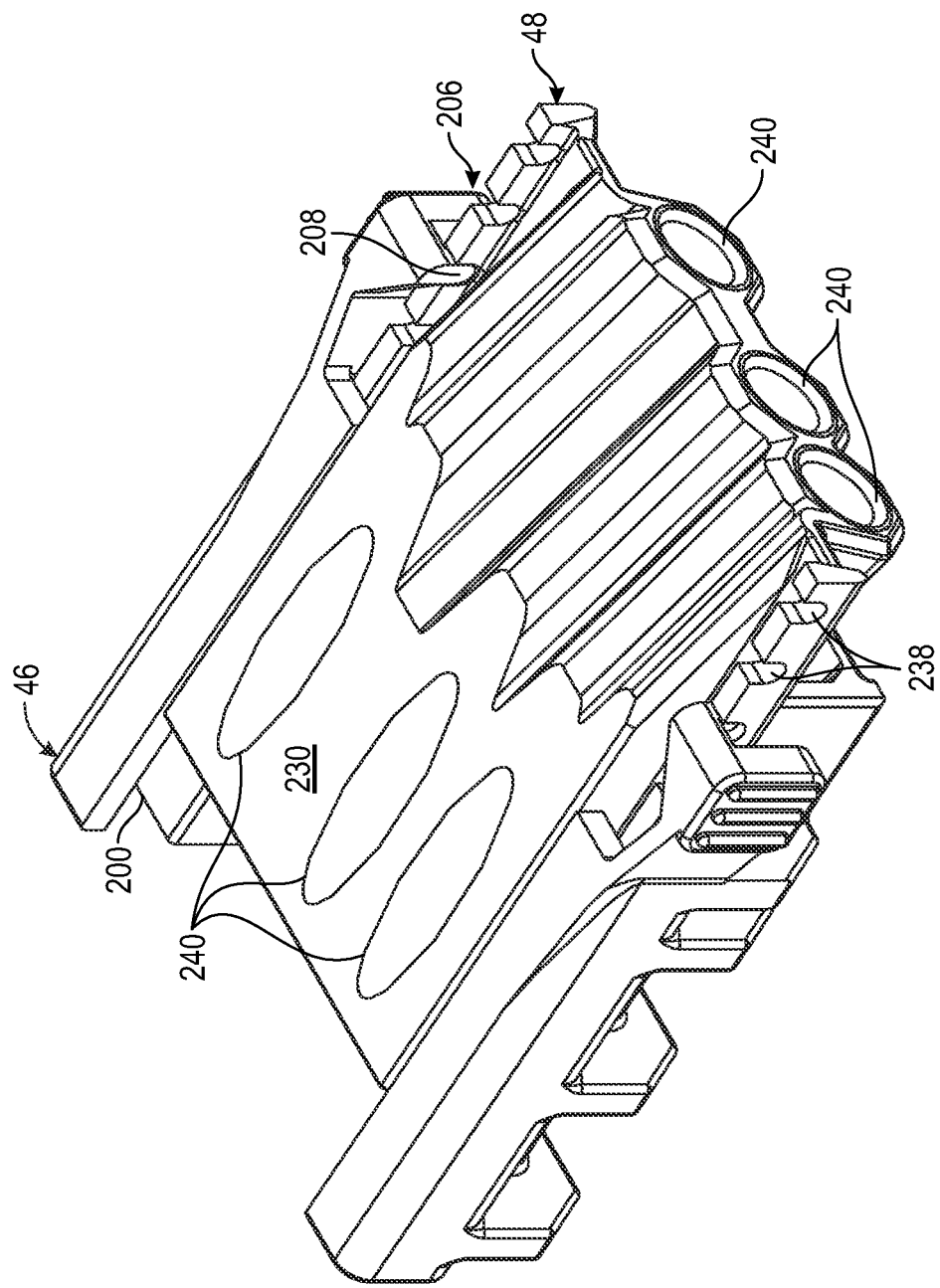
FIG. 17 is another perspective view of the drill guide carrier having the drill guide assembly held therein as is shown in FIG. 1.

In the arrangement shown, as one example, to facilitate a stable platform for clamping and drilling, the outward end 146 of handle assembly 134 includes corner sections 148 positioned at the outward corners of the outward end 142. In this arrangement, as is shown in FIGS. 8 and 9, when system 10 is used in a horizontal manner, with the plane formed by the flat lower end 58 of clamp support 28, the flat lower surface 94 of end stop 30, and the flat lower end 106 of back stop 32, positioned on a flat work surface 144, the planes formed by the corner sections 148 are configured to engage and extend in approximate parallel planar alignment to the plane formed by the flat lower end 58 of clamp support 28, the flat lower surface 94 of end stop 30, and the flat lower end 106 of back stop 32 when handle assembly 134 is tilted to the appropriate angle. This arrangement provides another point of contact for system 10 when used in a horizontal manner on a work surface 144 thereby increasing stability of the system 10 during use. That is, the engagement between work surface 144 and the corner section 148 of outward end 146 of corner section 148 provides a flat and stable support positioned a distance rearward from support section 26. This provides a stabilizing additional and distant point of contact. This arrangement also provide clearance for access to and operation of trigger 44.

Trigger 44 is formed of any suitable size shape and design and is configured to connect to handle assembly 134 and facilitate advancement of clamping rod 40, drill guide carrier 46 and drill guide assembly 48 by iterative squeezing of trigger 44 toward handle assembly 134. In the arrangement shown, as one example, trigger 44 includes a forward side 144 that extends in approximate perpendicular alignment to a pair of opposing sides 150 that extend in approximate parallel spaced relation to one another. In the arrangement shown, as one example, opposing sides 150 and forward side 140 connect at their outward ends to outward end 142.

In the arrangement shown, as one example, trigger 44 is configured to connect to handle assembly 134 at pivot point 152. When squeezed, trigger 44 pivots or rotates upon pivot point 152 which establishes an axis of rotation that extends through handle assembly 134 in a generally perpendicular manner to the length of handle assembly 134. Or, said another way, pivot point 152 forms an axis of rotation that extends through handle assembly 134 from side 138 to side 138. In the arrangement shown, as one example, pivot point 152 is formed of an axle and socket arrangement, wherein the axel is formed as part of trigger 44 and the socket is formed as part of handle assembly 134, however the opposite arrangement is hereby contemplated for use as is any other form of a connection that facilitates connection of handle assembly 134 to trigger 44 while allowing the pivoting or rotation or movement of trigger 44 relative to handle assembly 134.

When trigger 44 is squeezed, the portion of trigger 44 connected to pivot point 152 pivots on the axis formed by pivot point 152. As trigger 44 pivots upon pivot point 152 the rearward side 14 of trigger 44 begins to move inside the hollow interior 130 of handle assembly 134. As the outward end 142 of trigger 44 rotates rearward and into the hollow interior 130 of handle assembly 134, an inward end 154 of trigger 44 moves forward.

Inward end 154 of trigger 44 is positioned on the rearward side of a movement mechanism 156. Movement mechanism 156 is formed of any suitable size, shape and design and is configured to facilitate forward advancement of drill guide carrier 46 and drill guide assembly 48 by squeezing of trigger 44. In the arrangement shown, as one example, movement mechanism 156 is a generally plate-shaped member that is positioned around clamping rod 40 within the hollow interior 130 of clamp body 42. Alternatively, inward end 154 of trigger 44 includes one or more movement mechanisms 156 connected thereto.

In the arrangement shown, as one example, movement mechanism 156 is positioned between a rearward stop 158 and a forward stop 160. Rearward stop 158 and forward stop 160 are connected to and/or formed of the material of the material of clamp body 42 and extend around clamping rod 40 thereby serving as stop features within clamp body 42. Or, said another way, clamping rod 40 extends through rearward stop 158 and forward stop 160 as well as through movement mechanism 156 which is positioned between rearward stop 158 and forward stop 160. In the arrangement shown, the rearward side of movement mechanism 156 is positioned adjacent or against a forward side of the rearward stop 158 and a center spring 162 is positioned around clamping rod 40 between rearward stop 158 and forward stop 160. Center spring 162 applies a force upon movement mechanism 156 forcing movement mechanism 156 rearward against the forward side of rearward stop 158. In this way, center spring 162 causes the return of movement mechanism 156 when trigger 44 is released.

In the arrangement shown, as one example, the outward end of movement mechanism 156 is positioned just in front of and in engagement with the inward end 154 of trigger 44. In this arrangement, when trigger 44 is squeezed, the inward end 154 of trigger 44 forces the outward end of movement mechanism 156 forward. As the trigger 44 moves the movement mechanism 156 forward, overcoming the force of center spring 162 forcing the movement mechanism 156 rearward, the movement mechanism 156 cinches upon the clamping rod 40. Once movement mechanism 156 is cinched or locked onto clamping rod 40 as the movement mechanism 156 moves forward this forces clamping rod 40 forward, which forces the attached drill guide carrier 46 and drill guide assembly 48 forward. In one arrangement, movement mechanism 156 cinches upon clamping rod 40 by angularly tilting upon clamping rod 40.

This forward movement continues until trigger 44 is fully squeezed and fully retracted within the hollow interior 130 of handle assembly 134. When trigger 44 is fully squeezed, movement mechanism 156 is positioned as far forward between rearward stop 158 and forward stop 160 as possible.

Once in this fully forward position, when trigger 44 is released, the outward end 142 of trigger 44 returns to its natural forward-extended position under a spring bias as trigger 44 again rotates upon pivot point 152. As the outward end 142 of trigger 44 rotates forward, the inward end 154 of trigger 44 rotates rearward. As the inward end 154 of trigger 44 rotates rearward, movement mechanism 156 releases its lock on clamping rod 40 and movement mechanism 156 slides rearward over the exterior surface of clamping rod 40 under the bias of center spring 162 until the rearward side of movement mechanism 156 again engages the forward side of rearward stop 158.

At this point, the clamping process may be repeated. In this way, clamping of workpiece 24 is accomplished by repeated gripping of trigger 44 which iteratively moves clamping rod 40, drill guide carrier 46 and drill guide assembly 48 forward until workpiece 24 is fully clamped which establishes the fully clamped position.

A release mechanism 164 is positioned rearward of rearwards stop 158 and forward of rearward end 124 of clamp body 42. Release mechanism 164 is formed of any suitable size shape and design and is configured to facilitate forward movement of clamping rod 40 so as to facilitate clamping, while preventing rearward movement of clamping rod 40 unless release mechanism 164 is released. Release mechanism 164 is also configured to facilitate selective release of clamping rod 40 so as to allow clamping rod 40 to move rearward to a non-clamping position.

In the arrangement shown, as one example, release mechanism 164 includes a forward section 166 and a rearward section 168. In the arrangement shown, as one example, forward section 166 of release mechanism 164 extends in approximate perpendicular alignment to rearward section 168 of release mechanism 164. In the arrangement shown, as one example, release mechanism 164 is a generally planar metallic plate that is bent at a corner positioned between forward section 166 and rearward section 168, however any other arrangement is hereby contemplated for use. In the arrangement shown, as one example, forward section 166 of release mechanism 164 extends in approximate perpendicular alignment to the length of clamping rod 40 which extends through the rearward section 168 of release mechanism 164. In the arrangement shown, as one example, rearward section 168 of release mechanism 164 extends in approximate parallel spaced relation to the length of clamping rod 40. In the arrangement shown, as one example, forward section 166 connects at its end opposite rearward section 168 to clamp body 42. This connection between forward section 166 and clamp body 42 serves as a pivot point for angular rotation of release mechanism 164. In the arrangement shown, as one example, the outward end of forward section 166 connects to the forward end of rearward section 168 which extends rearward therefrom a distance. In the arrangement shown, as one example, rearward section 168 of release mechanism 164 extends through a slot 170 in the rearward end 124 of clamp body 42. In this way, the rearward end of rearward section 166 of release mechanism 164 extends out of the hollow interior 130 of clamp body 42. This allows the rearward end of rearward section 166 to be accessed by a user so as to release the release mechanism 164.

In one arrangement, release mechanism 164 is spring biased or biased by a spring or is arranged and/or aligned with respect to clamping rod 40 so as to allow clamping rod 40 to freely slide forward through forward section 166 while preventing rearward movement of clamping rod 40. When rearward end 168 is depressed, this causes release mechanism 164 to pivot on its connection to clamp body 42 thereby aligning release mechanism 164 with respect to clamping rod 40 so as to allow clamping rod 40 to move rearward upon the spring bias applied to end cap 120.

In the arrangement shown, as one example, when trigger 44 is pulled rearward and clamping rod 40 is advanced forward, release mechanism 164 and/or forward section 166 allows clamping rod 40 to freely move through forward section 166 of release mechanism 164. However, release mechanism 164 prevents rearward movement of clamping rod 40. As such, in this way, release mechanism 164 holds the clamping pressure on workpiece 24. Or, said another way, release mechanism 164 holds clamping rod 40, drill guide carrier 46 and drill guide assembly 48 in a clamping position. Or said another way, release mechanism and/or forward section 166 thereof allow for selective one-way (forward) movement of clamping rod 40 during clamping. That is, until release mechanism 164 and/or forward section 166 is released by depressing release mechanism 164 thereby allowing clamping rod 40 to return. This free forward movement plus rearward locking or cinching is accomplished by an angular orientation between the forward section 166 of release mechanism 164 and the axis of rotation of the clamping rod 40.

To release the clamping pressure, and allow clamping rod 40, drill guide carrier 46 and drill guide assembly 48 to move rearward to the non-clamping position upon the spring bias of return spring 122, the rearward end of rearward section 168 of release mechanism 164 is pressed in a direction away from the axis of rotation of clamping rod 40. In doing so, this causes the forward section 166 of release mechanism 164 to pivot upon clamp body 42 until the opening in forward section 166 squares with the axis of rotation of clamping rod 44 thereby allowing the clamping rod 44 to move rearward through forward section 166 under the pressure or return spring 122 generated between end cap 120 and the rearward end 124 of clamp body 42. In this way, release mechanism 164 selectively locks the clamping rod 40 in a clamping position and selectively allows clamping rod 40 to move to a non-clamping position.

In one arrangement, a release spring 171 is positioned forward of release mechanism 164 and applies a rearward pressure on forward section 166 causing release mechanism 164 to return rearward under the spring bias or release spring 171. In one arrangement, the forward end of release spring 171 engages the rearward side of rearward stop 158 and the rearward end of release spring 171 engages the forward surface of forward section 166.

Attachment Mechanism 172:

In the arrangement shown, as one example, quick grip pocket hole jig system 10 includes an attachment mechanism 172. Attachment mechanism 172 may be formed of any suitable size, shape and design and is configured to facilitate the attachment of the forward end of clamp body 42 to the attachment mechanism 66 in the rearward end of support section 26.

In the arrangement shown, as one example, attachment mechanism 172 includes a collar 174 positioned at a forward end of clamp body 42 and forms a hollow interior 176 positioned rearward of collar 174 and forward of the forward end of forward stop 160. In the arrangement shown, as one example, collar 174 is configured to fit around the cylindrical exterior peripheral surface of first collar 68 of attachment mechanism 66 with close and tight tolerances. As first collar 68 and collar 174 are both cylindrical in shape, this allows for the rotation of the cylindrical interior surface of collar 174 around the cylindrical exterior surface of first collar 68.

When collar 174 is positioned around the first collar 68, the larger second collar 70 is positioned within the hollow interior 176 of attachment mechanism 172. In the arrangement wherein second collar 70 includes a plurality of lock features 72, attachment mechanism 172 includes similar lock features 178 adjacent collar 174 that are configured to engage and lock with lock features 72 of attachment mechanism 66. This engagement between lock features 72 of second collar 70 of attachment mechanism 66 with lock features 178 of collar 174 of attachment mechanism 172 facilitate alignment of clamp body 42 with support section 26 at predetermined angular orientations. In one arrangement, these predetermined angular orientations are at the twelve-o'clock position, one-thirty position, three-o'clock position, four-thirty position, six-o'clock position, seven-thirty position, nine-o'clock position, ten-thirty position, and again at the midnight position, relative to support section 26. However any other predetermined positions are hereby contemplated for use. These predetermined positions help to hold clamp body 42 at desirable angular alignments relative to support section 26, such as at the angular orientations that align corner sections 148 in planar alignment with the plane of the bottom side of support section 26. Alternatively, no predetermined positions are present and in this arrangement clamp body 42 may be infinitely aligned at any angular orientation relative to support section 26.

A forward spring 180 is positioned within hollow interior 176 of attachment mechanism 172 around clamping rod 40 and is positioned between the forward side of forward stop 160 and the rearward side of second collar 70. Forward spring 180 provides a spring bias force forcing support section 26 away from clamp body 42. More specifically, the spring bias force generated by forward spring 180 forces second collar 70 of attachment mechanism 66 into collar 174 of attachment mechanism 172. This spring bias force of forward spring 180 naturally urges meshing of the lock features 72 of second collar 72 of attachment mechanism 66 with the lock features 178 of collar 174 of attachment mechanism 172. In this way, forward spring 180 helps to hold the clamp body 42 at selected angular orientations relative to support section 26.

In the arrangement shown, as one example, when attachment mechanism 66 of support section 26 includes lock features 72 in second collar 70 that mesh with lock features 178 of collar 174 of attachment mechanism 172 of clamp body 42, to adjust the angular orientation of clamp body 42 relative to support section 26, the user applies a force pushing clamp body 42 toward support section 26 that overcomes the force generated by forward spring 180. Once the lock features 178 of collar 174 clear the lock features 72 in second collar 70 the clamp body 42 may be rotated around the axis of rotation established by clamping rod 40 to the desired angular orientation. Once the user releases the force forcing clamp body 42 toward support section 26 the spring bias force of forward spring 180 again forces clamp body 42 and support section 26 away from one another thereby causing meshing of lock features 72 of second collar 70 of attachment mechanism 66 of support section 26 with lock features 178 of collar 174 of attachment mechanism 172 of clamp body 42.

One of the benefits of attachment mechanism 172 is that it allows for angular rotation of clamp body 42 regardless whether stop collar 82 is locked in place on clamping rod 40. This is because the engagement of attachment member 66 of support section 26 with attachment member 172 of clamp body 42 is positioned rearward of the engagement between stop collar 82 and clamping rod 40.

Connection Members 182:

In the arrangement shown, as one example, halves 126 of clamp body 42 connect to one another at a plurality connection members 182. Connection members 182 may be formed of any suitable size, shape and design and are configured to connect opposing halves 126 of clamp body 42 to one another. In the arrangement shown, as one example, connection members 182 are formed of holes that are configured to receive fasteners 184, such as screws, bolts, nuts, snap fit members, or any other member that facilitates attachment of one component to another. In the arrangement shown, as one example, a connection member 182 is positioned adjacent the rearward and outward end of handle assembly 134, another connection member 182 is positioned just rearward of trigger 44 adjacent the inward end of trigger 44, and another connection member 182 is positioned forward of trigger 44 adjacent the inward end of trigger and adjacent the rearward end of attachment mechanism 172.

In the arrangement shown, as one example, fastener 184 is formed of a screw and nut arrangement wherein one side of clamp body 42 receives the nut and the opposite side of clamp body 42 receives the screw. Once installed, the screw and nut are tightened in threaded engagement with one another thereby pulling the opposing halves 126 into tight engagement with one another along seam line 128 and thereby securely holding the internal components of clamp assembly 38 within the hollow interior 130 of clamp body 42.

Drill Guide Carrier 46:

In the arrangement shown, as one example, quick grip pocket hole jig system 10 includes a drill guide carrier 46. Drill guide carrier 46 may be formed of any suitable size, shape and design and is configured to hold and facilitate adjustment of drill guide assembly 48 therein. In the arrangement shown, as one example, drill guide carrier 46 includes a center wall 186 that connects at its outward edges to sidewalls 188.

In the arrangement shown, as one example, center wall 186 of drill guide carrier 46 connects to the forward end 116 of clamping rod 40 by any manner, method or means. In the arrangement shown, as one example, the forward end 116 of clamping rod 40 includes an inward step that includes threads thereon. In this arrangement, the wider portion of clamping rod 40, prior to the inward step, engages the rearward side 190 of center wall 186 while the narrower portion extends through a hole 192 in center wall 186 and receives a nut or other fastening member on a forward side 194 of center wall 186 thereby connecting the forward end 116 of clamping rod 40 to center wall 186 of drill guide carrier 46.

In the arrangement shown, forward side 194 of center wall 186 and interior sides 196 of sidewalls 188 define a hollow interior 198 that is sized and shaped to receive drill guide assembly 48 therein. In the arrangement shown, as one example, a slot 200 is positioned at the outward sides of center wall 186 and at the forward end of sidewalls 188. Slots 200 extend vertically through drill guide carrier 46 from an upper end 202 to a lower end 204. Slots 200 are sized and shaped to receive the sides of drill guide assembly 48 therein while allowing drill guide assembly 48 to be vertically adjusted so as to accommodate workpieces 24 of varying thickness.

In the arrangement shown, as one example, slots 200 are defined by between forward wall 200A, end wall 200B and rear wall 200C. In the arrangement shown, as one example, the rearward facing surface of forward wall 200A faces and extends in approximate parallel spaced relation to the forward facing surface of rear wall 200C. In the arrangement shown, as one example, the inward facing surface of end wall 200B extends in approximate perpendicular spaced relation to forward wall 200A and rear wall 200C when viewed from above or below. However any other arrangement is hereby contemplated for use.

In the arrangement shown, as one example, the inward end of rear wall 200C connects to the forward end of sidewall 188 and rear wall 200C extends outward therefrom in an approximate perpendicular alignment to the plane formed by the interior side 196 of sidewall 188; the outward end of rear wall 200C connects to the rearward end of end wall 200B and end wall 200B extends forward therefrom in an approximate perpendicular alignment to the plane formed by the forward facing surface of rear wall 200C; the forward end of end wall 200B connects to the outward end of forward wall 200A and forward wall 200A extends inward therefrom in an approximate perpendicular alignment to the plane formed by the inward facing surface of end wall 200B. In this way a generally square or rectangular shaped slot 200 is formed. The size and shape of slots 200 correspond in size and shape with a In the arrangement shown, as one example, a lock mechanism 206 is positioned at the upper end of slots 200 and includes a lock feature 208. Lock mechanism 206 and lock member 208 are formed of any suitable size, shape and design and are configured to selectively engage and hold drill guide assembly 48 in place in drill guide carrier 46 at predetermined positions. In the arrangement shown, as one example, lock mechanism 206 includes an arm 210 that extends upward and slightly outward adjacent the upper end 212 of slot 200. A pad 214 is connected to the upper end of arm 210 and includes a plurality of friction members 216 positioned in its exterior facing surface that are configured to facilitate easy gripping and inward squeezing of pad 214. A forward arm 218 is connected to the forward side of pad 214 that extends inward a distance from the forward side of pad 214. At least one lock feature 208 is connected to the inward end of forward arm 218 and extends rearward a distance before terminating in a rounded end. Any other configuration is hereby contemplated for use as lock mechanism 206 and lock feature 208.

In the arrangement shown, as one example, arms 210 are configured to bias pads 214 and their lock feature 208 slightly outward. As such, in use a user presses opposing pads 214 inward toward one another until the channel formed between the inward facing surface of pad 214, the rearward facing surface of forward arm 218 and the outward facing surface of lock feature 208 align with the slot 200 at which point drill guide assembly 48 is free to slide up and down within slots 200. Pressing inward on pads 214 causes arms 210 to flex inward. Or, said another way, pressure is applied on pads 214 thereby overcoming the outward spring bias force of arms 210. In this way, lock mechanism 206 is a spring loaded mechanism that is configured to lock drill guide assembly 48 in place on drill guide carrier 46. When pressure is released from pads 214 the natural spring bias of arms 210 causes lock feature 208 to engage and lock to drill guide assembly 48. In their natural state, the angle of arms 210 causes lock features 208 to be positioned in the approximate middle of slots 200, when viewed from above or below. Or in another arrangement, the natural bias of arms 210 cause lock features 208 to obstruct the clear passage of slots 200.

In one arrangement, drill guide carrier 46 is formed by molding, injection molding, machining or by forming in any other manner. In this way, a spring loaded mechanism is presented that is unitary and monolithic with drill guide carrier 46 thereby eliminating assembly and additional parts and pieces. In addition to this arrangement being durable, strong, rugged and long lasting, this arrangement is easy to use and provides secure locking of the drill guide assembly 48 with respect to drill guide carrier 46. In one arrangement, lock mechanism 206 is formed of the same material as the rest of drill guide carrier 46, whereas, in another arrangement, lock mechanism 206 is formed of a different material as the rest of drill guide carrier 46. In an alternative arrangement, lock mechanism 206 is a separate component that is attached to drill guide carrier 46.

In the arrangement shown, as one example, drill guide carrier 46 includes a plurality of structural features 220. In the arrangement shown, as one example, structural features 220 extend across the rearward side 190 of center wall 186 and extend around the outward sides 222 of sidewalls 188. In this way, structural features 220 provide enhanced structural strength and rigidity to drill guide carrier 46 while minimizing the material needed for drill guide carrier 46. In this way a strong but light drill guide carrier is presented.

Drill guide carrier 46 is configured to receive and hold drill guide assembly 48 therein.

Drill Guide Assembly:

In the arrangement shown, as one example, quick grip pocket hole jig system 10 includes drill guide assembly 48. Drill guide assembly 48 may be formed of any suitable size, shape and design and is configured to be held by drill guide carrier 46 and is configured to receive and guide stepped drill bits at a specified angle so as to facilitate drilling of pocket holes in workpiece 24.

In the arrangement shown, as one example, drill guide assembly 48 includes an opposing upper end 224 and lower end 226, opposing sides 228, and an opposing forward face 230 and rearward wall 232. In the arrangement shown, as one example, upper end 224 and lower end 226 extend in approximate parallel spaced relation to one another, opposing sides 228 extend in approximate parallel spaced relation to one another, and opposing forward face 230 and rearward wall 232 extend in approximate parallel spaced relation to one another. In the arrangement shown, as one example, upper end 224 and lower end 226 extend in approximate perpendicular alignment to forward face 230 and rearward wall 232, upper end 224 and lower end 226 extend in approximate perpendicular alignment to sides 228, and forward face 230 and rearward wall 232 extend in approximate perpendicular alignment to sides 228. In this way a generally rectangular shaped member is formed, with the other features described herein.

In the arrangement shown, as one example, a pair of slots 234 are positioned adjacent sides 228 and extend from upper end 224 to lower end 226. In the arrangement shown, as one example, slots 234 open to the forward face 230 spaced inward a distance from sides 228.

In the arrangement shown, as one example, the forward edge 236 of drill guide assembly 28 outward from slots 234 is recess slightly to the plane formed by forward face 230. Forward edge 236 extends in parallel spaced relation to the plane formed by forward face 230. The recess of forward edges 236 outward from slots 234 provides clearance for the sides 228 of drill guide assembly 48 to pass the forward arm 218 of lock mechanism 206 of drill guide carrier 46.

In the arrangement shown, as one example, a plurality of lock features 238 are positioned in forward edge 236. In the arrangement shown, as one example, lock features 238 are formed of rounded notches or recesses or slots that extend a distance rearward from the forward surface of forward edge 236. In the arrangement shown, as one example, these lock features 238 are positioned at spaced intervals from the upper end 224 and extend downward therefrom a distance. In the arrangement shown, as one example, four lock features 238 are presented, with the placement of each lock feature 238 corresponding to a common thickness of workpiece 24 such as ½ inch, ¾ inch, 1 inch and 1½ inch, as one example. Any other number of lock features 238 are hereby contemplated for use such as none, one, two, three, four, five, six, seven, eight, nine, ten or more, at any spacing or distance.

In the arrangement shown, as one example, drill guide assembly 48 includes a plurality of drill guides 240 having a cylindrical bore that extend through drill guide assembly 48 at an angle. Drill guides 240 are generally cylindrical members that are configured to receive and guide a stepped drill bit into workpiece 24 at an angle. In one arrangement, drill guide 240 are formed of a hardened metallic material, so as to maximize wear resistance, whereas the rest of the drill guide assembly 48 is formed of a plastic or composite or non-metallic material. In the arrangement shown, as one example, drill guides 240 extend through drill guide assembly 48 at an approximate fifteen degree angle such that the bores of drill guides 240 extend from the upper end 224 through the forward face 230 of drill guide assembly 48. However, any other angle is hereby contemplated for use from one degree to eighty nine degrees. The result is the bores of drill guides 240 exit the forward face 230 adjacent lower end 226 in vertically extending oval openings.

In the arrangement shown, as one example, three drill guides 240 are presented, however any other number of drill guides 240 are hereby contemplated for use such as one, two, three, four, five, six, seven, eight, nine or ten or more. In the arrangement shown, as one arrangement, two drill guides 240 are positioned closer to one another whereas a third drill guide 240 is positioned a distance away from the other drill guides 240. This arrangement provides various spacing options when drilling pocket holes in a workpiece 24.

To provide support for drill guides 240 support columns 242 are positioned around drill guides 240. In the arrangement shown, as one example, support columns 242 are formed of additional material of drill guide assembly 48 that surrounds drill guides 240 and provides additional strength and rigidity to drill guides 240. Due to the narrow forward-to-back width of drill guide assembly 48, support columns 242 as well as drill guides 240 extend outward from the rearward wall 232 as they extend upward at an angle. In one arrangement, as is shown, accommodations are made in the upper end of center wall 186 of drill guide carrier 46 to provide clearance for these protruding support columns 242. In one arrangement, these accommodations include the upper end of center wall 186 to angle rearward at its upper end 202.

In one arrangement, drill guide assembly 48 is formed of a single monolithic member formed of a plastic or composite material with metallic drill guides 240 positioned and held therein. In an alternative arrangement, drill guide assembly 48 may be formed of one or more parts or pieces that are assembled together. Any other size, shape or configuration is hereby contemplated for use with drill guide assembly 48.

Installation of Drill Guide Assembly into Drill Guide Carrier:

In the arrangement shown, as one example, drill guide assembly 48 is installed into drill guide carrier 46 by aligning the lower end 226 of drill guide assembly 48 with the hollow interior 198 of drill guide carrier 46. Once in this alignment, the lower end 226 of drill guide assembly 48 is slid downward such that the sides 228 of drill guide assembly 48 are held within the slots 200 of drill guide carrier 46. In one arrangement, to facilitate installation of drill guide assembly 48 into drill guide carrier 46, pads 214 of lock mechanisms 206 of drill guide carrier 46 are forced inward so as to move the lock features 208 out of the slot 200 so as to allow for passage of drill guide assembly 48 through slots 200 of drill guide carrier 46. Once drill guide assembly 48 reaches its desired position, inward pressure is released on pads 214 of lock mechanisms 206 of drill guide carrier 46 thereby causing the natural bias of arms 210 to move lock features 208 outward and into lock features 238 of drill guide assembly 48 thereby locking the position of the drill guide assembly 48 relative to drill guide carrier 46.

To adjust the position of the drill guide assembly 48 relative to the drill guide carrier 48, inward pressure is applied to the pads 214 of lock mechanism 206 of drill guide carrier 46 thereby causing pads 214 to move inward thereby causing the post that is lock feature 208 of lock mechanism 206 of drill guide carrier 46 to move inward and out of the slot 234 that is lock feature 238 of drill guide assembly 48. Once in this position, drill guide assembly 48 is free to slide up and down within drill guide carrier 46. Once the desired position is achieved, again, inward pressure is removed from pads 214 of lock mechanism 206 of drill guide carrier 46 and the posts that are lock features 208 of drill guide carrier 46 move into the slots that are lock features 238 of drill guide assembly 48 thereby locking the position of the drill guide assembly 48 relative to drill guide carrier 46 in its new position.

Once drill guide assembly 48 is installed in drill guide carrier 46, the forward face 230 of drill guide assembly 48 is positioned in approximate parallel planar alignment with the planes formed by the forward side of forward wall 200A. As such, a flat forward surface, combined of both drill guide carrier 46 and drill guide assembly 48, engages the side of workpiece 24 upon clamping.

Figure 18:
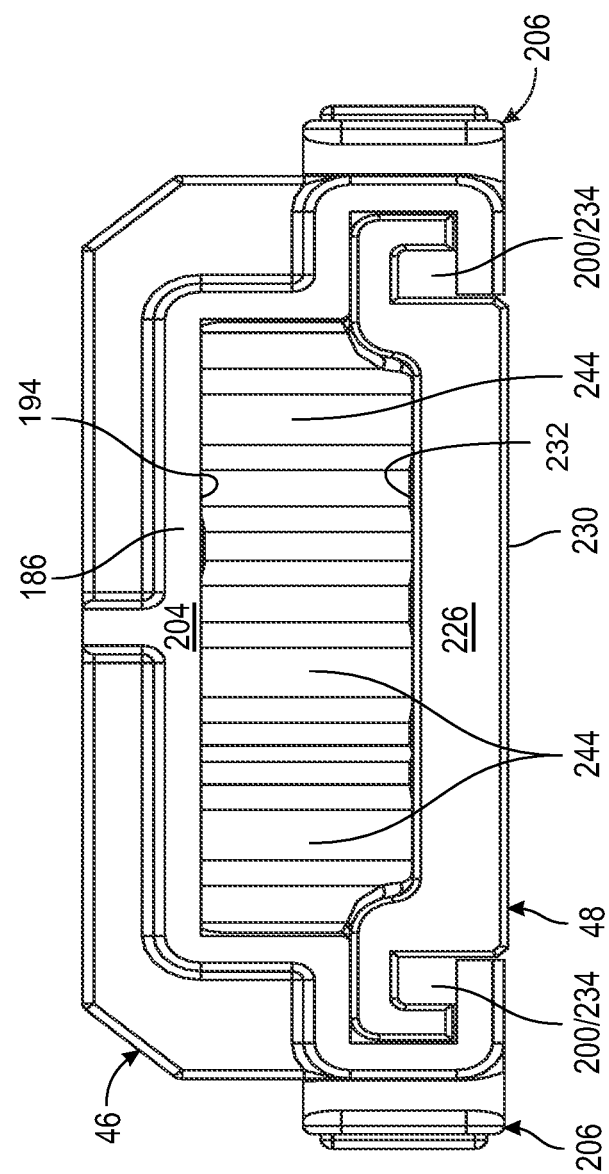
FIG. 18 is a bottom elevation view of the drill guide carrier having the drill guide assembly held therein as is shown in FIG. 1; the view showing the drill guide assembly having exit holes in the bottom side of the drill guide assembly that connect to bores in the drill guides in the drill guide assembly.
Figure 19:
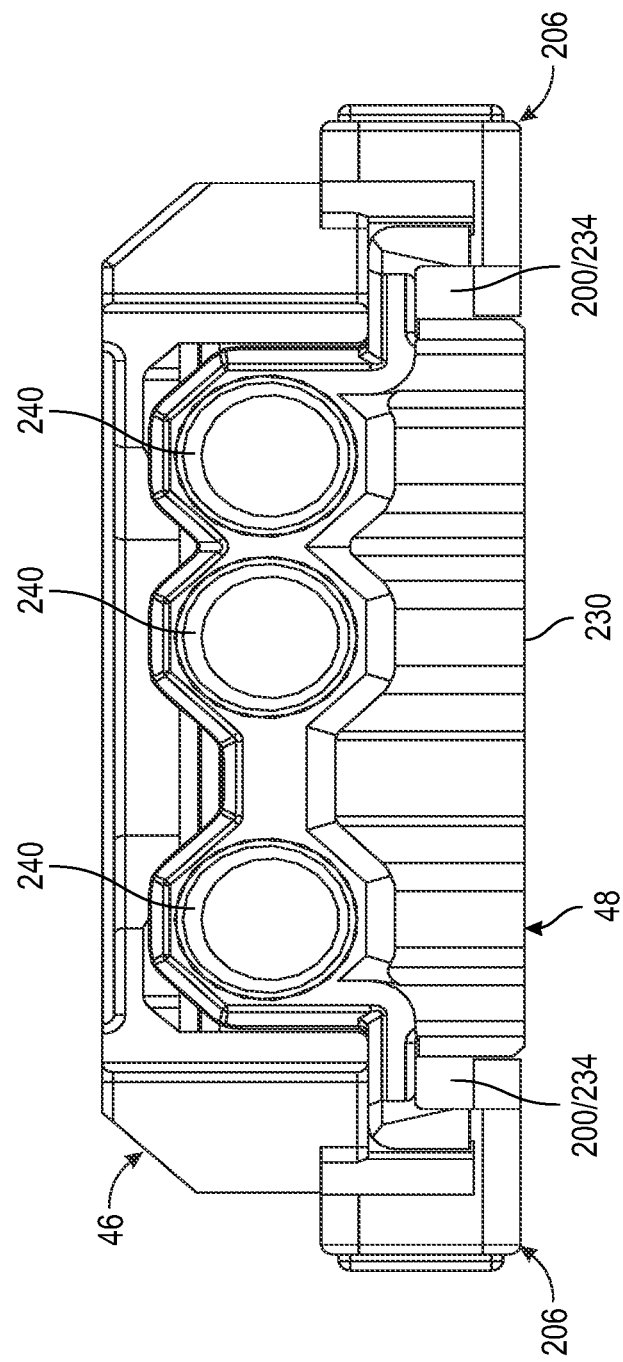
FIG. 19 is a top elevation view of the drill guide carrier having the drill guide assembly held therein as is shown in FIG. 1.
Figure 20:
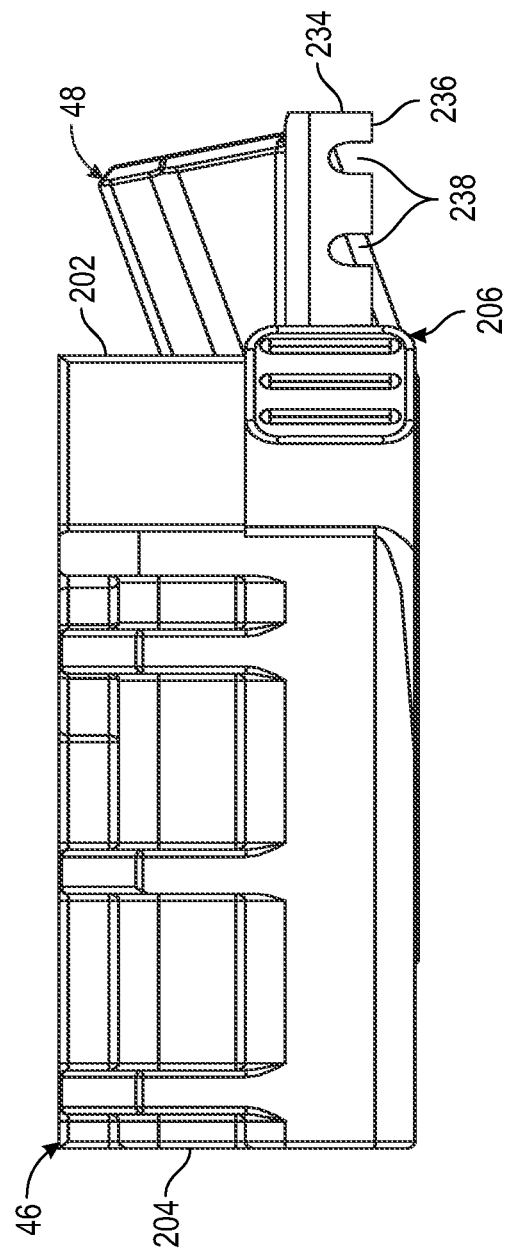
FIG. 20 is a side elevation view of the drill guide carrier having the drill guide assembly held therein as is shown in FIG. 1.
Figure 21:
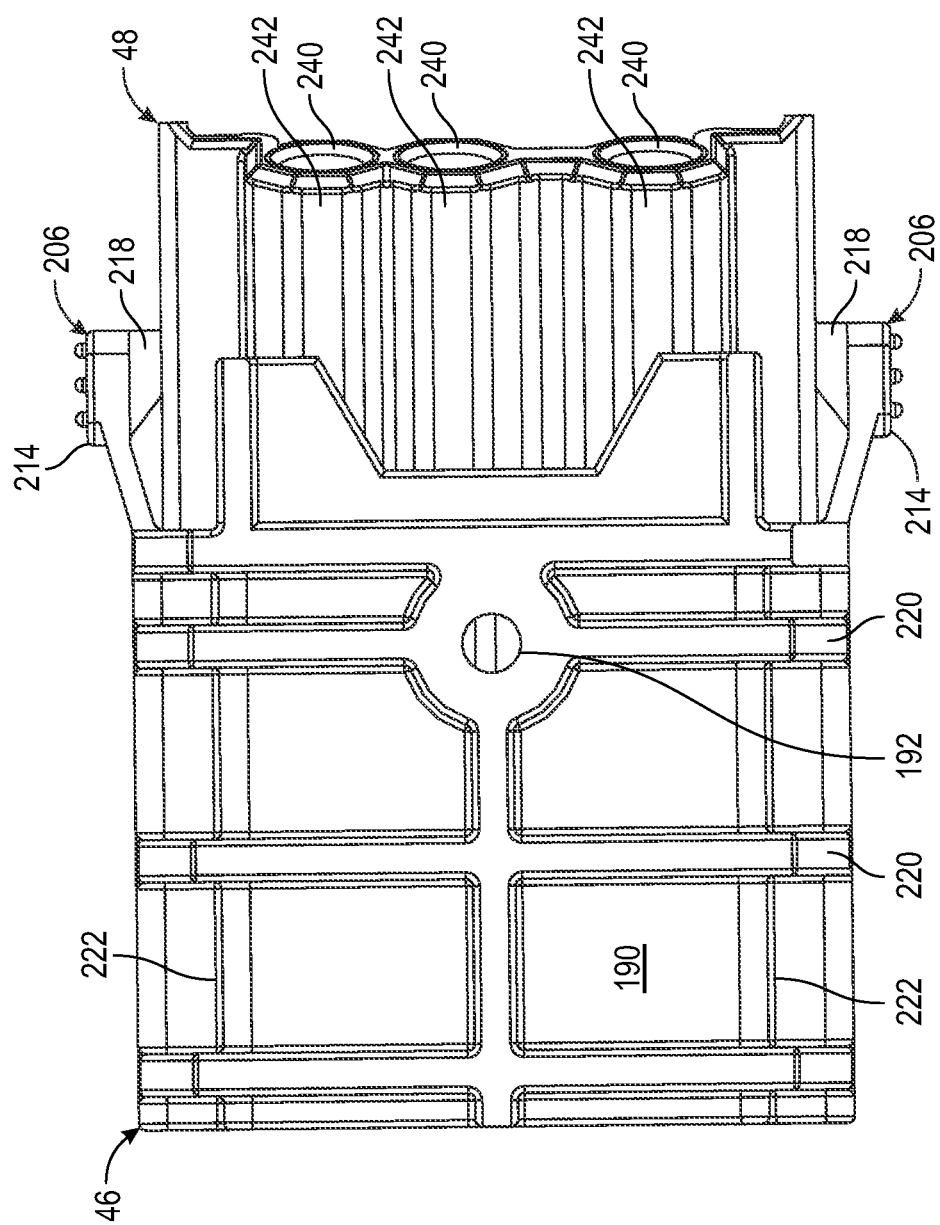
FIG. 21 is a rear elevation view of the drill guide carrier having the drill guide assembly held therein as is shown in FIG. 1.
Figure 22:
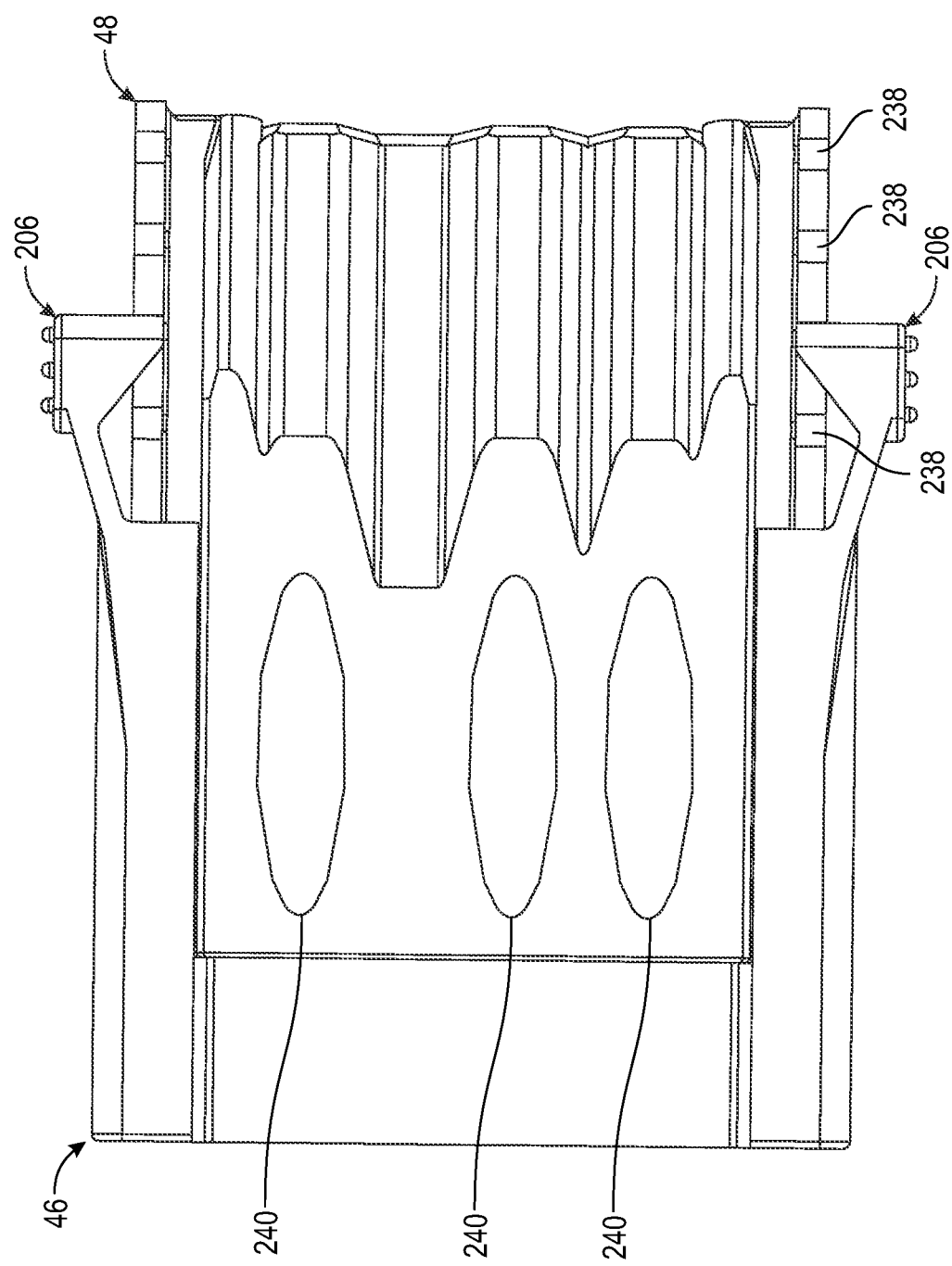
FIG. 22 is a front elevation view of the drill guide carrier having the drill guide assembly held therein as is shown in FIG. 1.
Figure 23:
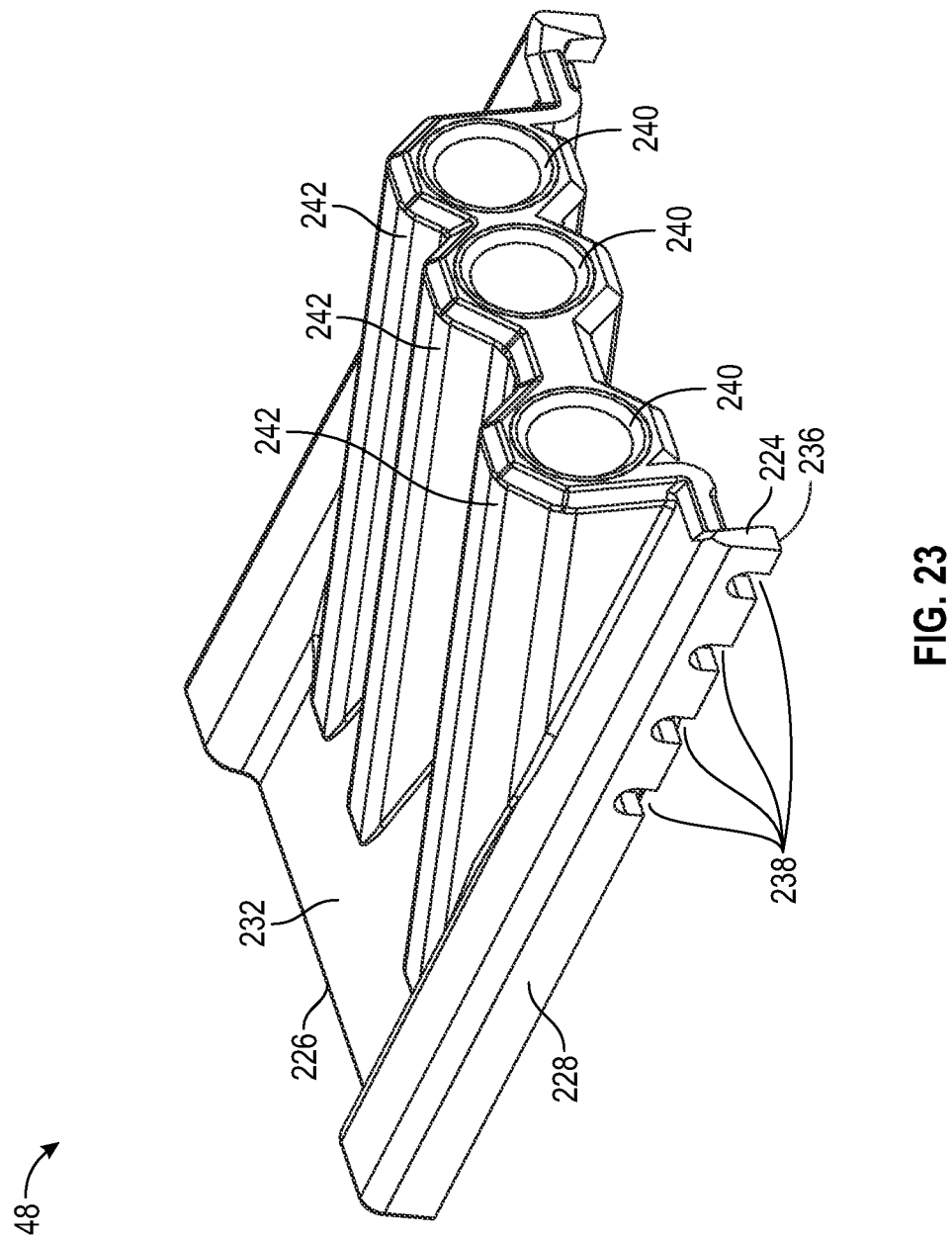
FIG. 23 is a perspective view of the drill guide assembly shown in FIG. 1.
Figure 24:
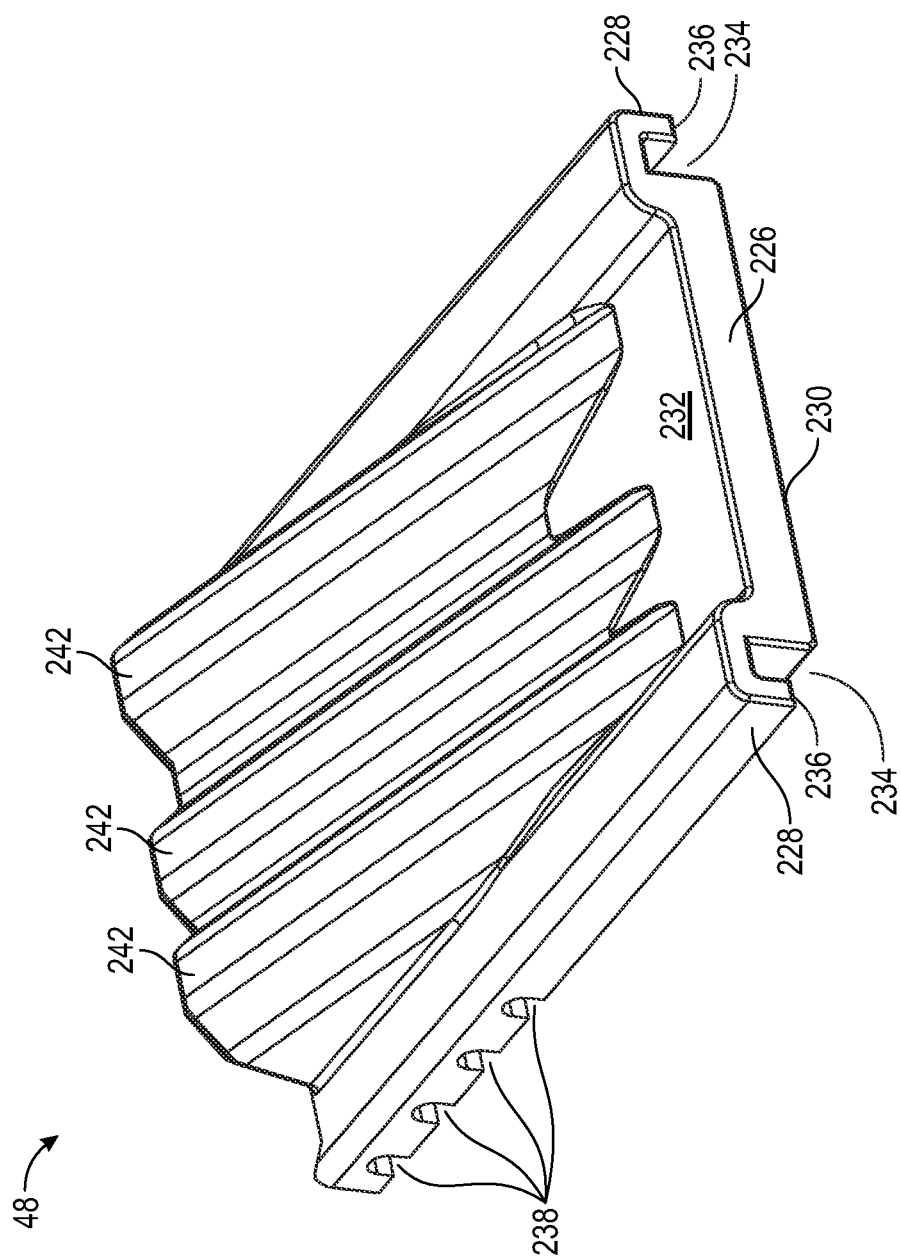
FIG. 24 is another perspective view of the drill guide assembly shown in FIG. 1.
Figure 25:
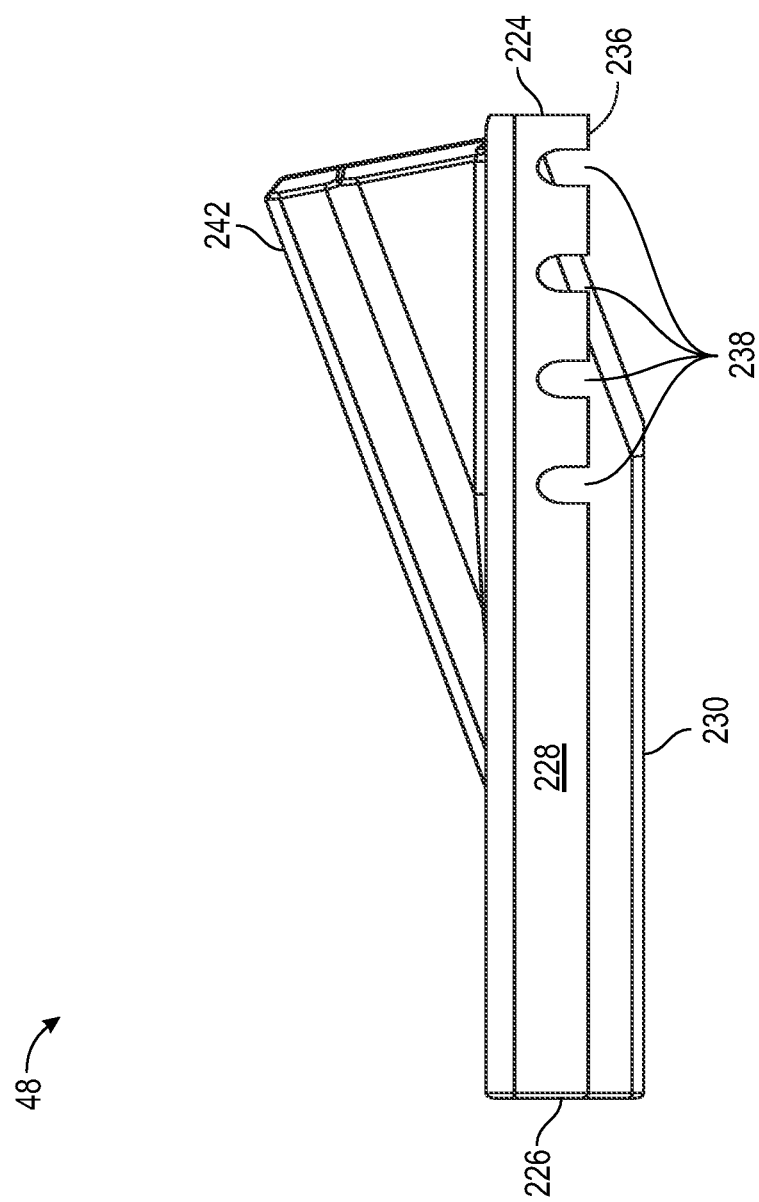
FIG. 25 is a side elevation view of the drill guide assembly shown in FIG. 1.
Figure 26:
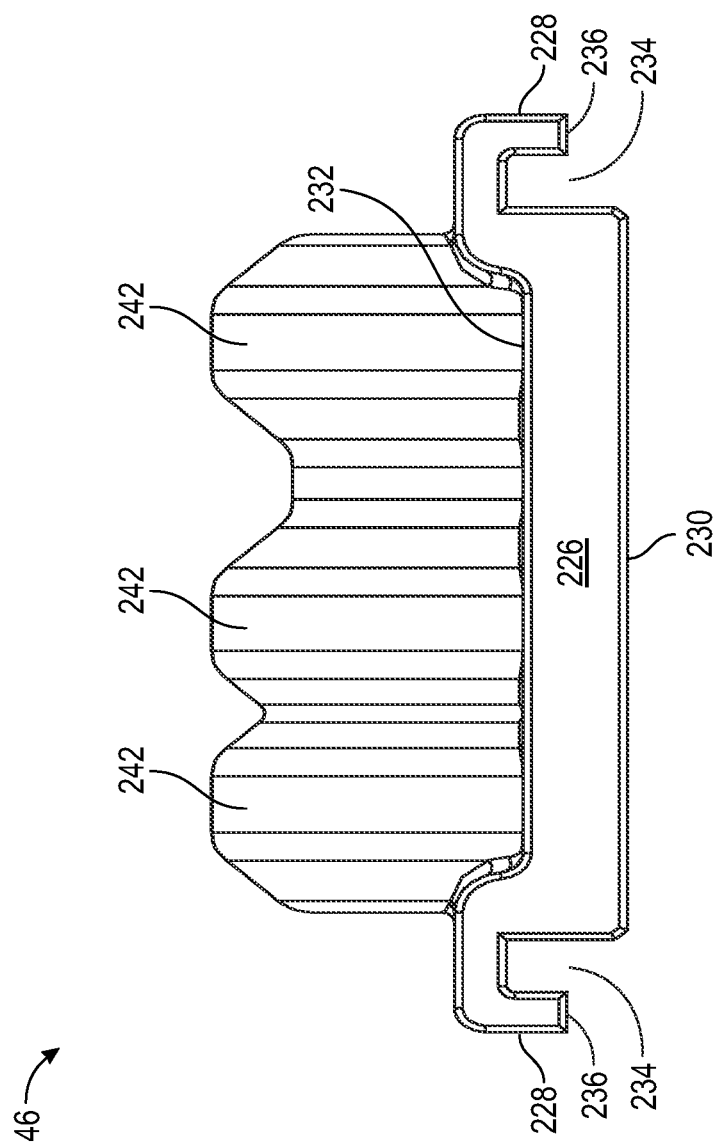
FIG. 26 is a bottom elevation view of the drill guide assembly shown in FIG. 1.
Figure 27:
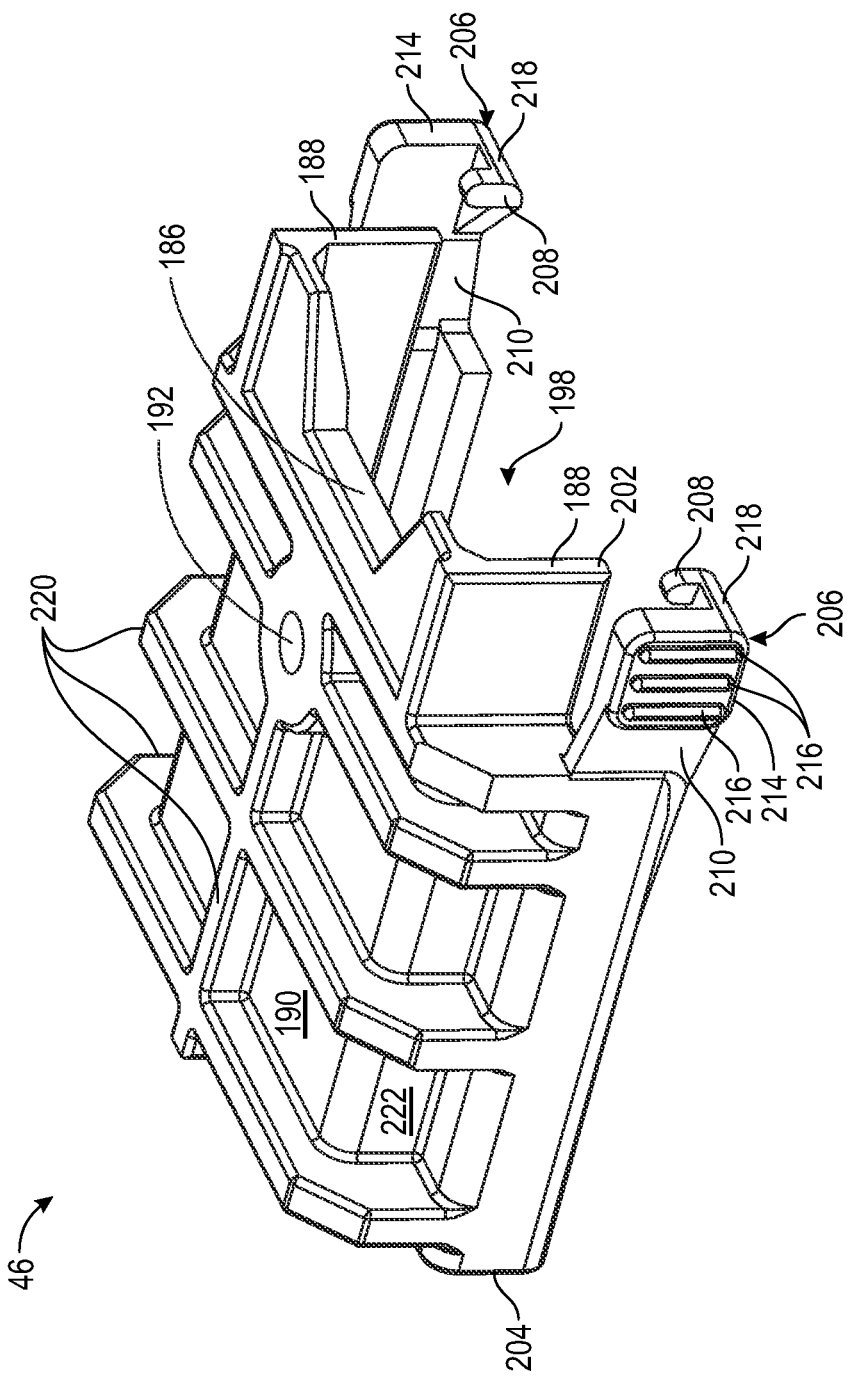
FIG. 27 is a perspective view of the drill guide carrier as is shown in FIG. 1.
Figure 28:
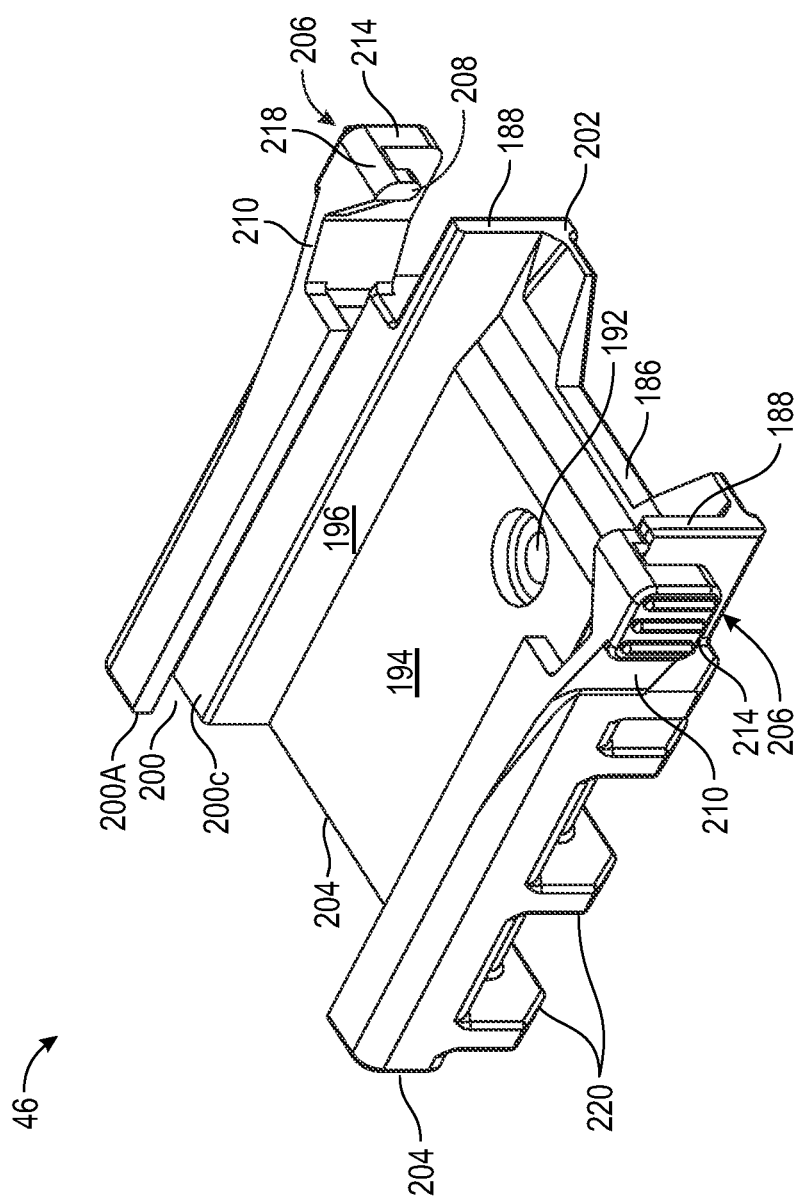
FIG. 28 is another perspective view of the drill guide carrier as is shown in FIG. 1.
Figure 29:
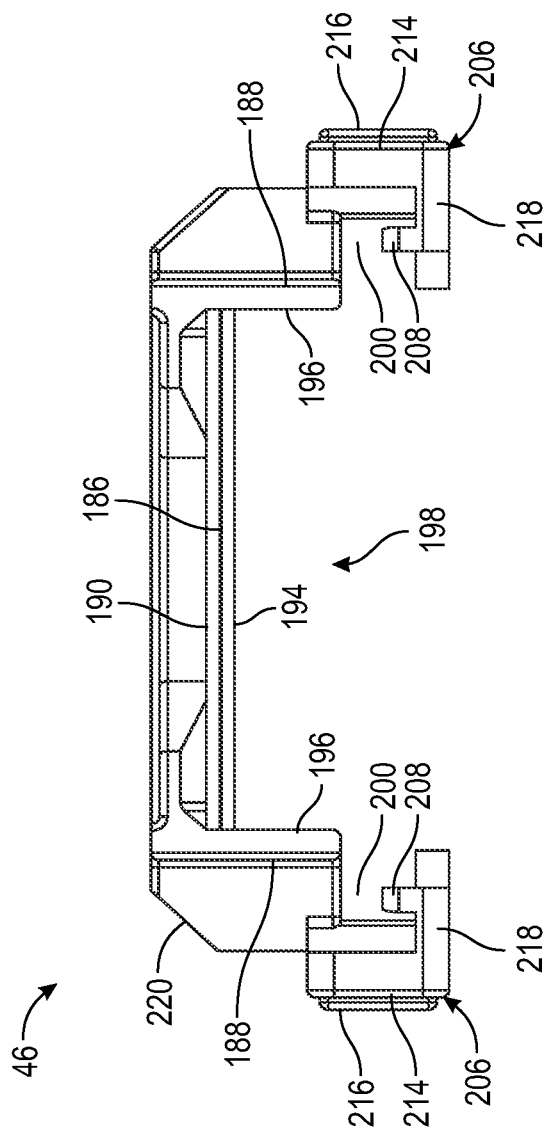
FIG. 29 is a top elevation view of the drill guide carrier as is shown in FIG. 1.
Figure 30:
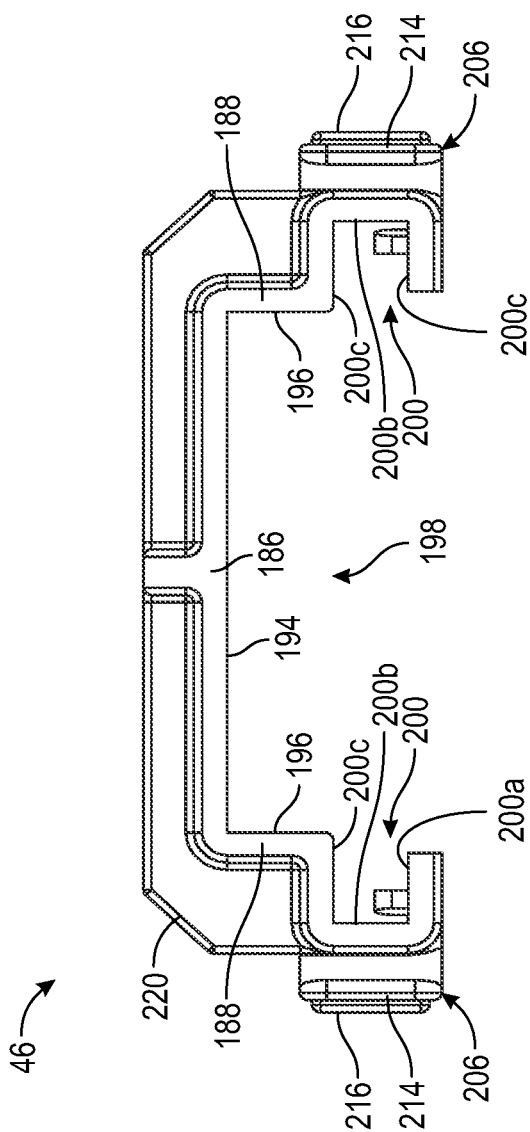
FIG. 30 is a bottom elevation view of the drill guide carrier as is shown in FIG. 1.
Figure 31:
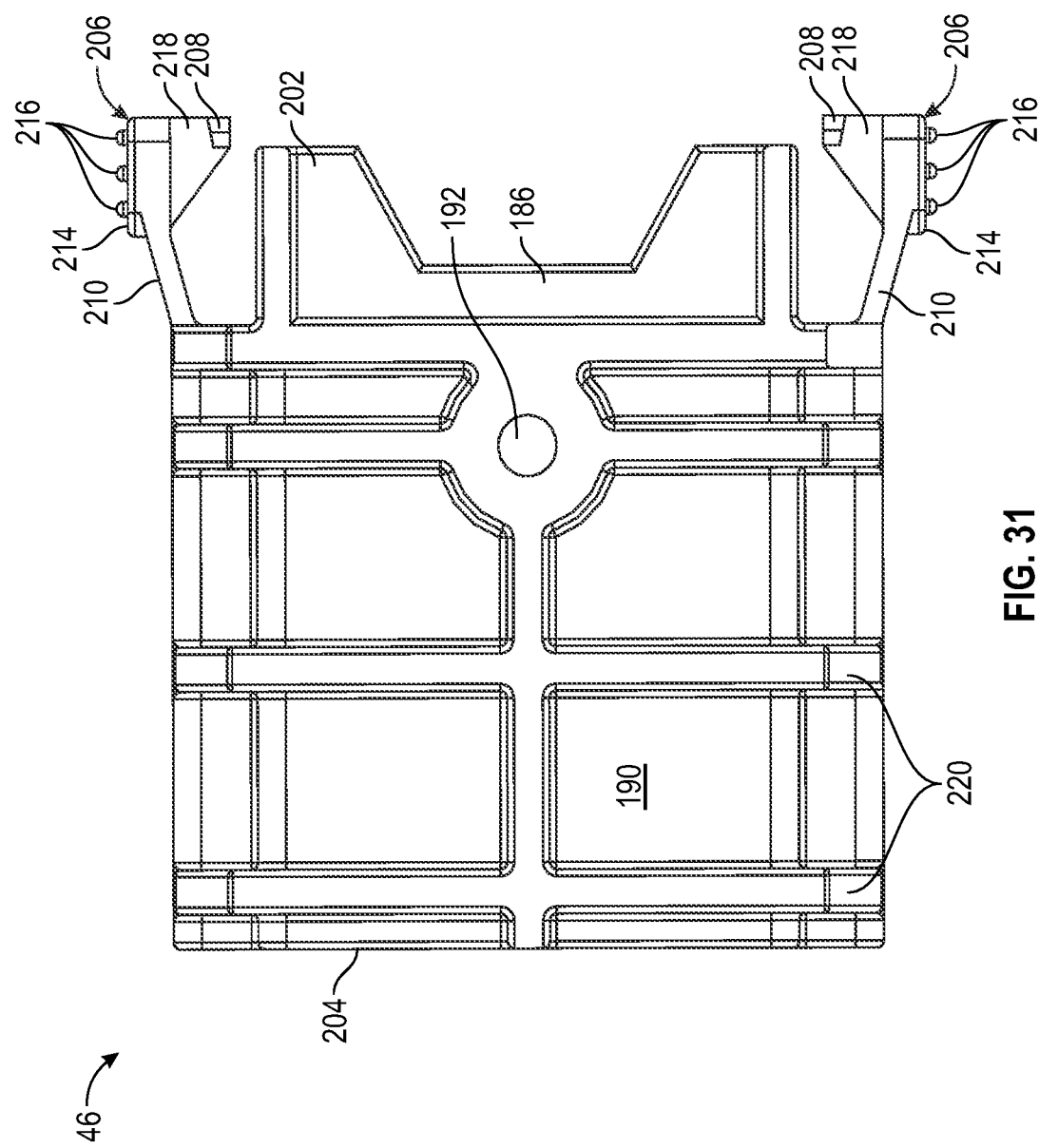
FIG. 31 is a rear elevation view of the drill guide carrier as is shown in FIG. 1.
Figure 32:
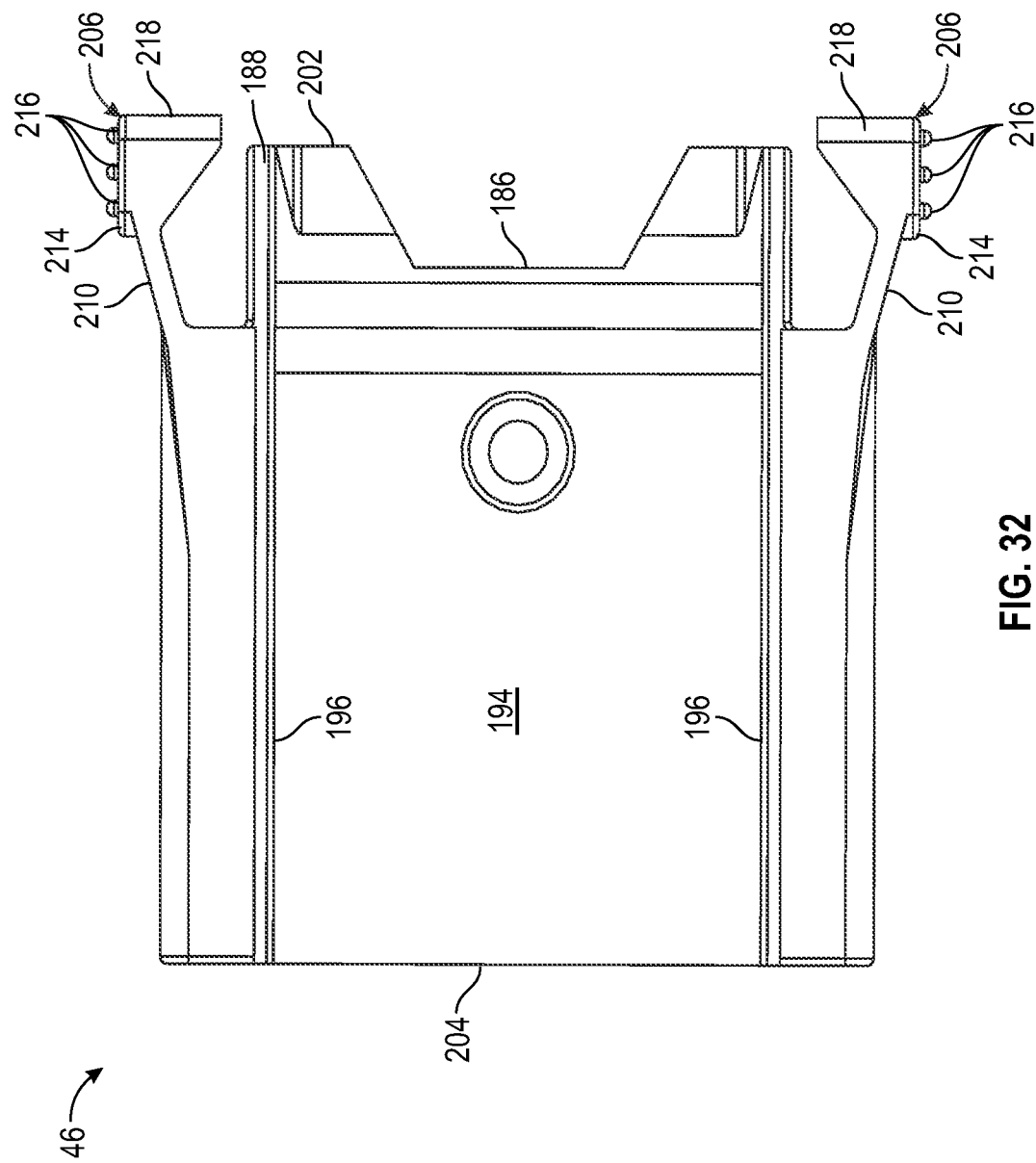
FIG. 32 is a front elevation view of the drill guide carrier as is shown in FIG. 1.
Figure 33:
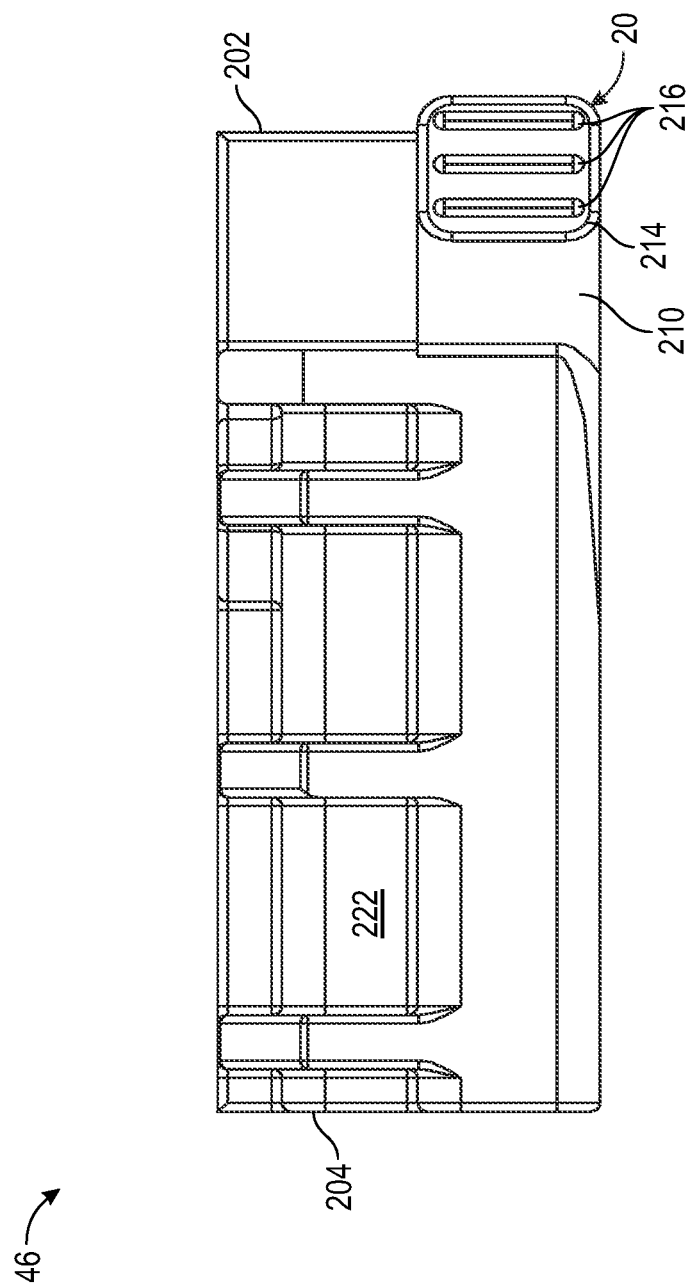
FIG. 33 is a side elevation view of the drill guide carrier as is shown in FIG. 1.
Figure 34:
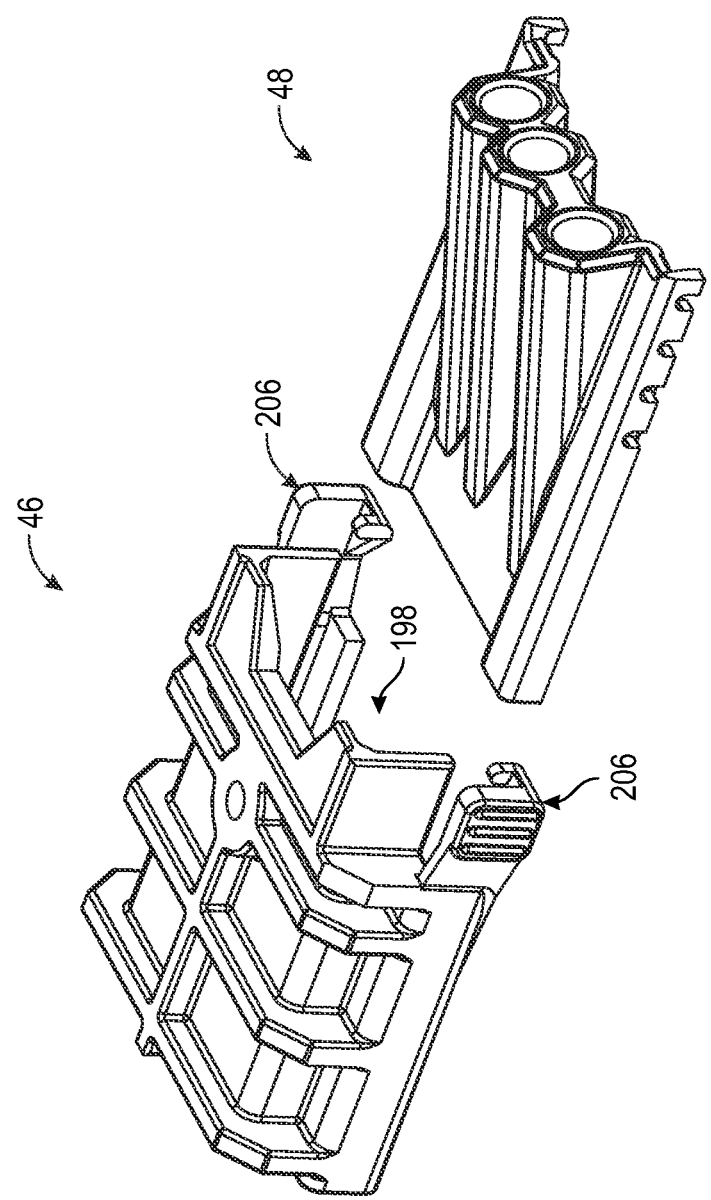
FIG. 34 is a perspective exploded view of the drill guide carrier and drill guide assembly as is shown in FIG. 1.

With reference to the bottom view of FIG. 18 which shows drill guide assembly 48 installed within drill guide carrier 46, in one arrangement a space is positioned between the lower end of the forward side 194 of center wall 186 of drill guide carrier 46 and the lower end of the rear wall 232 of drill guide assembly 48. In one arrangement, channels 244 connect to the bore of drill guides 240 of drill guide assembly 48 and allow passage of woodchips, dust and debris out of the bore of drill guides 240 during drilling. In the arrangement shown, as one example, woodchips, dust and debris exiting channels 244 may fall downward and out of system 10 in the space between forward side 194 of center wall 186 of drill guide carrier 46 on one side and the rearward wall 232 of drill guide assembly 48 on the other side. These woodchips, dust and debris may then fall through the slots 98 in the end stop 30 of support section 26 thereby allowing the woodchips, dust and debris to fully exit system 10, this is especially true when a vacuum attachment is used.

Figure 35:
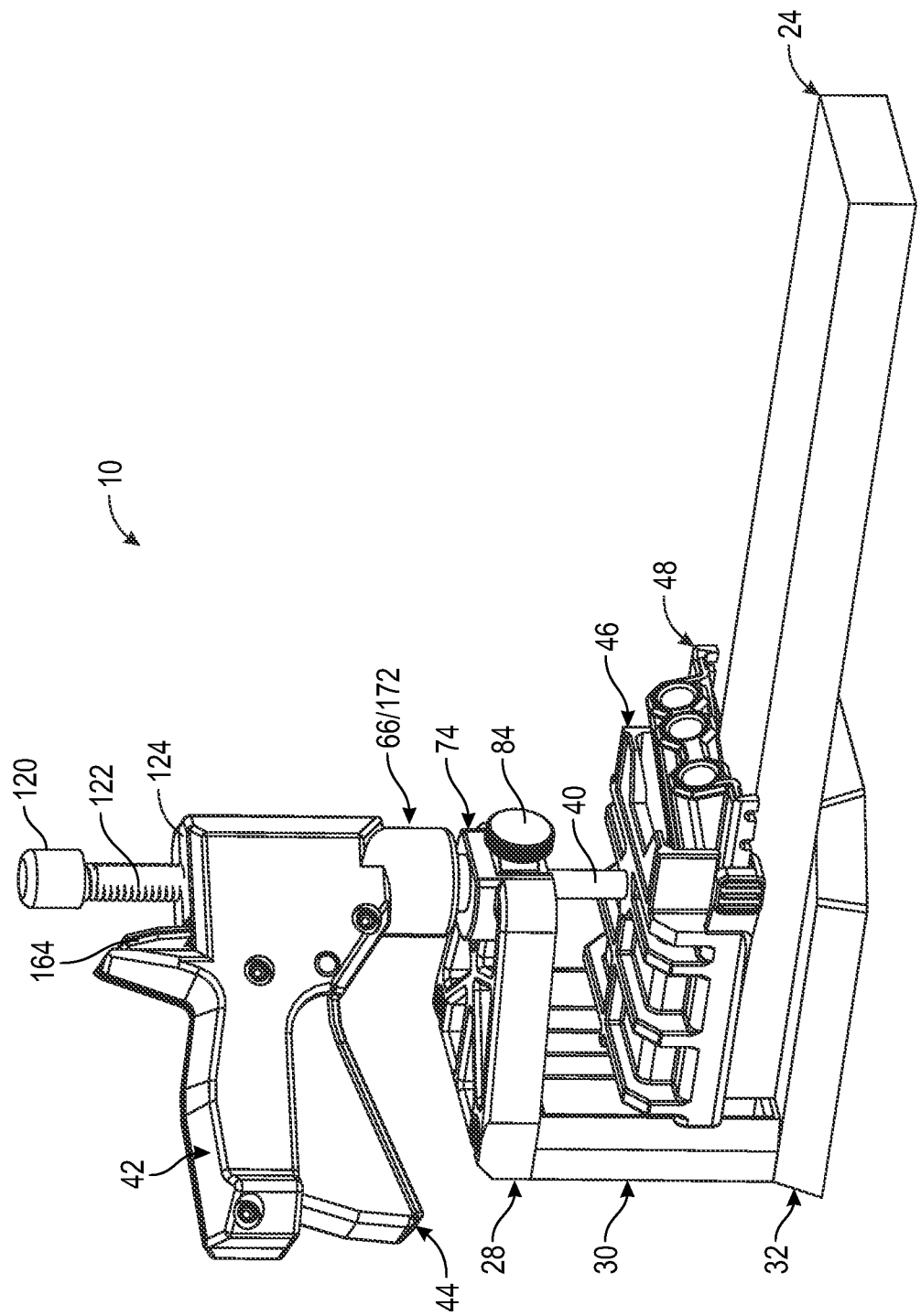
FIG. 35 is a perspective view of the quick grip pocket hole jig system shown in FIG. 1; the view showing a thin workpiece clamped between the backstop and the combined drill guide carrier and drill guide assembly; the view showing the jig system in a vertical orientation resting upon the forward side of the back stop.
Figure 36:
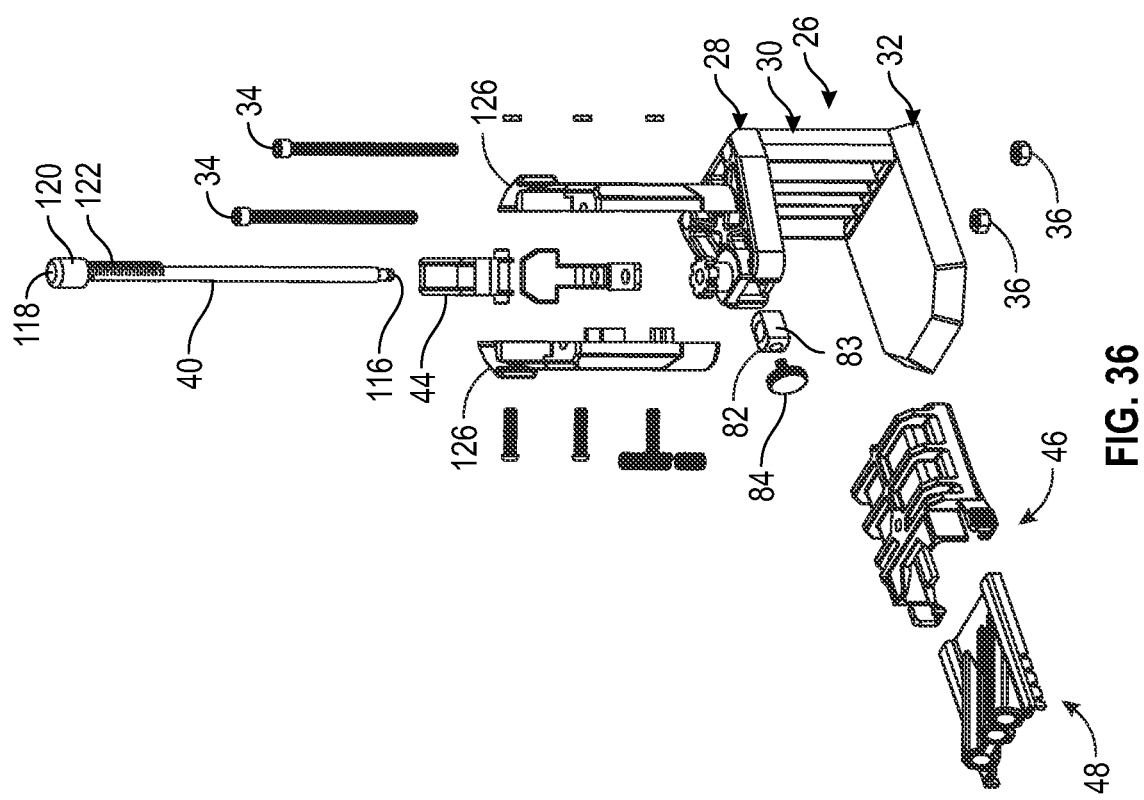
FIG. 36 is an exploded perspective view of the quick grip pocket hole jig system shown in FIG. 1.
Figure 37:
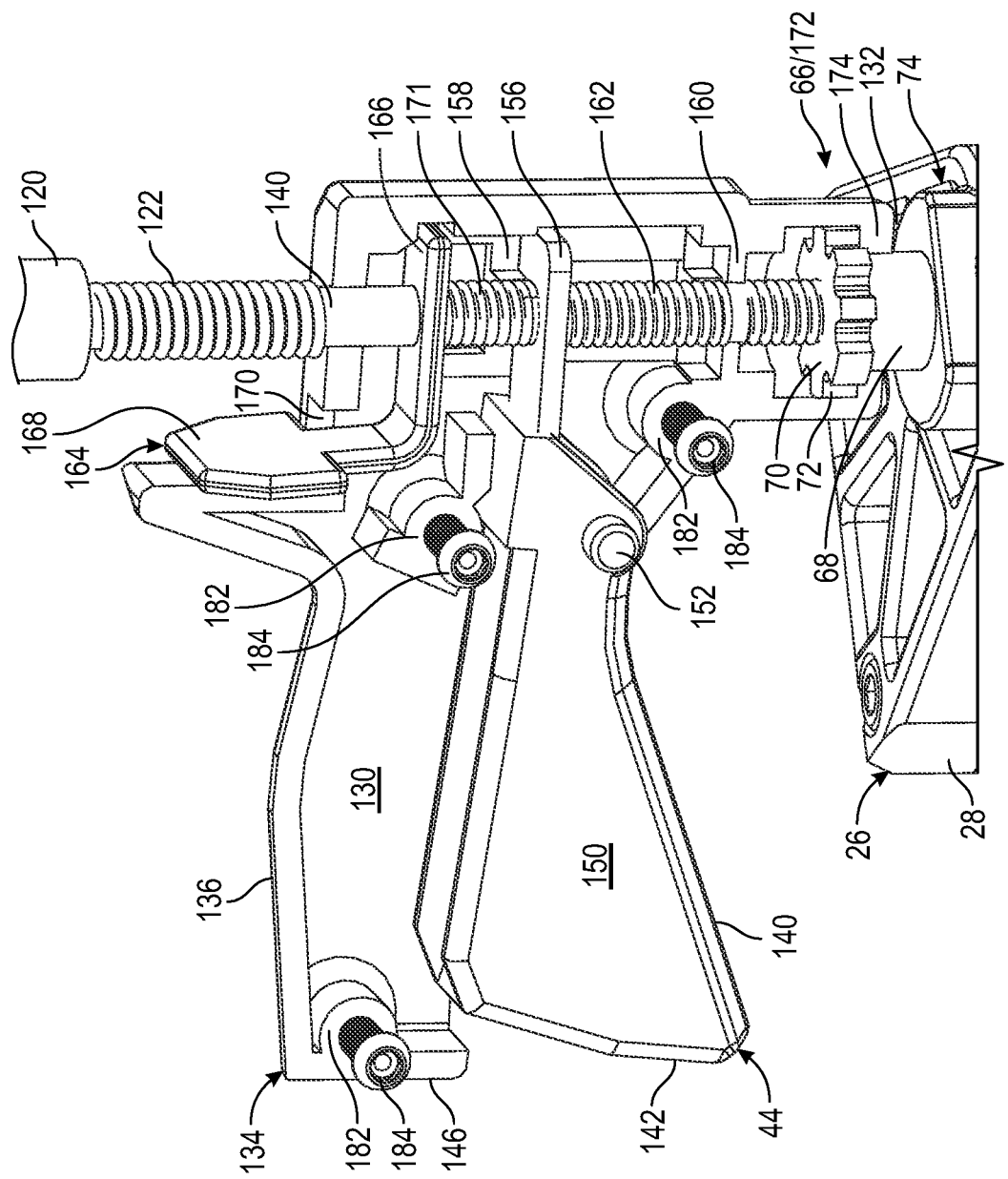
FIG. 37 is another close-up side perspective cut-away section view of the quick grip pocket hole jig system shown in FIG. 1; the view being similar to FIG. 10.
Figure 38:
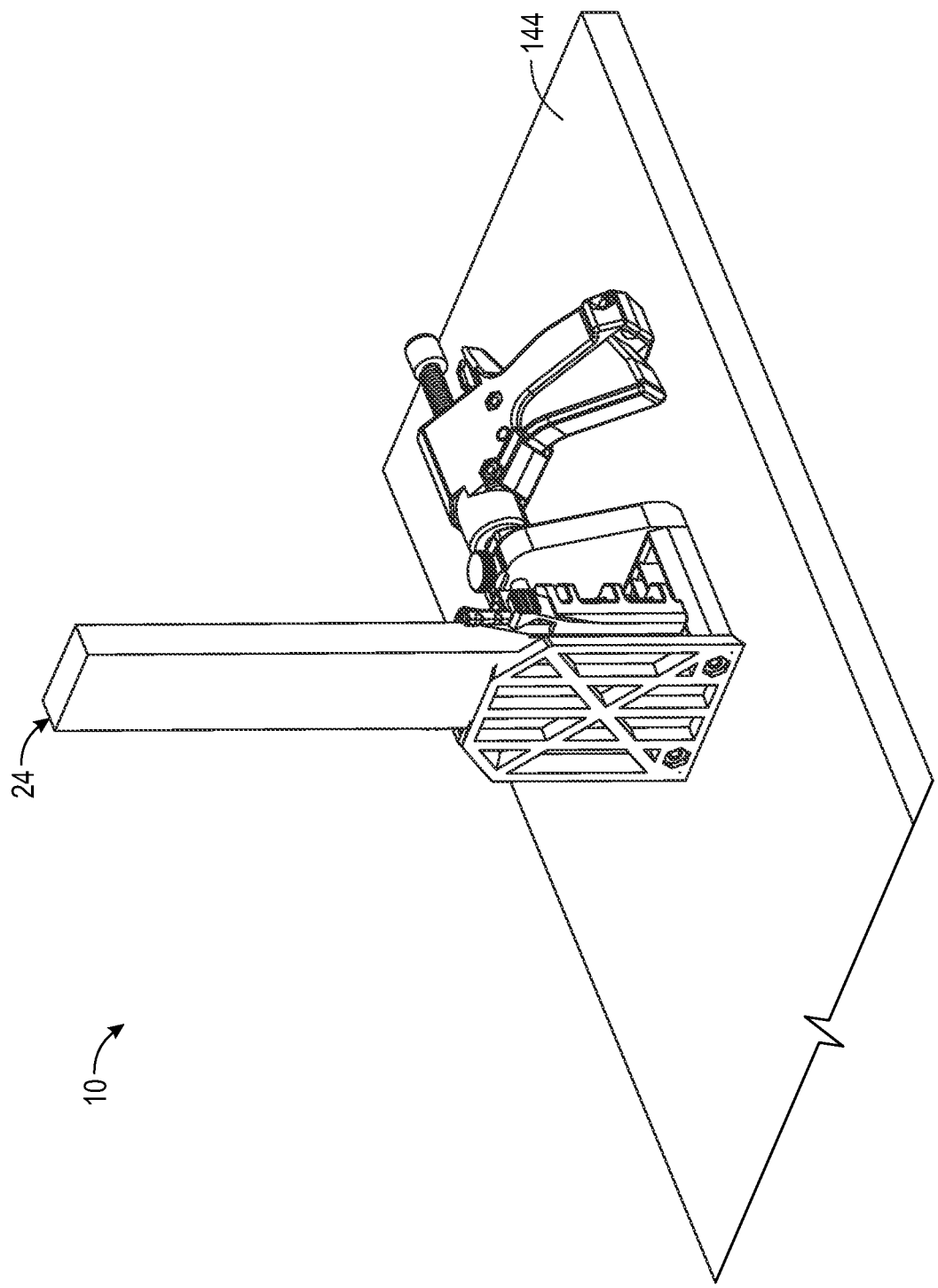
FIG. 38 is a perspective view of the quick grip pocket hole jig system shown in FIG. 1; the view showing a thin workpiece clamped between the backstop and the combined drill guide carrier and drill guide assembly; the view showing the jig system in a horizontal orientation resting upon the work surface with the bottom side of the end stop of the support section engaging the work surface; the view showing the handle assembly at an angle and the lower end of the handle assembly engaging the work surface thereby providing two points of contact for increased stability.
Figure 39:
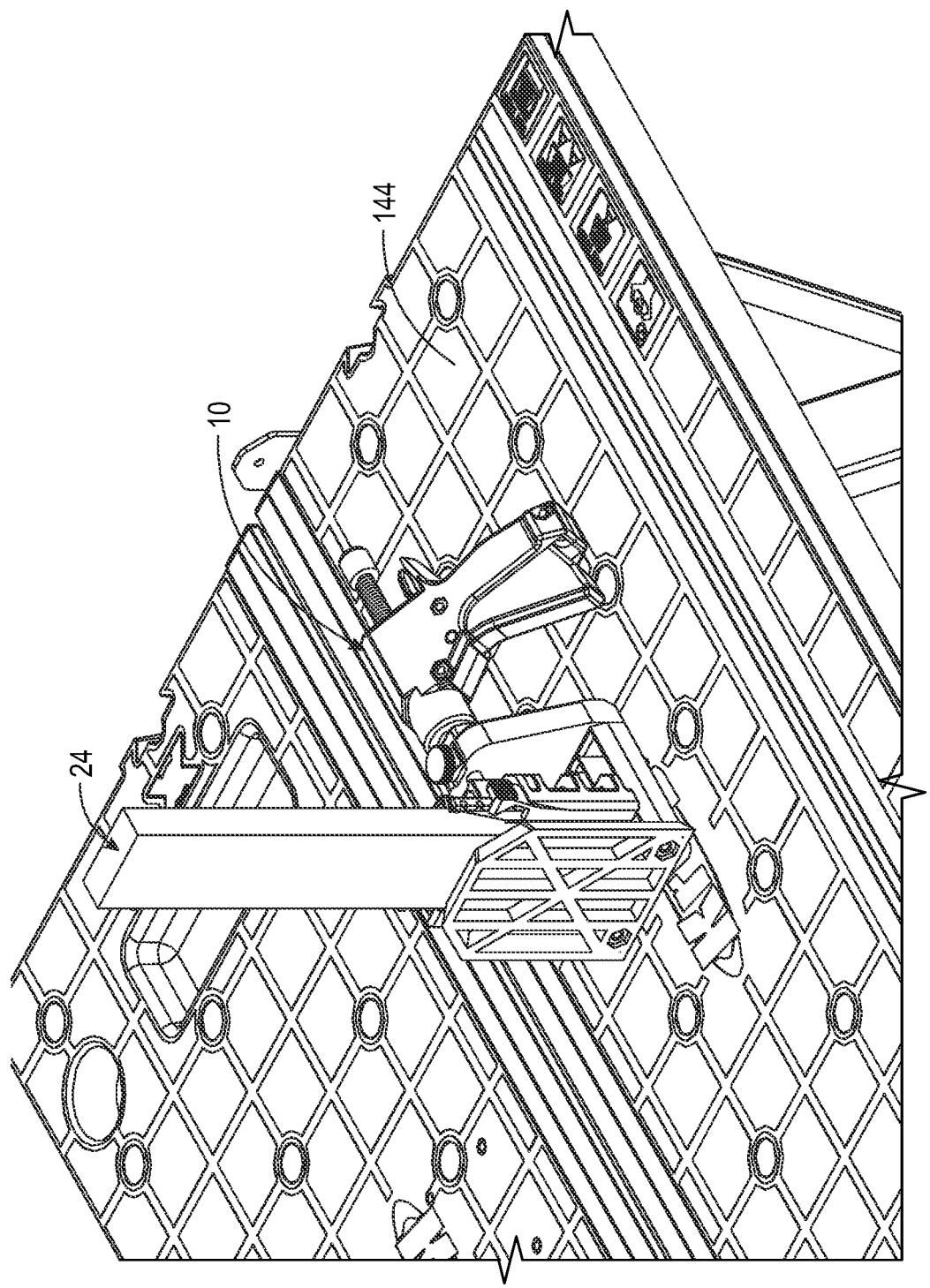
FIG. 39 is another perspective view of the quick grip pocket hole jig system shown in FIG. 1; the view showing a thin workpiece clamped between the backstop and the combined drill guide carrier and drill guide assembly; the view showing the jig system in a horizontal orientation resting upon the work surface with the bottom side of the end stop of the support section engaging the work surface; the view showing the handle assembly at an angle and the lower end of the handle assembly engaging the work surface thereby providing two points of contact for increased stability.

Clamping, Drilling, Release:

In the arrangement shown, as one example, to clamp a workpiece 24 using system 10 the user first decides whether the quick grip pocket hole jig system 10 will be used in a vertical arrangement or a horizontal arrangement. This determination will largely be determined by the size and shape of the workpiece 24. When small workpieces 24 are used that can easily be placed in support section 26, the system 10 is often used in a horizontal arrangement, such as that shown in FIG. 38 wherein the system 10 rests upon the plane formed by the bottom side 18 of clamp support 28, end stop 30 and back stop 32. In a horizontal use arrangement, care is taken to align handle assembly 134 at an angle wherein the outward end 146 of handle assembly 134 does not interfere with work surface 144 and instead a corner section 148 engages work surface 144 thereby adding stability. When larger workpieces 24 are used, that are more difficult to orient or place in the support section 26, the jig system 10 is essentially brought to the workpiece 24 and the system 10 is used in a vertical arrangement, such as that shown in FIG. 35 wherein the system 10 rests upon the plane formed by the forward wall 100 of back stop 32. Alternatively, system 10 may be used in any other orientation.

Once system 10 is properly oriented, workpiece 24 is placed in support section 26. In doing so, the end of workpiece 24 is placed against the upper surface 96 of end stop 30 and the forward facing surface of workpiece 24 is placed against the rearward wall 102 of back stop 32. The drill guides 240 of drill guide assembly 48 are then aligned with the rearward facing side of workpiece 24.

Once workpiece 24 is placed in support section 26, the handle assembly 134 and trigger 44 is grasped and the trigger 44 is squeezed toward handle assembly 134. As trigger 44 is squeezed, the outward end 142 of trigger 44 moves rearward toward handle assembly 134, and the inward end 154 of trigger 44 within hollow interior 130 of clamp body 42 moves forward as trigger 44 rotates upon pivot point 152. As the inward end 154 of trigger 44 moves forward, the outward end of movement mechanism 156 is moved forward by engagement with the inward end 154 of trigger 44.

As the outward end of movement mechanism 156 is urged forward by its engagement with the inward end 154 of trigger 44, the generally perpendicular alignment of the plate of movement mechanism 156 tilts or cants with respect to the axis of rotation of clamping rod 40. This causes movement mechanism 156 to cinch or lock onto clamping rod 40. Once movement mechanism 156 cinches to clamping rod 40, as the trigger 44 continues to be depressed into the hollow interior 130 of handle assembly 134 the inward end 154 of trigger 44 continues to move movement mechanism 156 forward within the hollow interior 130 of clamp body 42 between rearward stop 158 and forward stop 160. As movement mechanism 156 is moved forward, the rearward spring bias force of center spring 162 is overcome thereby causing center spring 162 to compress.

Since movement mechanism 156 is cinched on clamping rod 40, forward movement of movement mechanism 156 causes forward movement of clamping rod 40. As clamping rod 40 moves forward within hollow interior 130 of clamp body 42, the rearward end of clamping rod 40 slides through the forward section 166 of release mechanism 164 which allows one-way movement of clamping rod 40. As clamping rod 40 moves forward within hollow interior 130 of clamp body 42, the forward end of clamping rod 40 urges drill guide carrier 46 and its associated drill guide assembly 48 forward.

This process continues until trigger 44 has been fully compressed rearward into the hollow interior 130 of handle assembly 134. Once trigger 44 is fully compressed the trigger 44 is released which allows trigger 44 to return to its non-clamping position under spring bias force. As trigger 44 is released the spring bias force of center spring 162 pushes rearward upon the forward surface of movement mechanism 156 thereby causing movement mechanism 156 to move rearward until the rearward side of movement mechanism 156 engages the forward side of rearward stop 158, at which point trigger 44 has again returned to its fully non-clamping position. During this process of the return of trigger 44 and movement mechanism 156 to its fully non-clamping position, release mechanism 164 is cinched onto and holds the position of clamping rod 40 thereby preventing the rearward motion of clamping rod 40.

Once trigger 44 and movement mechanism 156 return to their fully non-clamping position, the trigger 44 may again be squeezed and the process is repeated. This continues until the forward face 230 of drill guide assembly 48 firmly engages the side of workpiece 26 thereby clamping workpiece between drill guide assembly 48 on one side and back stop 32 on the opposite side. Once clamped in place, release mechanism 164 is holds the tension and pressure on workpiece 24 thereby facilitating a strong and durable and long lasting hold on workpiece 24 so as to facilitate drilling pocket holes in workpiece 26.

In this clamped position, pocket holes are drilled in workpiece 24 by passing a stepped drill bit through the bores of drill guides 240 of drill guide assembly 48. In doing so, woodchips, dust and debris exits the channels 244 that connect with the bores of drill guides 240 which passes outward through the space between the lower end of drill guide carrier 46 and drill guide assembly 48. As these woodchips, dust and debris exit the lower end of the combined drill guide carrier 46 and drill guide assembly 48 the woodchips, dust and debris passes through the slots 98 in end stop 30 thereby allowing the woodchips, dust and debris to exit the system 10 and not interfere with the drilling operation or placement of the next workpiece 24.

Once the drilling has been completed, the workpiece 24 is released by pressing the rearward section 168 of release mechanism 164 outward and away from clamping rod 40. In doing so, as the rearward section 168 of release mechanism 164 is pressed outward, the forward section 166 of release mechanism 164 changes its angular orientation with respect to the axis of clamping rod 40. Once the rearward section 168 of release mechanism 164 is depressed enough, the lock between forward section 166 of release mechanism 164 and clamping rod 40 is broken and clamping rod 40 is allowed to move rearward through release mechanism 164. When this occurs, clamping rod 40 is automatically forced rearward under the spring bias force of return spring 122 positioned between the rearward end 124 of clamp body 42 and the forward end of end cap 120.

Unless stroke limiter 74 is in use, when release mechanism 164 is released, clamping rod 40 and its attached drill guide carrier 46 and drill guide assembly 48 will move all the way rearward to the fully non-clamping position. To reduce the need to repeatedly move the clamping rod 40 and its attached drill guide carrier 46 and drill guide assembly 48 from the fully clamped position to the fully non-clamped position, and to speed clamping of workpieces 24 of similar thickness, stroke limiter 74 is used. Stroke limiter 74 prevents clamping rod 40 and its attached drill guide carrier 46 and drill guide assembly 48 from moving all the way rearward to the fully non-clamped position.

In use, when clamping multiple workpieces 24 of a similar thickness, the first workpiece 24 is clamped. Next, the stop collar 82 is slid all the way forward within void 80 until the forward surface of stop collar 82 engages or nearly engages the rearward side of forward wall 88. Once in this position locking mechanism 84 is tightened thereby locking the position stop collar 82 upon clamping rod 40. In the arrangement shown, as one example, locking mechanism 84 is a thumb screw that extends through stop collar 82 and engages the surface of clamping rod 40.

Once stop collar 82 is tightened, when release mechanism 164 is released the spring bias force of return spring 122 forces clamping rod 40 rearward until the rearward side of stop collar 82 engages the forward side of rearward wall 78 of stroke limiter 74. This engagement prevents any further rearward motion of clamping rod 40. This arrangement allows for enough rearward movement to allow workpiece 24 to be freely removed and a new workpiece 24 to be inserted for clamping. Then, when it comes to clamping, the clamping rod 40 only needs to be moved forward a small distance to facilitate clamping of the new workpiece 24. This saves time, energy, effort and reduces wear and tear on the system 10 as well as the user.

Grippy Material:

In one arrangement, some or all of the surfaces of system 10 that engage workpiece 24 are partially or wholly covered by a compressible material that has a high coefficient of friction. This compressible material with a high coefficient of friction helps to hold workpiece 24 in place within jig 10 as well as reduces the amount of clamping pressure required to adequately hold workpiece 24 in place. This is because this grippy material has a high coefficient of friction making it less likely that workpiece 24 will slide or shift after being clamped.

In one arrangement this compressible material with a high coefficient of friction covers some or all of the upper surface of end stop 30, the rearward surface of back stop 32 and the forward surfaces of drill guide carrier 46 and drill guide assembly 48.

Figure 40:
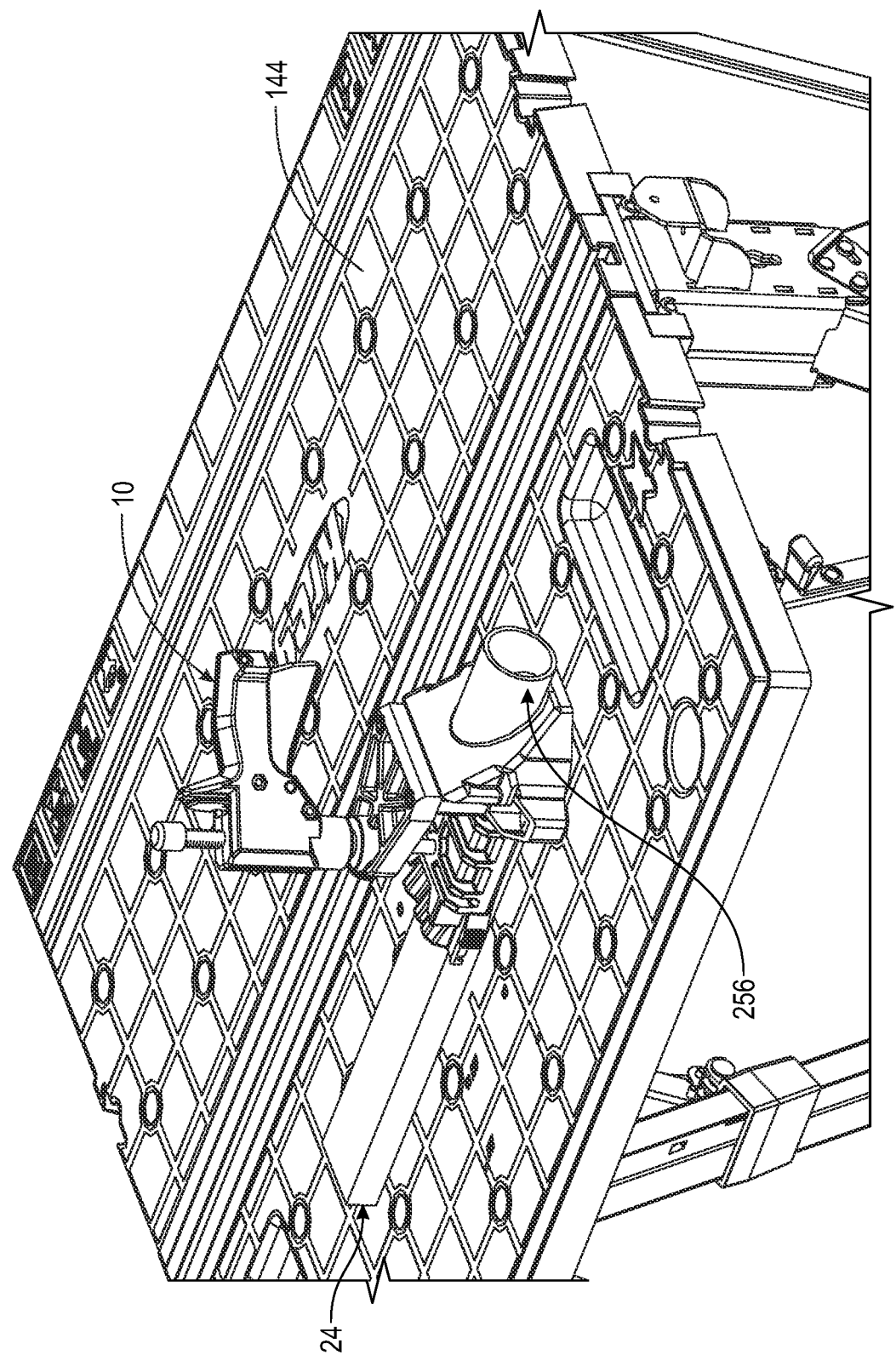
FIG. 40 is a perspective view of the quick grip pocket hole jig system shown in FIG. 1 supported on a work surface; the view showing the backstop removed and the work surface used as the back stop with the jig system connected to the work surface in a vertical arrangement; the view showing a vacuum attachment connected to the end stop to facilitate removal of woodchips and debris generated during drilling.
Figure 41:
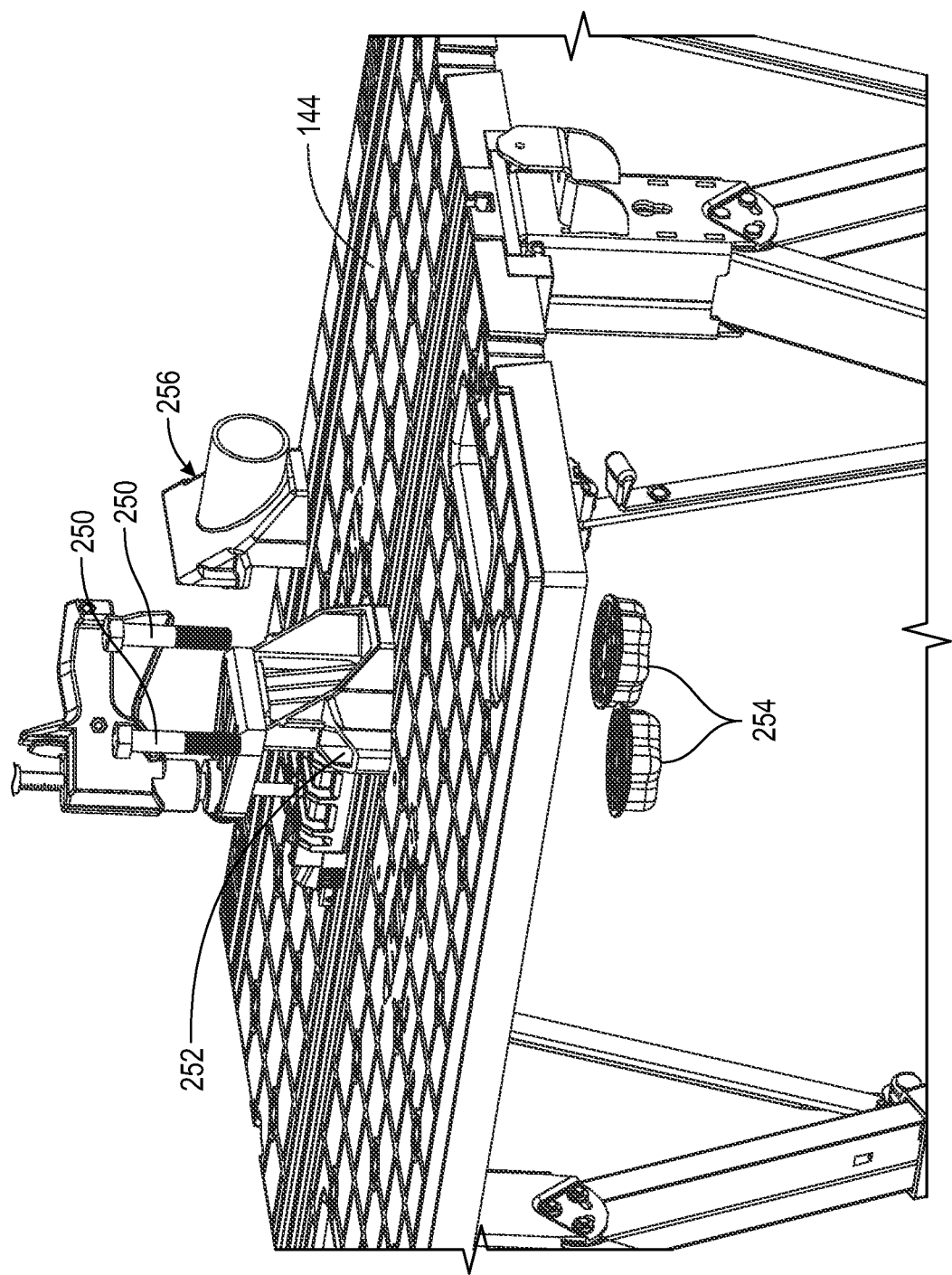
FIG. 41 is another perspective view of the quick grip pocket hole jig system shown in FIG. 40 supported on a work surface; the view showing the backstop removed and the work surface used as the back stop with the jig system connected to the work surface in a vertical arrangement; the view showing a vacuum attachment connected to the end stop to facilitate removal of woodchips and debris generated during drilling.
Figure 42:
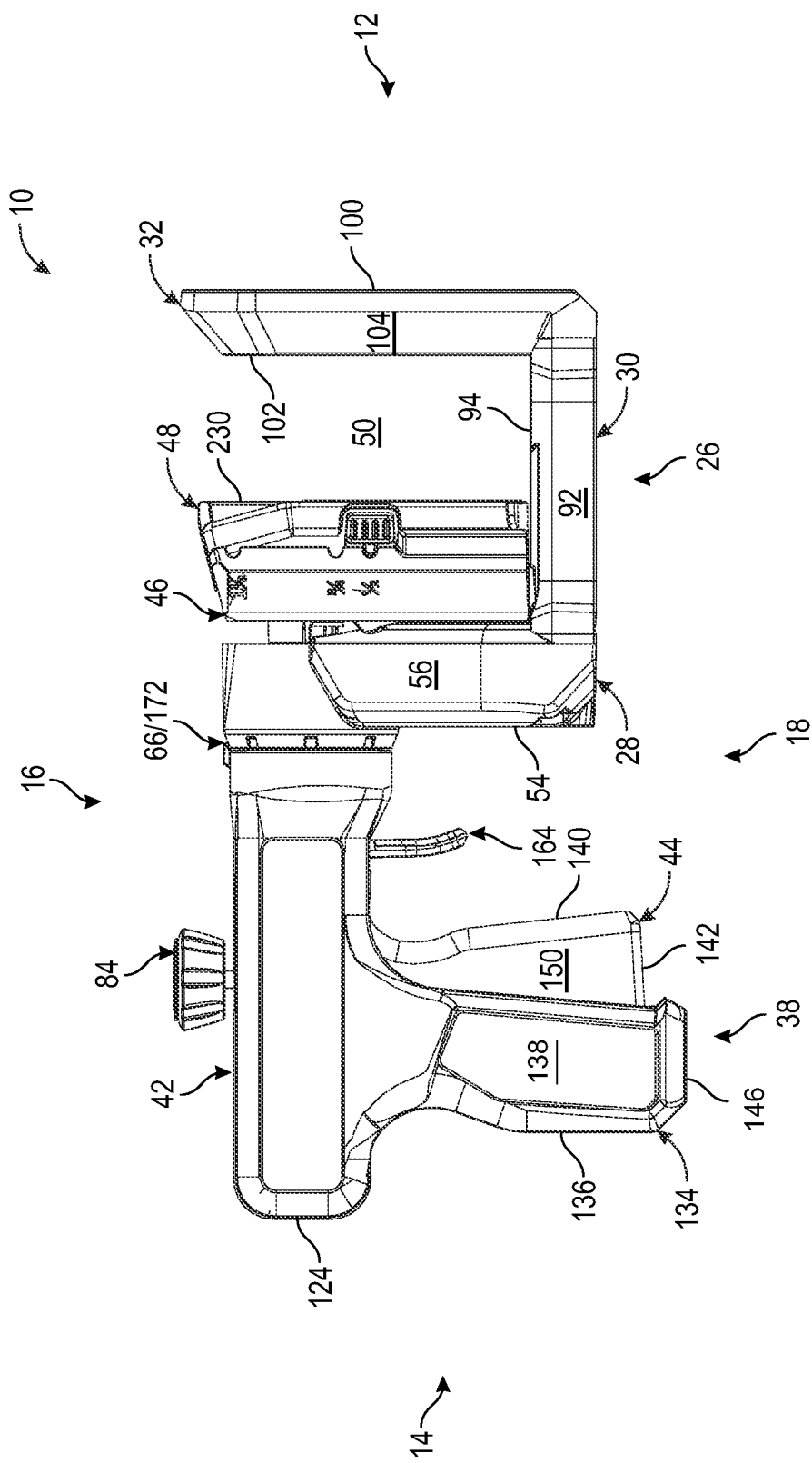
FIG. 42 is a side elevation view of a second arrangement of a quick grip pocket hole jig system; the view showing the jig system having a support section having a clamp support, an end stop and a back stop; the view showing the jig system having a clamp assembly having a clamping rod, a clamp body having a handle assembly and a trigger therein; the view showing the jig system having a drill guide carrier connected to the forward end of the clamping rod; the view showing the drill guide carrier receiving a drill guide assembly in an adjustable manner; the view showing the jig system having a stroke limiter positioned along the clamping rod; the view showing the jig system having a release mechanism; the view showing the jig system in a horizontal orientation resting upon the bottom side of the end stop.
Figure 43:
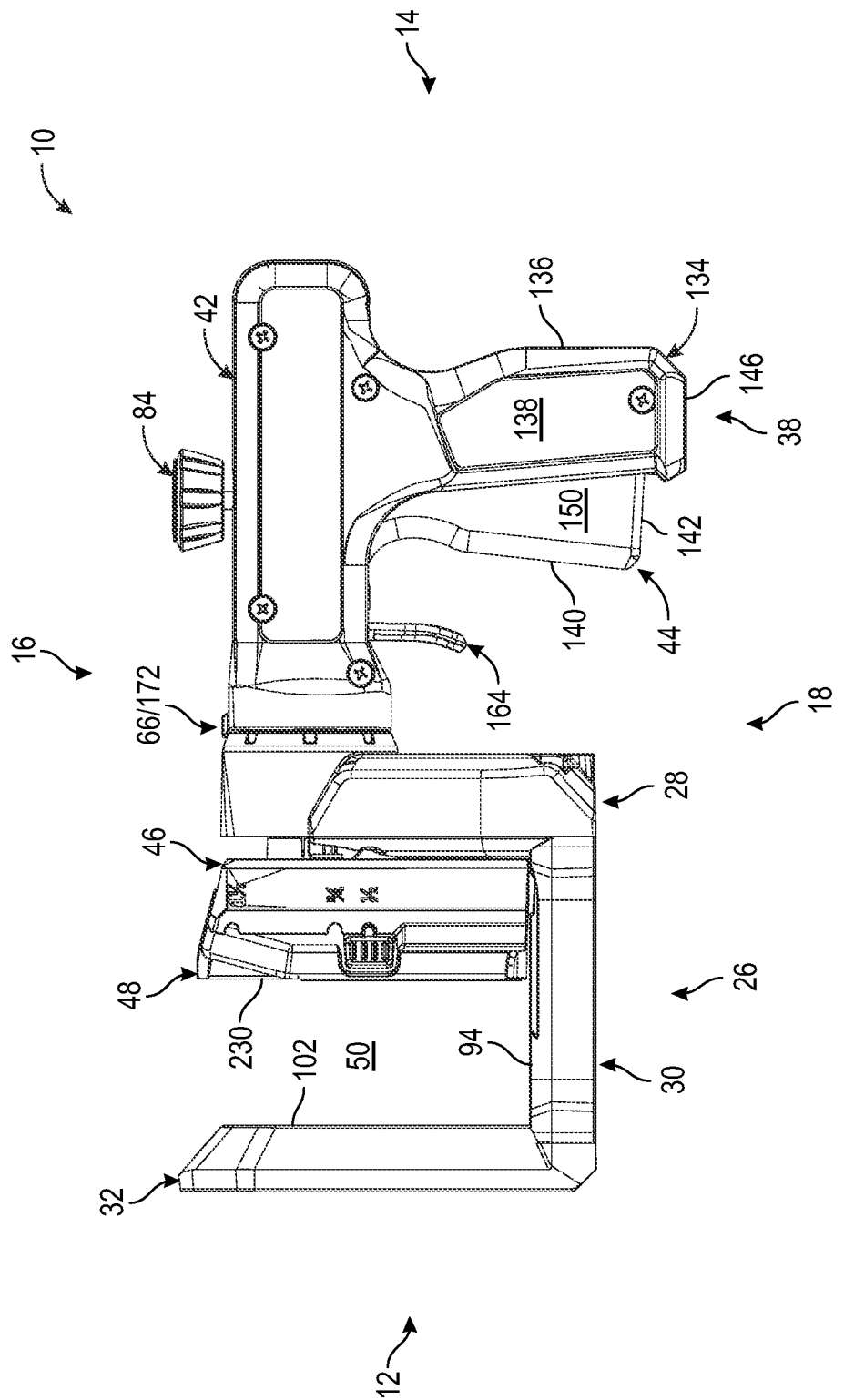
FIG. 43 is another side elevation view of a second arrangement of a quick grip pocket hole jig system shown in FIG. 42.
Figure 44:
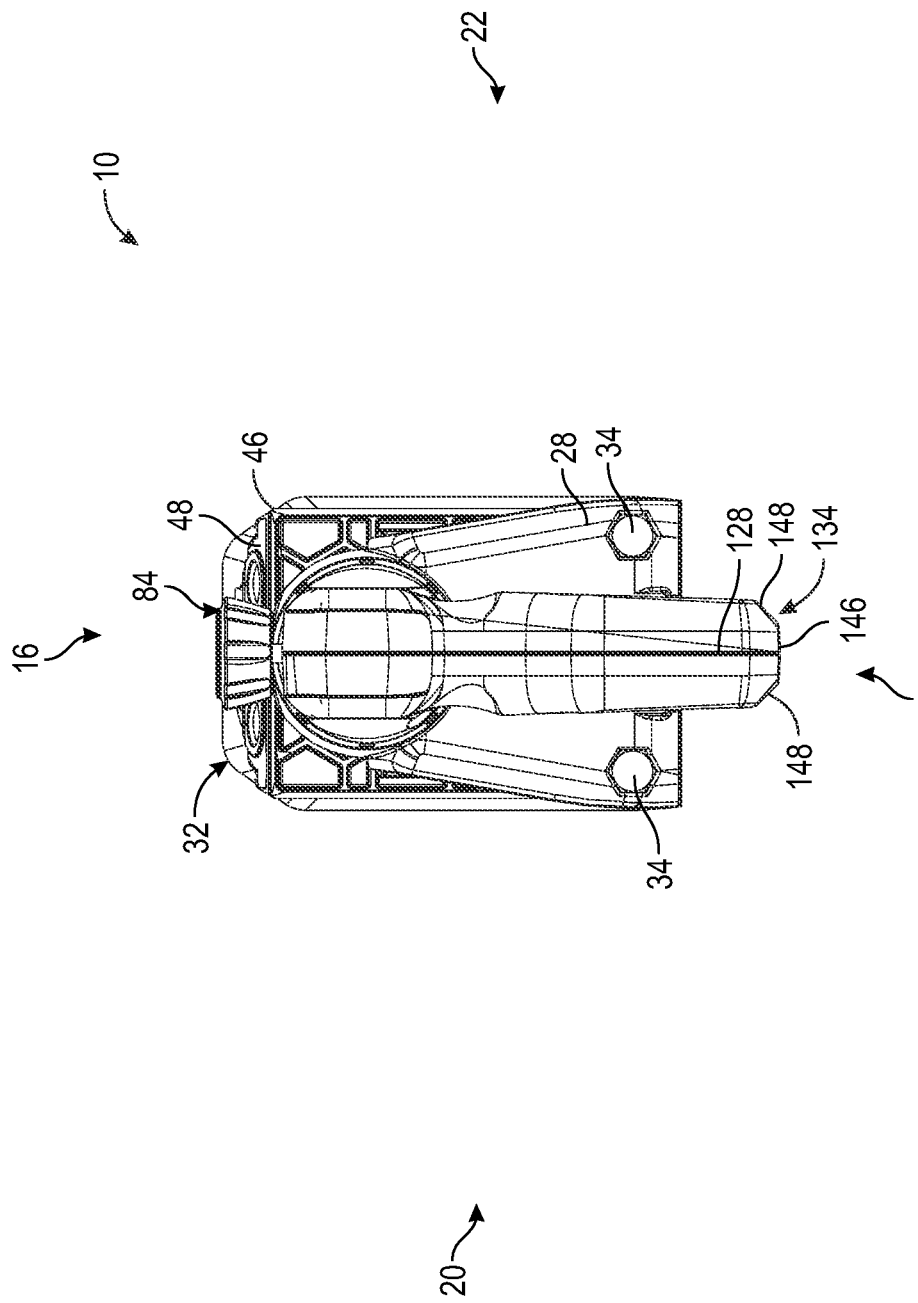
FIG. 44 is rear elevation view of a second arrangement of a quick grip pocket hole jig system shown in FIG. 42.
Figure 45:
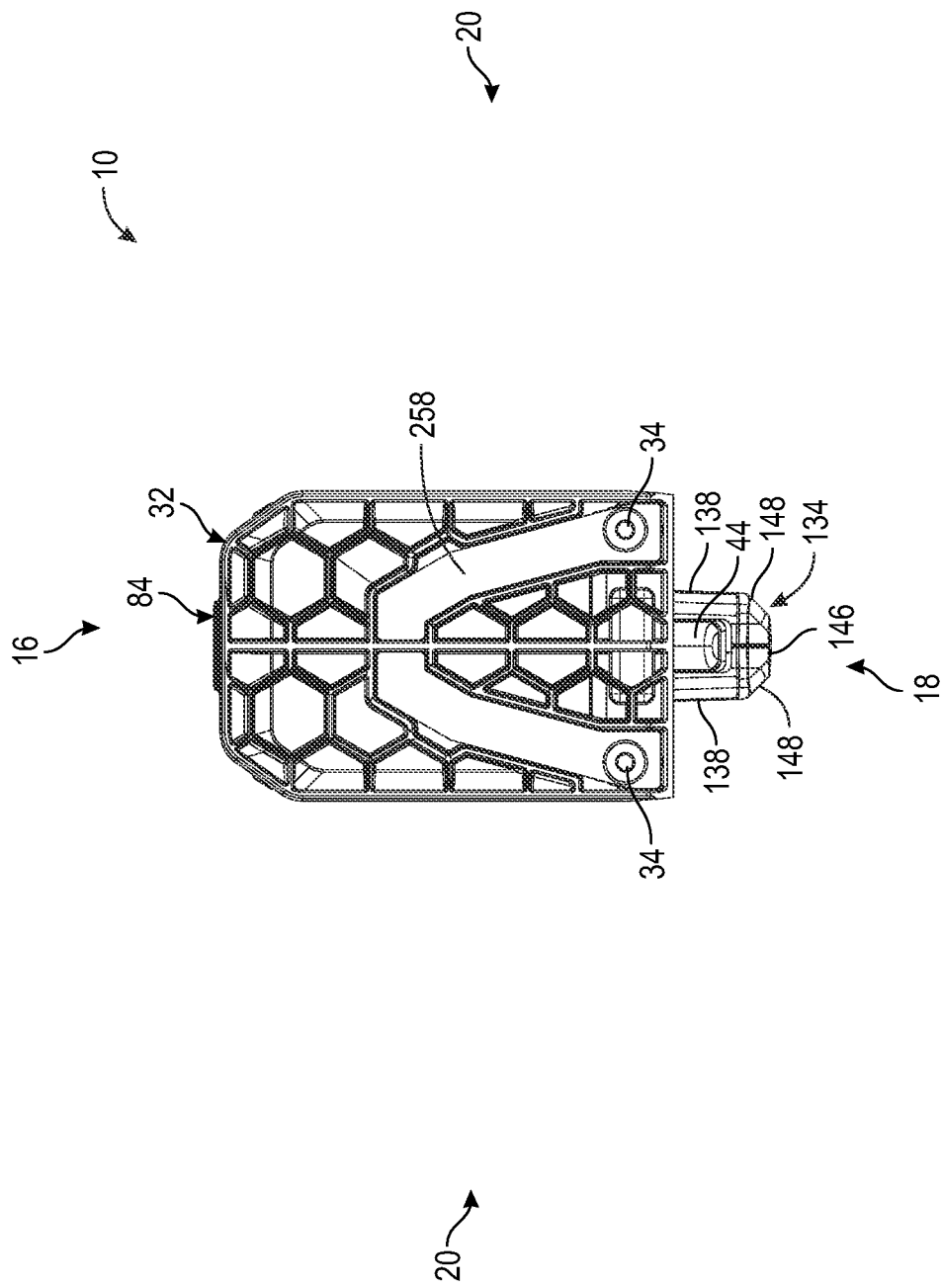
FIG. 45 is front elevation view of a second arrangement of a quick grip pocket hole jig system shown in FIG. 42.

Alternative Arrangement—Bench Clamp Arrangement:

In an alternative arrangement, with reference to FIGS. 40 and 41, backstop 32 is removed and work surface 44 essentially replaces backstop 32. In this arrangement, fasteners 250 are extended through holes 252 in end stop 30 as well as holes in work surface 144. These fasteners 250 are tightened against work surface 144 by nuts 254 that are tightened on the end of fasteners 250 on an opposite side of work surface 144. In this way, work surface 144 replaces back stop 32.

In the arrangement shown, as one example, a vacuum attachment 256 is attached to the lower end of end stop 30 when system 10 is used in association with work surface 144 in this manner as the lower end of end stop 30 is exposed. However any other arrangement of a vacuum attachment 256 is hereby contemplated for use.

Alternative Arrangement:

With reference to FIG. 42 through FIG. 75 an alternative arrangement of a quick grip pocket hole jig system 10 is presented. This alternative arrangement of a quick grip pocket hole jig system 10 presented in FIG. 42 through FIG. 75 is similar to the configuration of quick grip pocket hole jig system 10 presented in FIG. 1 through FIG. 41. For this reason, unless specifically stated otherwise, all of the teaching and disclosure presented with respect to the arrangement presented in FIG. 1 through FIG. 41 applies equally to the arrangement presented in FIG. 42 through FIG. 75.

Release Mechanism 164:

In the arrangement shown, as one example, with reference to FIG. 42 through FIG. 75 release mechanism 164 has been relocated as compared to the arrangement shown in FIG. 1 through FIG. 41. In this arrangement, release mechanism 164 is positioned forward of handle assembly 134 and trigger 44 and rearward of the forward end of clamp body 42. In the arrangement shown, as one example, release mechanism 164 extends downward from the lower side of clamp body 42 between the upper end of trigger 44 and the forward end of clamp body 42. In the arrangement shown, as one example, release mechanism 164 is a generally trigger-shaped member that extend outward and downward from the lower side of clamp body 42 in spaced alignment with trigger 44.

This placement, forward of and in alignment with trigger 44 is convenient for a user as the user may squeeze trigger 44 and release mechanism 164 without having to move the placement of their hand. That is, the user may clamp a workpiece 24 with quick grip pocket hole jig system 10 by placing their hand around handle assembly 134 and squeezing trigger 44 with their fingers. Without removing their hand they can also release the clamping pressure by grasping release mechanism 164 with their finger and pulling it rearward. In this way, convenience, comfort, increased speed, increased ease of use and improved ergonomics are provided by moving release mechanism 164 to this new location. In addition, this location is intuitive to the user as it is placed just forward of trigger 44. In addition, the motion is intuitive as the motion is the same direction as trigger 44, that is the user pulls trigger 44 and release mechanism 164 rearward.

In its natural state, forward section 166, when viewed from the side, is at an angled orientation to the length of clamping rod 40 with the upper end of forward section 166 slightly forward from the lower end of forward section 166. In this arrangement, forward section 166 cinches on clamping rod 40 and prevents the rearward movement of clamping rod 40. As can be seen, a spring 260 is positioned between the forward side of forward section 166 and the forward end of clamp body 42 which maintains this orientation.

In the arrangement shown, as one example, the upper end of release mechanism 164 urges the lower end of forward section 166, which is a plate that clamping rod 40 extends through that cinches or locks onto clamping rod 40 and allows forward movement of clamping rod 40 but prevents rearward movement of clamping rod 40 in its natural state. Forward section 166 may be referred to as a locking plate or cinching plate. When release mechanism 164 is pressed, the lower end of release mechanism 164 moves rearward while the upper end of release mechanism 164 moves forward which engages the lower end of forward section 166 which causes the lower end of forward section 166 to move forward. As the lower end of forward section 166 moves forward, against the spring bias of spring 260 this causes the orientation of forward section 166 to move from an angled and cinched position, wherein the upper end of forward section 166 is forward of the lower end of forward section 166, toward a perpendicular alignment wherein the plane of forward section 166 is approaches a perpendicular alignment to the length of clamping rod 40. At some point between the natural angled alignment and a perpendicular alignment, the forward section 166 releases its grip or cinch or lock on clamping rod 40 and allows clamping rod 40 to move rearward under spring bias thereby taking drill guide carrier 46 and drill guide assembly 48 connected to the forward end 116 of clamping rod 40 thereby allowing clamp body, drill guide carrier 46 and drill guide assembly 48 to move from a clamping position to a non-clamping position.

In the arrangement shown, as one example, release mechanism 166 is urged forward to its natural position by spring 262. Spring 262 is positioned on the rearward side of release mechanism 166 and provides a force that returns release mechanism 164 to its natural state where it does not affect the cinching of forward section 166. When release mechanism 164 is engaged, the user must overcome the spring bias provided by spring 262.

Stroke Limiter 74:

In the arrangement shown, as one example, with reference to FIG. 42 through FIG. 75 stroke limiter 74 has been relocated as compared to the arrangement shown in FIG. 1 through FIG. 41. In this arrangement, stroke limiter 74 is positioned in the upper approximate middle of clamp body 42 above handle assembly 134 and trigger 144. In the arrangement shown, as one example, stroke limiter 74 includes a locking mechanism 84, which in the arrangement shown is a knob, connected to a shaft that extends into the hollow interior of clamp body 42 and connects to stop collar 82 that is positioned around clamp rod 40.

Stop collar 82 of stroke limiter 74 is held between features within the hollow interior of clamp body 42 that define the forward most and rearward most position of stop collar 82. These features, and the distance between them define the length of the stroke of stroke limiter 74.

Like the new placemen of release mechanism, 164, the new position of stroke limiter 74 is improved. That is, the new location of stroke limiter 74 is convenient, comfortable, provides increased speed, provides increased ease of use and improves ergonomics. In addition, this location, in the upper approximate middle of clamp body 42 above handle assembly 134 and trigger 144, is intuitive to the user as it is placed above and opposite handle assembly 134. This makes it easier for the user to engage and disengage stroke limiter 74.

Detents in Attachment Mechanism 66 of Clamp Support 28 and Attachment Mechanism 172 of Clamp Body 42:

In the arrangement shown, as one example, with reference to FIG. 42 through FIG. 75 attachment mechanism 66 of clamp support 28 and attachment mechanism 172 of clamp body 42 has been modified as compared to the arrangement shown in FIG. 1 through FIG. 41. In this arrangement, attachment mechanism 66 of clamp support 28 and attachment mechanism 172 of clamp body 42 includes a detent mechanism 264. Detent mechanism 264 is formed of any suitable size, shape and design and is configured to facilitate the angular adjustment of handle assembly 134 relative to support section 26.

In the arrangement shown, as one example, detent mechanism 264 is a collar shaped member that is positioned at the forward end of the hollow interior of clamp body 42 and is positioned around attachment mechanism 66 of clamp support 28. In the arrangement shown, as one example, detent mechanism 264 has a hollow interior that fits around the lock features 72 of second collar 70 of clamp support 28 and includes arms 266 that are spring biased against and configured to engage and hold onto the lock features 72 second collar 70 of clamp support 28.

In its natural the spring bias of arms 266 engage the lock features 72 of second collar 70 of clamp support 28 and hold the set position of handle assembly 134 relative to support section 26. However, when a user wants to change the position of handle assembly 134 relative to support section 26 the user simply rotates handle assembly 134 relative to support section 26 with force great enough to overcome the friction between arms 266 of detent mechanism 264 and lock features 72 of second collar 70 of clamp support 28. When great enough force is applied, handle assembly 134 is allowed to rotate relative to support section 26 around the axis formed by clamping rod 40.

While detent mechanism 264 allows for rotation of handle assembly 134 relative to support section 26, the configuration of arms 266 and their engagement with lock features 72 of second collar 70 of clamp support 28 helps to index handle assembly 134 relative to support section 26 at predetermined and optimum positions. These predetermined positions may be any position. In one arrangement, these positions may be in vertical alignment (up or down, or 0° or) 180°, perpendicular alignment (+90° or −90°), at +45° or −45°, at +30° or −30°, at +60° or −60°, at +120° or −120°, or any other angle or range of angles.

This configuration is convenient for a user as the user simply has to rotate handle assembly 134 relative to support section 26 to achieve the desired angular orientation of handle assembly 134. That is, the user may clamp a workpiece 24 with quick grip pocket hole jig system 10 by placing their hand around handle assembly 134 and squeezing trigger 44 with their fingers. Without removing their hand they can also change the angular orientation of handle assembly 134 by simply rotating their wrist to a new and more desirable and functional position. In addition, once the user releases their hand or force, the detent mechanism 264 will naturally hold the set and/or indexed position. This variation can help reduce repetitive use injuries and can make use of the system 10 more comfortable and versatile. In this way, convenience, comfort, increased speed, increased ease of use and improved ergonomics are provided providing detent mechanism 264. In addition, use of detent mechanism 264, by simply rotating handle assembly 134 is intuitive to the user simply rotates handle assembly 134 when support section 26 remains stationary.

Connection Member for Drill Guide Carrier 46

In the arrangement shown, as one example, with reference to FIG. 42 through FIG. 75 the manner in which drill guide carrier 46 connects to clamping rod 46 has been modified as compared to the arrangement shown in FIG. 1 through FIG. 41. In this arrangement, the rearward side 190 of center wall 186 of drill guide carrier 46 includes an attachment member 268. Attachment mechanism is formed of any suitable size, shape and design and is configured to facilitate the quick, easy, secure and removable attachment of drill guide carrier 46 to the forward end 116 of clamping rod 40.

In the arrangement shown, as one example, attachment mechanism 268 is formed of a collar that extends rearward from the rearward side 190 of center wall 186 a distance. In the arrangement shown, as one example, attachment mechanism 268 includes an open lower end, a hollow interior and a hole 192 therein. The open lower end of attachment mechanism 268 is sized and shaped to allow the insertion of flange 270 connected to the forward end 116 of clamping rod 40 therein. The hollow interior of attachment mechanism 268 is sized and shaped to receive and hold flange 270 connected to the forward end 116 of clamping rod 40 therein. Hole 192 of attachment mechanism 268 is sized and shaped to allow the insertion of clamping rod 40 therein. Hole 192 also has features therein that are configured to friction-fit and hold onto clamping rod 40 when clamping rod 40 is inserted into hole 192.

In the arrangement shown, as one example, attachment mechanism 268 is configured to allow drill guide carrier 46 to be forced downward upon the forward end 116 of clamping rod 40 thereby securely attaching drill guide carrier 46 to clamping rod 40 in a frictional and locking manner. In this arrangement, sufficient force must be applied to overcome the friction-fit or engagement between attachment member 268 and clamping rod 40 and/or flange 270. Once installed, however, drill guide carrier 46 remains securely connected to clamping rod 40 during use. That is, until sufficient force is applied to remove drill guide carrier 46 from clamping rod 40.

In the arrangement shown, as one example, attachment mechanism 268 is configured to allow drill guide carrier 46 to be removed from the forward end 116 of clamping rod 40 thereby detaching drill guide carrier 46 from clamping rod 40 to allow for the installation of other accessories or tools or the like. In this arrangement, sufficient force must be applied to overcome the friction between attachment member 268 and clamping rod 40 and/or flange 270 to remove drill guide carrier 46. This is accomplished by applying sufficient separation force, or an upward force on drill guide carrier. Once removed, any other tool, accessory or device may be re-installed using the same installation technique. This provides versatility to system 10.

Exit Holes 272 in Drill Guide Assembly 48 and Exit Holes 274 in Drill Guide Carrier 46:

In the arrangement shown, as one example, with reference to FIG. 42 through FIG. 75 drill guide assembly 48 and drill guide carrier 46 have been modified as compared to the arrangement shown in FIG. 1 through FIG. 41 to facilitate the removal of woodchips and other debris generated during drilling.

In this arrangement, the rearward wall 232 of drill guide assembly 48 includes exit holes 272 that connect to the bore of drill guides 240. In this arrangement, the rearward side 190 of center wall 186 of drill guide carrier 46 includes exit holes 274 that overlap with the exit holes 272 in drill guide assembly 48 thereby allowing woodchips and other debris generated during drilling to exit the drill guide assembly 48 and drill guide carrier 46 thereby making drilling easier and improving the quality of the pocket holes that are formed by the system 10.

In the arrangement shown, as one example, at least one exit hole 272 is associated with each drill guide 240 of drill guide assembly 48. In the arrangement shown, as one example, each drill guide 240 of drill guide assembly 48 includes a single exit hole 272 in the rearward wall 232 of drill guide assembly 48. In the arrangement shown, as one example, exit holes 272 are generally square or rectangular in shape, however any other shape is hereby contemplated for use. In the arrangement shown, as one example, exit holes 272 are positioned in rearward wall 232 opposite where the bores of drill guides 240 exit forward face 230. In the arrangement shown, as one example, the forward end of exit holes 272 connect to the bores of drill guides 240 and extend rearward therefrom before connecting with the rearward wall 232 thereby providing an exit path from the bore of drill guides 240 through drill guide assembly 48. In the arrangement shown, as one example, exit holes 272 are positioned approximately in the middle of the area where the bores of drill guides 240 exit forward face 230.

Drill guide assembly 48 is configured to be received within drill guide carrier 46. As such, in the arrangement shown, as one example, drill guide carrier 46 includes at least one exit hole 274 associated with each exit hole 272/drill guide 240 of drill guide assembly 48. In the arrangement shown, the exit holes 274 of drill guide carrier 46 are positioned in overlapping condition with the exit holes 272 of drill guide assembly 48 when drill guide assembly 48 is installed into drill guide carrier 46. In the arrangement shown, as one example, exit holes 274 extend through center wall 186 of drill guide carrier 46 from forward side 194 to rearward side 190.

In the arrangement shown, as one example, drill guide assembly 48 is configured to move vertically within drill guide carrier 46 so as to adjust to varying workpiece thickness. To accommodate this movable position of drill guide assembly 48 relative to drill guide carrier 46, a pair of exit holes 274 are vertically stacked with respect to one another for each drill guide 240. Or, said another way, a structural member extends across vertically stacked exit holes 274. The presence of this structural member or separation provides additional strength and rigidity and durability to drill guide carrier 46. Sufficient strength for drill guide carrier 46 is needed due to the clamping pressures drill guide carrier 46 is placed under during clamping. The separation of vertically stacked exit holes 274 improves strength of drill guide carrier 46.

Any number of exit holes 274 are hereby contemplated for use such as two, three, four, five or more. In the arrangement shown, as one example, exit holes 274 are generally square or rectangular in shape, however any other shape is hereby contemplated for use. In the arrangement shown, as one example, the lower-positioned exit holes 274 are generally vertically elongated and cover or align with the lower positions of drill guide assembly 48 relative to drill guide carrier 46, which in arrangement shown corresponds to workpiece thickness of ½ inch and ¾ inch, as one example. That is, when drill guide assembly 46 is in a lower position, the exit holes 274 of drill guide carrier 46 align with or cover the exit holes 272 in drill guide carrier 48 thereby allowing the efficient removal of woodchips and other debris generated during drilling. These lower-positioned exit holes 274 are positioned below the connection point of clamping rod 40 to drill guide carrier 46 at attachment mechanism 268, which is the point at which pressure is applied to the drill guide carrier 46 and drill guide assembly 48. As such structural strength and rigidity and durability is needed at this point of pressure.

In the arrangement shown, as one example, the upper-positioned exit holes 274 are generally vertically narrower than the lower-positioned exit holes 274 and cover the upper position of drill guide assembly 48 relative to drill guide carrier 46, which in arrangement shown corresponds to workpiece thickness of 1½ inch, as one example. That is, when drill guide assembly 46 is in an upper position, the exit holes 274 of drill guide carrier 46 align with or cover the exit holes 272 in drill guide carrier 48 thereby allowing the efficient removal of woodchips and other debris generated during drilling. These upper-positioned exit holes 274 are positioned below the connection point of clamping rod 40 to drill guide carrier 46 at attachment mechanism 268, which is the point at which pressure is applied to the drill guide carrier 46 and drill guide assembly 48. As such structural strength and rigidity and durability is needed at this point of pressure.

In this way, the configuration of exit holes 272 in drill guide assembly 48 along with the exit holes 274 in drill guide carrier 46 allow for the efficient removal of woodchips and other debris generated during drilling to exit the drill guide assembly 48 and then pass through the overlapping drill guide carrier 46. This arrangement also allows for the vertical movement of drill guide assembly 48 relative to drill guide carrier 46. This arrangement also allows for the lateral or horizontal movement of the joined drill guide carrier 46 and drill guide assembly 48 as clamp assembly 38 is operated.

Lock Mechanism 206 and Lock Feature 208:

In the arrangement shown, as one example, with reference to FIG. 42 through FIG. 75 drill guide assembly 48 and drill guide carrier 46 have been modified as compared to the arrangement shown in FIG. 1 through FIG. 41 to move the orientation and configuration of lock mechanism 206, lock feature 208 and lock feature 238. That is, in the arrangement shown, as one example, drill guide assembly 48 includes lock mechanism 206 therein, which includes lock feature 208; whereas drill guide carrier 46 includes lock features 238 therein.

In the arrangement shown, as one example, lock mechanism 206 is formed of a spring loaded button positioned in the outward sides 228 of drill guide assembly 48. In the arrangement shown, as one example, a lock mechanism 206 is positioned in each of the outward sides 228 of drill guide assembly 48 at about the midpoint of the drill guide assembly 48. In the arrangement shown, as one example, lock mechanism 206 is a generally square or rectangular button that is spring loaded or has a spring bias forcing the button outward. As such, the lock mechanism 206 may be depressed by pressing the outward side of lock mechanism 206 inward thereby providing clearance to allow the position of drill guide assembly 48 to be adjusted relative to drill guide carrier 46. In the arrangement shown, as one example, the outward side of the button of lock mechanism 206 includes ridges or other friction imparting members that enhance grip for a user.

In the arrangement shown, as one example, lock feature 208 is a protrusion that extends outward from the rearward side of lock mechanism 206. In the arrangement shown, as one example, lock feature 208 is configured to engage and be received by lock feature 238 in the sidewall 188 of drill guide carrier 46. In the arrangement shown, as one example, lock features 238 in the sidewall 188 of drill guide carrier 46 are formed of a plurality of spaced features, such as grooves, notches, slots or openings that are sized and shaped to receive lock mechanism 206 therein in locking engagement. The spacing of lock features 238 correspond with common workpiece thickness. In the arrangement shown, as one example, the spacing of lock features 238 corresponds with workpiece thickness of ½ inch, ¾ inch and 1½ inch workpieces 24. However any other number of lock features 238 are hereby contemplated for use as is any spacing.

In the arrangement shown, as one example, to install drill guide assembly 48 within drill guide carrier 46, the lower end of drill guide assembly 48 is aligned with the lower end of drill guide carrier 46 such that the mating features aligned with one another to ensure proper orientation, that is the forward end of drill guide assembly 48 and drill guide carrier 46 face forward, and the rearward ends of drill guide assembly 48 and drill guide carrier 46 face rearward. Once properly aligned in this manner, the user lowers the lower end of drill guide assembly 48 into the hollow interior 198 of drill guide assembly 46.

The user also depresses, or presses the lock mechanisms 206 in the opposing sides 228 of drill guide assembly 48 inward thereby providing clearance between lock features 208 of drill guide assembly 48 and lock features 238 of drill guide carrier 46. This allows the drill guide assembly 48 to be fully lowered into the hollow interior 198 of drill guide carrier 46. To select the desired position of drill guide assembly 48 relative to drill guide carrier 46, the user identifies the workpiece thickness and aligns the lock feature 208 of drill guide assembly 48 with the appropriate lock feature 238 in drill guide carrier 46. Once aligned in this manner, the user releases the inward pressure upon lock mechanisms 206 and the natural spring bias forces the outward side of lock mechanisms 206 outward thereby forcing the protrusion of lock feature 208 of drill guide assembly 48 within the recess of lock feature 238 of drill guide carrier 46 thereby locking the two components together.

In this locked arrangement, the exit holes 272 of drill guide assembly 48 are aligned with the exit holes of drill guide carrier 46 in the back sides of the two components thereby allowing woodchips and debris generated during drilling to exit the drill guide assembly 48 and drill guide carrier 46 during drilling.

To adjust the position of drill guide assembly 48 relative to drill guide carrier 46 the user simply presses the lock mechanisms 206 of drill guide assembly 48 inward, thereby withdrawing the lock features 208 of drill guide assembly 48 from the lock features 238 of drill guide assembly 46. Once in this unlocked condition, the user may move the drill guide assembly 48 upward or downward until the desired position is achieved.

Any other configuration is hereby contemplated for use as lock mechanism 206, lock feature 208 and lock feature 238.

Clamp Recess 276 in Support Section 26:

In the arrangement shown, as one example, with reference to FIG. 42 through FIG. 75 quick grip pocket hole jig system 10 has been modified as compared to the arrangement shown in FIG. 1 through FIG. 41 to include a clamp recess 276. Clamp recess 276 is formed of any suitable size, shape and design and is configured to receive a portion of a clamp 278 therein so as to facilitate clamping of quick grip pocket hole jig system 10 to a work surface 144. In the arrangement shown, as one example, clamp recess 276 is a t-shaped slot in rearward side of clamp support 28 adjacent its lower end that extends forward a distance. This clamp recess 276 is configured to receive an arm of clamp 278 thereby allowing jig system 10 to be clamped to work surface 144 in a convenient, easy, simple, safe and secure manner. Further information regarding clamp recess 276 is more fully presented in Applicants U.S. Provisional Patent Application No. 62/950,189 filed Dec. 19, 2019, entitled: "DOCKING STATION SYSTEM" which is fully incorporated by reference herein.

Any other configuration is hereby contemplated for use as 1 clamp recess 276.

Figure 74:
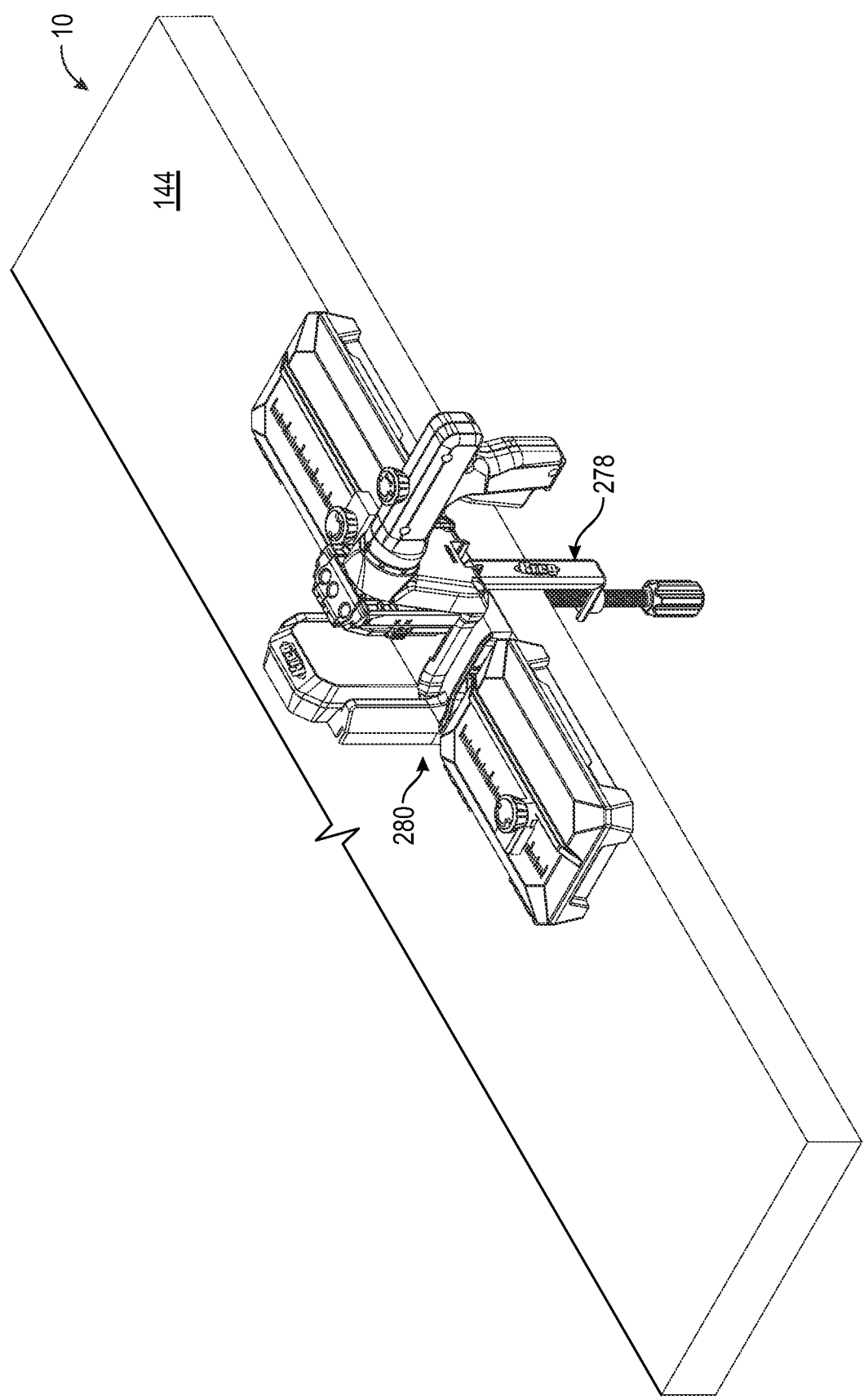
FIG. 74 is a perspective view of a second arrangement of a quick grip pocket hole jig system shown in FIG. 42; the view showing the jig system used in association with a docking station.
Figure 75:
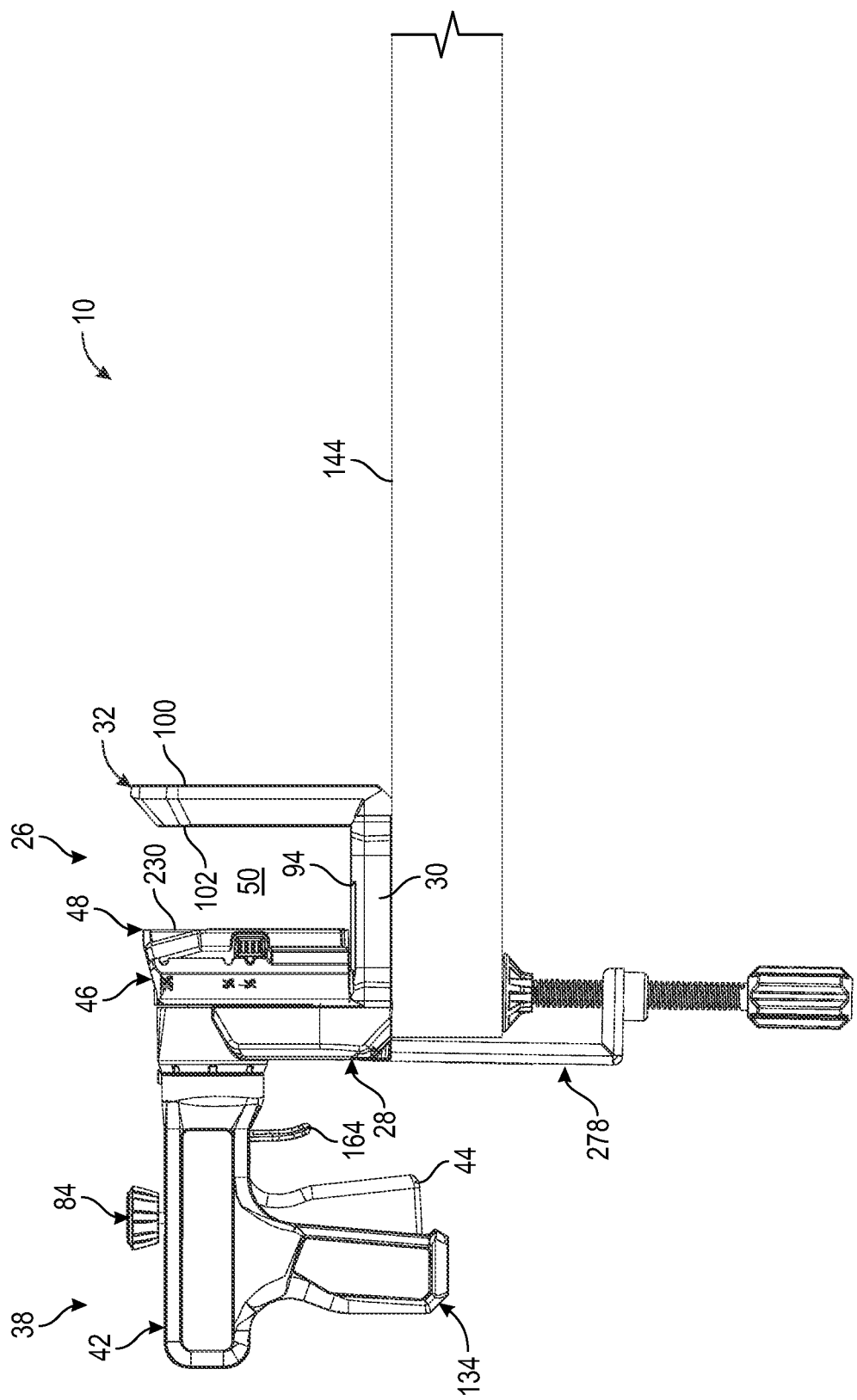
FIG. 75 is a side elevation view of a second arrangement of a quick grip pocket hole jig system shown in FIG. 42; the view showing the jig system clamped to a work surface using a clamp in a clamp recess of the support section thereby holding the jig system in place during use.

Docking Station 280:

In the arrangement shown, as one example, with reference to FIG. 74, quick grip pocket hole jig system 10 may be used with docking station 280. Docking station 280 provides additional features and capabilities that are useful with quick grip pocket hole jig system 10, such as side supports, storage, stop features, among other features. One configuration of docking station 280 is more fully presented in Applicants U.S. Provisional Patent Application No. 62/950,189 filed Dec. 19, 2019, entitled: "DOCKING STATION SYSTEM" which is fully incorporated by reference herein. In the arrangement shown, as one example, docking station system 208 and quick grip pocket hole jig system 10 connect together in a convenient, easy, simple, safe and secure manner through the engagement of mating locking features.

Configurations:

As is shown and described, a quick grip pocket hole jig system 10 is presented herein that includes a drill guide carrier 46 that receives a drill guide assembly 48 therein, wherein the drill guide carrier 46 includes exit holes 274, wherein the drill guide assembly 48 includes exit holes 272, wherein when the drill guide assembly 48 is held within the drill guide carrier 46 the exit holes 272 of the drill guide assembly 48 align with the exit holes 274 of the drill guide carrier 46, wherein the drill guide assembly 48 is vertically adjustable relative to the drill guide carrier 46, wherein the drill guide carrier 46 is laterally movable to facilitate clamping.

As is also shown and described, a quick grip pocket hole jig system 10 is presented herein that includes a drill guide carrier 46 that receives a drill guide assembly 48 therein, wherein the drill guide carrier 46 includes a first set of exit holes 274 for a first workpiece thickness and a second set of exit holes 274 for a second workpiece thickness, wherein the drill guide assembly 48 includes a first exit holes 272, wherein when the drill guide assembly 48 is held within the drill guide carrier 46 the exit holes 272 of the drill guide assembly 48 align with the first set of exit holes 274 of the drill guide carrier 46 for drilling a workpiece having a first thickness, and wherein when the drill guide assembly 48 is held within the drill guide carrier 46 the exit holes 272 of the drill guide assembly 48 align with the second set of exit holes 274 of the drill guide carrier 46 for drilling a workpiece having a second thickness, wherein the drill guide assembly 48 is vertically adjustable relative to the drill guide carrier 46, wherein the drill guide carrier 46 is laterally movable to facilitate clamping.

In view of the above the quick grip pocket hole jig system 10 presented herein improves upon the state of the art among countless other improvements and advantages.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof

What is claimed:

1. A pocket hole jig system, comprising;
a clamp support;
the clamp support having a forward side and a rearward side;
a clamping rod;
a drill guide assembly;
a clamp body;
wherein the clamping rod extends through the clamp support;
wherein the drill guide assembly is operatively connected to the clamping rod on the forward side of the clamp support;
wherein the clamp body is operatively connected to the clamping rod on the rearward side of the clamp support;
wherein the clamp body is configured to rotate with respect to the clamp support;
wherein the clamp body is configured to urge the drill guide assembly forward so as to facilitate clamping of a workpiece and drilling of a pocket hole in the workpiece.

2. The system of claim 1, wherein the drill guide assembly is advanced by grasping the clamp body and squeezing.

3. The system of claim 1, wherein the clamp body rotates around an axis that extends through an approximate center of the clamping rod.

4. The system of claim 1, further comprising an end stop connected to the clamp support and a back stop connected to the end stop.

5. The system of claim 1, further comprising an end stop connected to the clamp support and a work surface connected to the end stop.

6. The system of claim 1, further comprising a drill guide carrier connected to a forward end of the clamping rod, and wherein the drill guide assembly is operatively connected to the drill guide carrier.

7. The system of claim 1, further comprising a drill guide carrier connected to a forward end of the clamping rod, and wherein the drill guide assembly is operatively connected to the drill guide carrier and wherein the drill guide assembly is adjustable with respect to the drill guide carrier.

8. The system of claim 1, wherein the clamp body is a quick grip clamp.

9. The system of claim 1, wherein the clamp body includes a trigger operatively connected to the clamp body, wherein when the trigger is pulled toward the clamp body the drill guide assembly is advanced forward and away from the forward side of the clamp support.

10. The system of claim 1, further comprising a stroke limiter operatively connected to the clamp support and the clamping rod.

11. The system of claim 1, further comprising a stroke limiter operatively connected to the clamp support and the clamping rod, the stroke limiter including a stop collar connected to the clamping rod, wherein the stop collar is positioned within a void in the clamp support.

12. The system of claim 1, further comprising a stroke limiter operatively connected to the clamping rod, wherein the stroke limiter is configured to limit the distance that the drill guide assembly will return when the clamping rod is released.

13. The system of claim 1, further comprising a return spring, wherein the return spring is positioned around the clamping rod and is positioned between a rearward end of the clamping rod and a rearward end of the clamp body.

14. The system of claim 1, wherein a forward end of the clamp body includes a plurality of features that mesh with a plurality of features in a rearward side of the clamp support, wherein when the features of the of the clamp body mesh with the features of the clamp support the clamp body is positioned at predetermined angular positions relative the clamp support.

15. The system of claim 1, wherein the drill guide assembly includes at least one drill guide having a bore that extends through a forward surface of the drill guide assembly at an angle.

16. A pocket hole jig system, comprising;
a clamp support;
the clamp support having a forward side and a rearward side;
a drill guide assembly;
a clamp body;

wherein the drill guide assembly includes at least one drill guide having a bore that extends through a forward surface of the drill guide assembly at an angle;

wherein the clamp body is configured to rotate with respect to the clamp support and drill guide assembly;

wherein the clamp body is configured to urge the drill guide assembly forward so as to facilitate clamping of a workpiece and drilling of a pocket hole in the workpiece.

17. The system of claim 16, further comprising a clamping rod operatively connected to the clamp support, the drill guide assembly and the clamp body.

18. The system of claim 16, further comprising a clamping rod operatively connected to the clamp support, the drill guide assembly and the clamp body; wherein the clamp body rotates around an axis that extends through an approximate center of the clamping rod.

19. The system of claim 16, further comprising an end stop connected to the clamp support and a back stop connected to the end stop.

20. The system of claim 16, further comprising an end stop connected to the clamp support and a work surface connected to the end stop.

21. The system of claim 16, further comprising a drill guide carrier connected to a forward end of a clamping rod, and wherein the drill guide assembly is operatively connected to the drill guide carrier.

22. The system of claim 16, further comprising a drill guide carrier connected to a forward end of a clamping rod, and wherein the drill guide assembly is operatively connected to the drill guide carrier and wherein the drill guide assembly is adjustable with respect to the drill guide carrier.

23. The system of claim 16, wherein the clamp body is a quick grip clamp.

24. The system of claim 16, wherein the clamp body includes a trigger operatively connected to the clamp body, wherein when the trigger is pulled toward the clamp body the drill guide assembly is advanced forward and away from the forward side of the clamp support.

25. The system of claim 16, wherein a forward end of the clamp body includes a plurality of features that mesh with a plurality of features in a rearward side of the clamp support, wherein when the features of the of the clamp body mesh with the features of the clamp support the clamp body is positioned at predetermined angular positions relative the clamp support.

26. A pocket hole jig system, comprising;
a clamp support;
the clamp support having a forward side and a rearward side;
a clamping rod;
a drill guide assembly;
a clamp body;
the clamp body having a trigger;
wherein when the trigger is pulled the drill guide assembly is advanced forward so as to facilitate clamping of a workpiece and drilling of a pocket hole in the workpiece;
wherein the clamp body rotates around an axis that extends through an approximate center of the clamping rod.

27. The system of claim 26, wherein the clamping rod extends through the clamp support, wherein the drill guide assembly is operatively connected to the clamping rod on the forward side of the clamp support, wherein the clamp body is operatively connected to the clamping rod on the rearward side of the clamp support, wherein when the trigger is pulled, the drill guide assembly is advanced forward and away from the forward side of the clamp support.

28. The system of claim 26, wherein the clamp body forms a handle that extends approximately perpendicularly to a length of the clamping rod.

29. The system of claim 26, further comprising an end stop connected to the clamp support and a back stop connected to the end stop.

30. The system of claim 26, further comprising an end stop connected to the clamp support and a work surface connected to the end stop.

31. The system of claim 26, further comprising a drill guide carrier connected to a forward end of the clamping rod, and wherein the drill guide assembly is operatively connected to the drill guide carrier.

32. The system of claim 26, further comprising a drill guide carrier connected to a forward end of the clamping rod, and wherein the drill guide assembly is operatively connected to the drill guide carrier and wherein the drill guide assembly is adjustable with respect to the drill guide carrier.

33. The system of claim 26, wherein the clamp body is a quick grip clamp.

34. The system of claim 26, further comprising a stroke limiter operatively connected to the clamp support and the clamping rod.

35. The system of claim 26, further comprising a stroke limiter operatively connected to the clamp support and the clamping rod, the stroke limiter including a stop collar connected to the clamping rod, wherein the stop collar is positioned within a void in the clamp support.

36. The system of claim 26, further comprising a stroke limiter operatively connected to the clamp support and the clamping rod, wherein the stroke limiter is configured to limit the distance that the drill guide assembly will return when the clamp body is released.

37. The system of claim 26, further comprising a return spring, wherein the return spring is positioned around the clamping rod and is positioned between a rearward end of the clamping rod and a rearward end of the clamp body.

38. The system of claim 26, wherein a forward end of the clamp body includes a plurality of features that mesh with a plurality of features in a rearward side of the clamp support, wherein when the features of the of the clamp body mesh with the features of the clamp support the clamp body is positioned at predetermined angular positions relative the clamp support.

39. The system of claim 26, wherein the drill guide assembly includes at least one drill guide having a bore that extends through a forward surface of the drill guide assembly at an angle.

40. A pocket hole jig system, comprising;
a clamp support;
the clamp support having a forward side and a rearward side;
a clamping rod;
a drill guide assembly;
a clamp body;
the clamp body having a trigger;
wherein when the trigger is pulled the drill guide assembly is advanced forward so as to facilitate clamping of a workpiece and drilling of a pocket hole in the workpiece;
wherein the clamp body is configured to rotate with respect to the clamp support and drill guide assembly.

* * * * *